US012469165B2

(12) United States Patent
Stein

(10) Patent No.: US 12,469,165 B2
(45) Date of Patent: *Nov. 11, 2025

(54) DETERMINING ROAD LOCATION OF A TARGET VEHICLE BASED ON TRACKED TRAJECTORY

(71) Applicant: Mobileye Vision Technologies Ltd., Jerusalem (IL)

(72) Inventor: Gideon Stein, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,640

(22) Filed: Jan. 26, 2024

(65) Prior Publication Data

US 2024/0161331 A1 May 16, 2024

Related U.S. Application Data

(63) Continuation of application No. 18/127,533, filed on Mar. 28, 2023, which is a continuation of application
(Continued)

(51) Int. Cl.
*G06T 7/70* (2017.01)
*G01C 21/00* (2006.01)
(Continued)

(52) U.S. Cl.
CPC .............. *G06T 7/70* (2017.01); *G01C 21/005* (2013.01); *G01C 21/16* (2013.01); *G01C 21/32* (2013.01);
(Continued)

(58) Field of Classification Search
None
See application file for complete search history.

(56) References Cited

U.S. PATENT DOCUMENTS

| 7,433,772 B2 | 10/2008 | Isaji et al. |
| 9,760,092 B2 | 9/2017 | Ferguson et al. |

(Continued)

FOREIGN PATENT DOCUMENTS

| JP | 2018-025906 A | 2/2018 |
| JP | 2018-045397 A | 3/2018 |
| WO | WO 2017/014012 A1 | 1/2017 |

OTHER PUBLICATIONS

International Search Report and Provisional Opinion issued in International Application No. PCT/US2019/025573 dated Sep. 10, 2019 (21 pages).
(Continued)

*Primary Examiner* — Leon Viet Q Nguyen
(74) *Attorney, Agent, or Firm* — Finnegan, Henderson, Farabow, Garrett & Dunner, LLP

(57) ABSTRACT

Systems and methods are provided for navigating a host vehicle. In an embodiment, a processing device may be configured to receive images captured over a time period; analyze images to identify a target vehicle; receive map information associated including a plurality of target trajectories; determine, based on a size of a representation of the target vehicle in the plurality of images, first and second estimated positions of the target vehicle within the time period, determine, based on the first and second estimated positions, a trajectory of the target vehicle over the time period; compare the determined trajectory to the plurality of target trajectories to identify a target trajectory traversed by the target vehicle; determine, based on the identified target trajectory, a position of the target vehicle; and determine a navigational action for the host vehicle based on the determined position.

34 Claims, 70 Drawing Sheets

Related U.S. Application Data

No. 17/670,085, filed on Feb. 11, 2022, now Pat. No. 11,741,627, which is a continuation of application No. 17/124,426, filed on Dec. 16, 2020, now Pat. No. 11,263,771, which is a continuation of application No. 16/520,295, filed on Jul. 23, 2019, now Pat. No. 11,263,770, which is a continuation of application No. PCT/US2019/025573, filed on Apr. 3, 2019.

(60) Provisional application No. 62/652,029, filed on Apr. 3, 2018, provisional application No. 62/652,039, filed on Apr. 3, 2018.

(51) Int. Cl.

| | | |
|---|---|---|
| *G01C 21/16* | (2006.01) | |
| *G01C 21/32* | (2006.01) | |
| *G01C 21/36* | (2006.01) | |
| *G05D 1/00* | (2006.01) | |
| *G05D 1/249* | (2024.01) | |
| *G06V 10/772* | (2022.01) | |
| *G06V 20/56* | (2022.01) | |
| *G06V 20/58* | (2022.01) | |
| *G08G 1/16* | (2006.01) | |

(52) U.S. Cl.
CPC ..... *G01C 21/3658* (2013.01); *G01C 21/3837* (2020.08); *G01C 21/3844* (2020.08); *G05D 1/0246* (2013.01); *G05D 1/249* (2024.01); *G06V 10/772* (2022.01); *G06V 20/584* (2022.01); *G06V 20/588* (2022.01); *G08G 1/167* (2013.01); *G06T 2207/30244* (2013.01); *G06T 2207/30261* (2013.01)

(56) References Cited

U.S. PATENT DOCUMENTS

| | | | |
|---|---|---|---|
| 10,032,379 | B1 | 7/2018 | Chambers et al. |
| 10,372,130 | B1* | 8/2019 | Kaushansky .......... B60K 35/26 |
| 11,983,894 | B2* | 5/2024 | Stein .................... G08G 1/0129 |
| 2007/0021886 | A1 | 1/2007 | Miyajima |
| 2013/0223686 | A1 | 8/2013 | Shimizu et al. |
| 2015/0039218 | A1 | 2/2015 | Bowers et al. |
| 2015/0210312 | A1 | 7/2015 | Stein et al. |
| 2015/0363940 | A1 | 12/2015 | Held et al. |
| 2017/0008521 | A1 | 1/2017 | Braunstein et al. |
| 2017/0314956 | A1 | 11/2017 | Shiina et al. |
| 2017/0329332 | A1 | 11/2017 | Pilarski et al. |
| 2018/0024562 | A1 | 1/2018 | Bellaiche |
| 2018/0025235 | A1 | 1/2018 | Fridman |
| 2018/0057003 | A1 | 3/2018 | Hyun |
| 2018/0149487 | A1 | 5/2018 | Lee et al. |
| 2018/0172450 | A1* | 6/2018 | Lalonde ............. G01C 21/3407 |
| 2019/0049987 | A1* | 2/2019 | Djuric ..................... G06N 3/08 |
| 2019/0079526 | A1 | 3/2019 | Vallespi-Gonzalez et al. |
| 2019/0086549 | A1 | 3/2019 | Ushani et al. |
| 2019/0139231 | A1 | 5/2019 | Aizawa |

OTHER PUBLICATIONS

Office Action issued in Chinese Patent Application No. 201980021805.5, dated Jan. 25, 2024, and translation thereof (22 pages).

Office Action issued in Japanese Patent Application No. 2024-157048, dated Sep. 19, 2025, and translation thereof (5 pages).

* cited by examiner

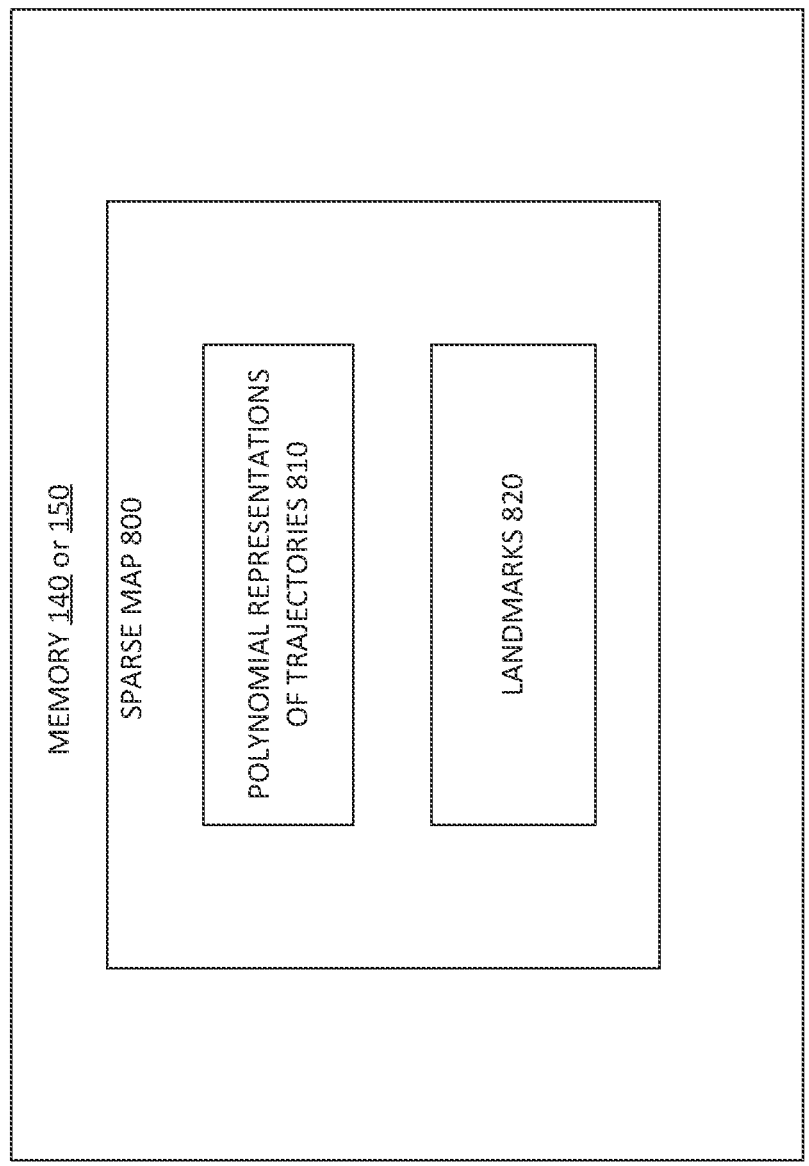

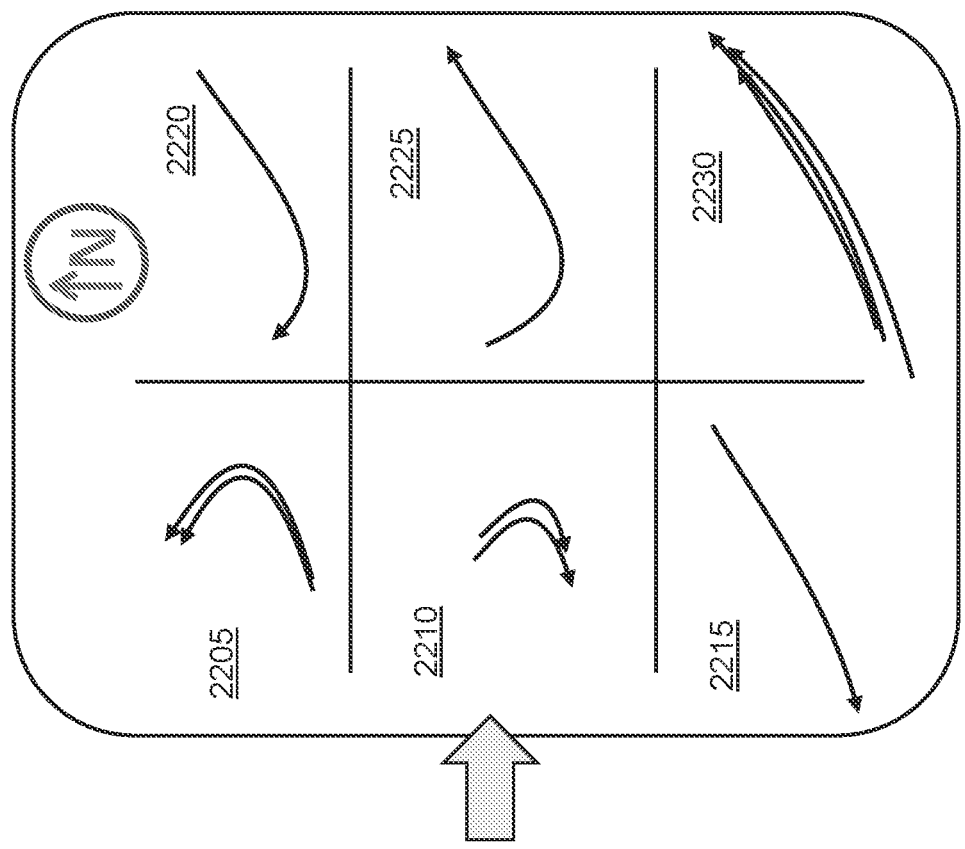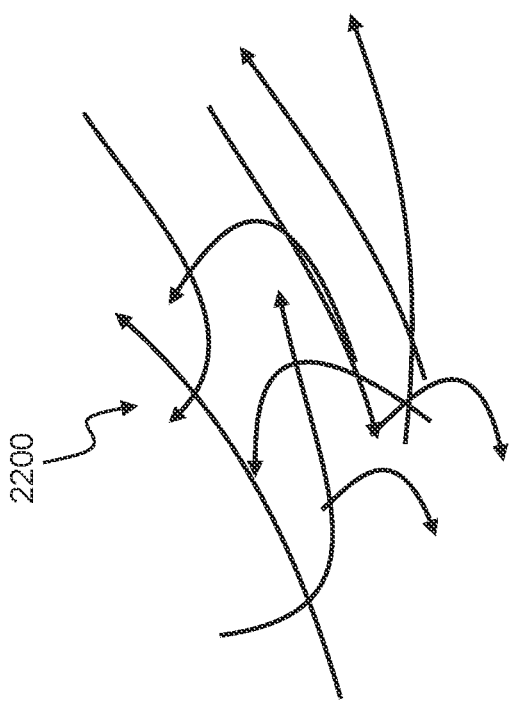
FIG. 22

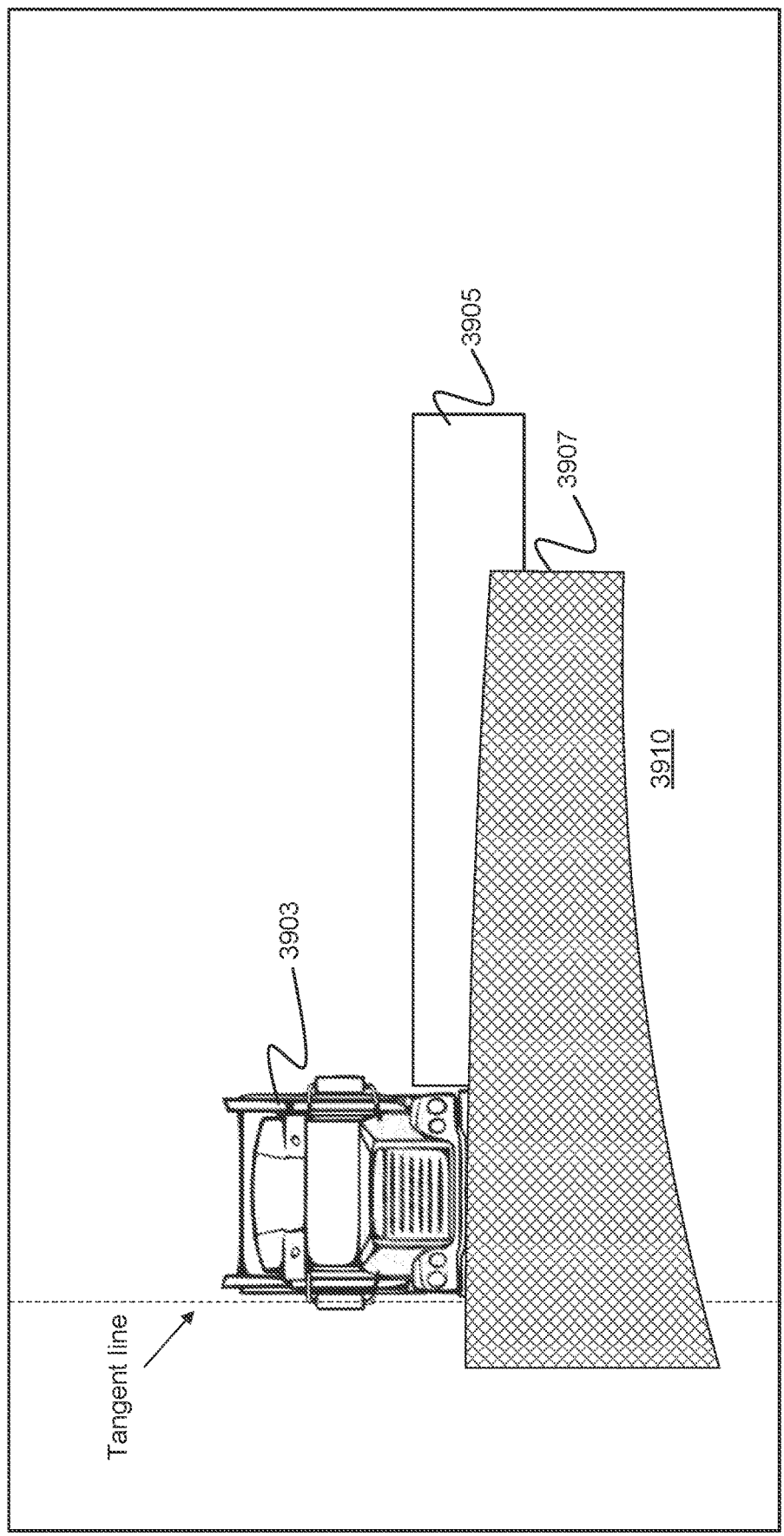

DETERMINING ROAD LOCATION OF A TARGET VEHICLE BASED ON TRACKED TRAJECTORY

CROSS REFERENCES TO RELATED APPLICATIONS

This application is a continuation of U.S. patent application Ser. No. 18/127,533, filed Mar. 28, 2023, which is a continuation of U.S. patent application Ser. No. 17/670,085, filed Feb. 11, 2022, now issued as U.S. Pat. No. 11,741,627, which is a continuation of U.S. patent application Ser. No. 17/124,426, filed Dec. 16, 2020, now issued as U.S. Pat. No. 11,263,771, which is a continuation of U.S. patent application Ser. No. 16/520,295, filed Jul. 23, 2019. now issued as U.S. Pat. No. 11,263,770, which is a continuation of PCT International Application No. PCT/US2019/025573, filed Apr. 3, 2019, which claims the benefit of priority of U.S. Provisional Patent Application No. 62/652,029, filed Apr. 3, 2018; and U.S. Provisional Patent Application No. 62/652,039, filed Apr. 3, 2018. All of the foregoing applications are incorporated herein by reference in their entirety.

BACKGROUND

Technical Field

The present disclosure relates generally to autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

Consistent with disclosed embodiments, a system for navigating a host vehicle is provided. The system may include a at least one processing device. The at least one processing device may be programmed to receive, from an image capture device, at least one image representative of an environment of the host vehicle. The at least one processing device may also be programmed to analyze the at least one image to identify an object in the environment of the host vehicle. The at least one processing device may also be programmed to determine a location of the host vehicle. The at least one processing device may also be programmed to receive map information associated with the determined location of the host vehicle, wherein the map information includes elevation information associated with the environment of the host vehicle. The at least one processing device may also be programmed to determine a distance from the host vehicle to the object based on at least the elevation information. The at least one processing device may further be programmed to determine a navigational action for the host vehicle based on the determined distance.

Consistent with disclosed embodiments, a method for navigating a host vehicle is provided. The method may include receiving, from an image capture device, at least one image representative of an environment of the host vehicle. The method may also include analyzing the at least one image to identify an object in the environment of the host vehicle. The method may also include determining a location of the host vehicle. The method may also include receiving map information associated with the determined location of the host vehicle, wherein the map information includes elevation information associated with the environment of the host vehicle. The method may also include determining a distance from the host vehicle to the object based on at least the elevation information. The method may further include determining a navigational action for the host vehicle based on the determined distance.

Consistent with disclosed embodiments, a system for navigating a host vehicle is provided. The system may include a at least one processing device. The at least one processing device may be programmed to receive, from an image capture device, at least one image representative of an environment of the host vehicle. The at least one processing device may also be programmed to analyze the at least one image to identify an object in the environment of the host vehicle. The at least one processing device may also be programmed to determine a location of the host vehicle. The at least one processing device may also be programmed to receive map information associated with the determined location of the host vehicle, wherein the map information includes lane width information associated with a road in the environment of the host vehicle. The at least one processing device may also be programmed to determine a distance from the host vehicle to the object based on at least the lane width information. The at least one processing device may further be programmed to determine a navigational action for the host vehicle based on the determined distance.

Consistent with disclosed embodiments, a method for navigating a host vehicle is provided. The method may include receiving, from an image capture device, at least one image representative of an environment of the host vehicle. The method may also include analyzing the at least one image to identify an object in the environment of the host vehicle. The method may also include determining a location of the host vehicle. The method may also include receiving map information associated with the determined location of the host vehicle, wherein the map information includes lane width information associated with a road in the environment of the host vehicle. The method may also include determining a distance from the host vehicle to the object based on at least the lane width information. The method may further include determining a navigational action for the host vehicle based on the determined distance.

Consistent with disclosed embodiments, a system for navigating a host vehicle is provided. The system may include a at least one processing device. The at least one processing device may be programmed to receive, from an image capture device, at least one image representative of an environment of the host vehicle. The at least one processing device may also be programmed to analyze at least one of the plurality of images to identify a first object in the environment of the vehicle, wherein the first object and a road on which the first object is located are at least partially obscured by a second object in the environment of the vehicle. The at least one processing device may also be programmed to determine scale change information for the first object based on at least two of the plurality of images. The at least one processing device may also be programmed to determine, based on the determined scale change information for the first object, a lane position of the first object relative to a lane of the road on which the first object is located. The at least one processing device may also be programmed to determine a navigational action for the host vehicle based on the determined lane position of the first object.

Consistent with disclosed embodiments, a method for navigating a host vehicle is provided. The method may include receiving, from an image capture device, a plurality of images representative of an environment of the host vehicle. The method may also include analyzing at least one of the plurality of images to identify a first object in the environment of the vehicle, wherein the first object and a road on which the first object is located are at least partially obscured by a second object in the environment of the vehicle. The method may also include determining scale change information for the first object based on at least two of the plurality of images. The method may also include determining, based on the determined scale change information for the first object, a lane position of the first object relative to a lane of the road on which the first object is located. The method may further include determining a navigational action for the host vehicle based on the determined lane position of the first object.

Consistent with disclosed embodiments, a system for navigating a host vehicle is provided. The system may include a at least one processing device. The at least one processing device may be programmed to receive, from an image capture device, a plurality of images representative of an environment of the host vehicle. The at least one processing device may also be programmed to analyze at least one of the plurality of images to identify a target vehicle in the environment of the host vehicle. The at least one processing device may also be programmed to receive map information associated with an environment of the host vehicle. The at least one processing device may also be programmed to determine a trajectory of the target vehicle over a time period based on analysis of the plurality of images. The at least one processing device may also be programmed to determine, based on the determined trajectory of the target vehicle and the map information, a position of the target vehicle relative to a road in the environment of the host vehicle. The at least one processing device may further be programmed to determine a navigational action for the host vehicle based on the determined position of the target vehicle.

Consistent with disclosed embodiments, a method for navigating a host vehicle is provided. The method may include receiving, from an image capture device, a plurality of images representative of an environment of the host vehicle. The method may also include analyzing at least one of the plurality of images to identify a target vehicle in the environment of the host vehicle. The method may also include receiving map information associated with an environment of the host vehicle. The method may also include determining a trajectory of the target vehicle over a time period based on analysis of the plurality of images. The method may also include determining, based on the determined trajectory of the target vehicle and the map information, a position of the target vehicle relative to a road in the environment of the host vehicle. The method may also include determining a navigational action for the host vehicle based on the determined position of the target vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 8 shows a sparse map for providing autonomous vehicle navigation, consistent with the disclosed embodiments.

FIG. 22 illustrates a process of clustering vehicle trajectories associated with vehicles, consistent with the disclosed embodiments.

FIG. 39B illustrates an exemplary received images, consistent with the disclosed embodiments.

DETAILED DESCRIPTION

Figure 1:
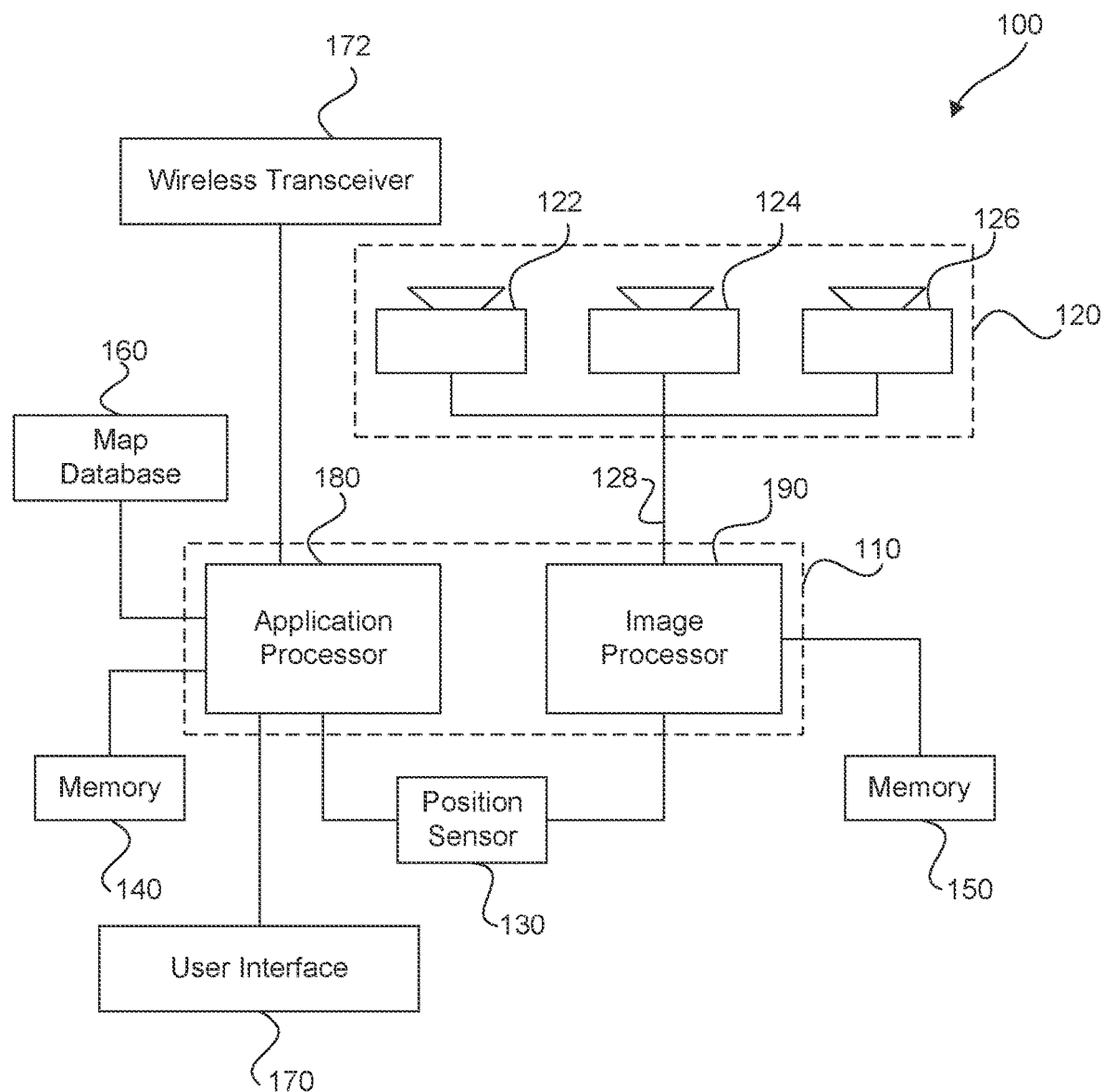
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
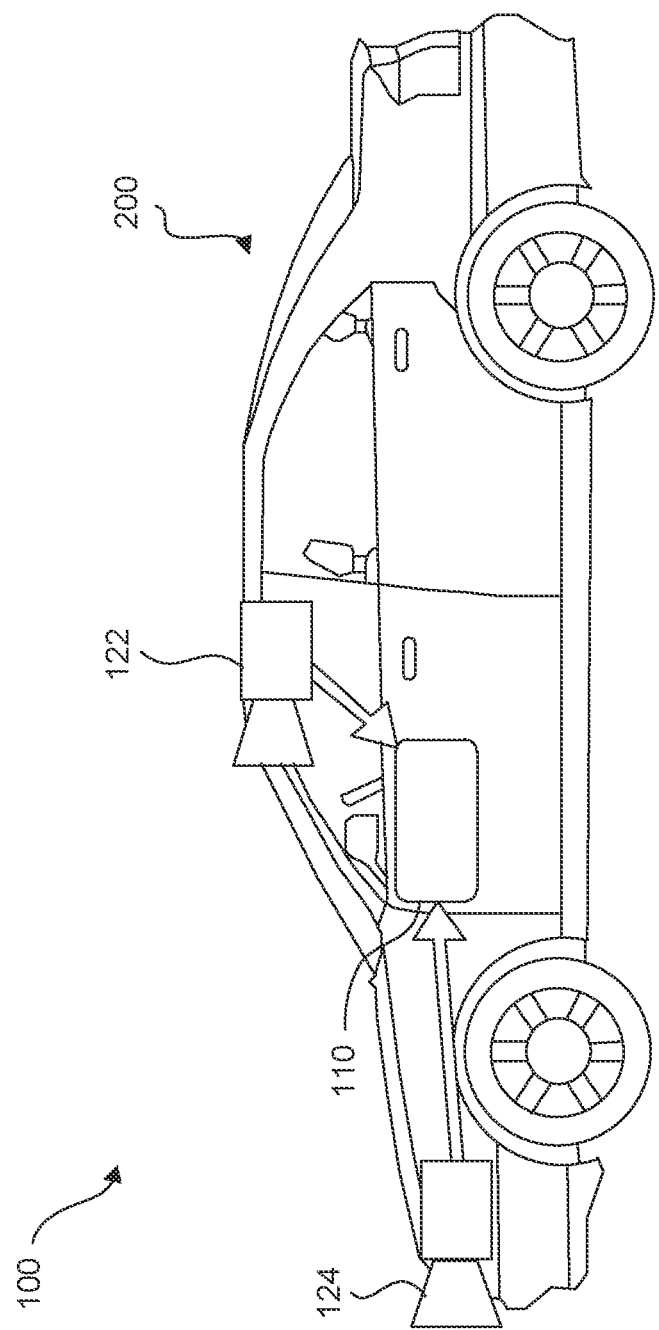
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
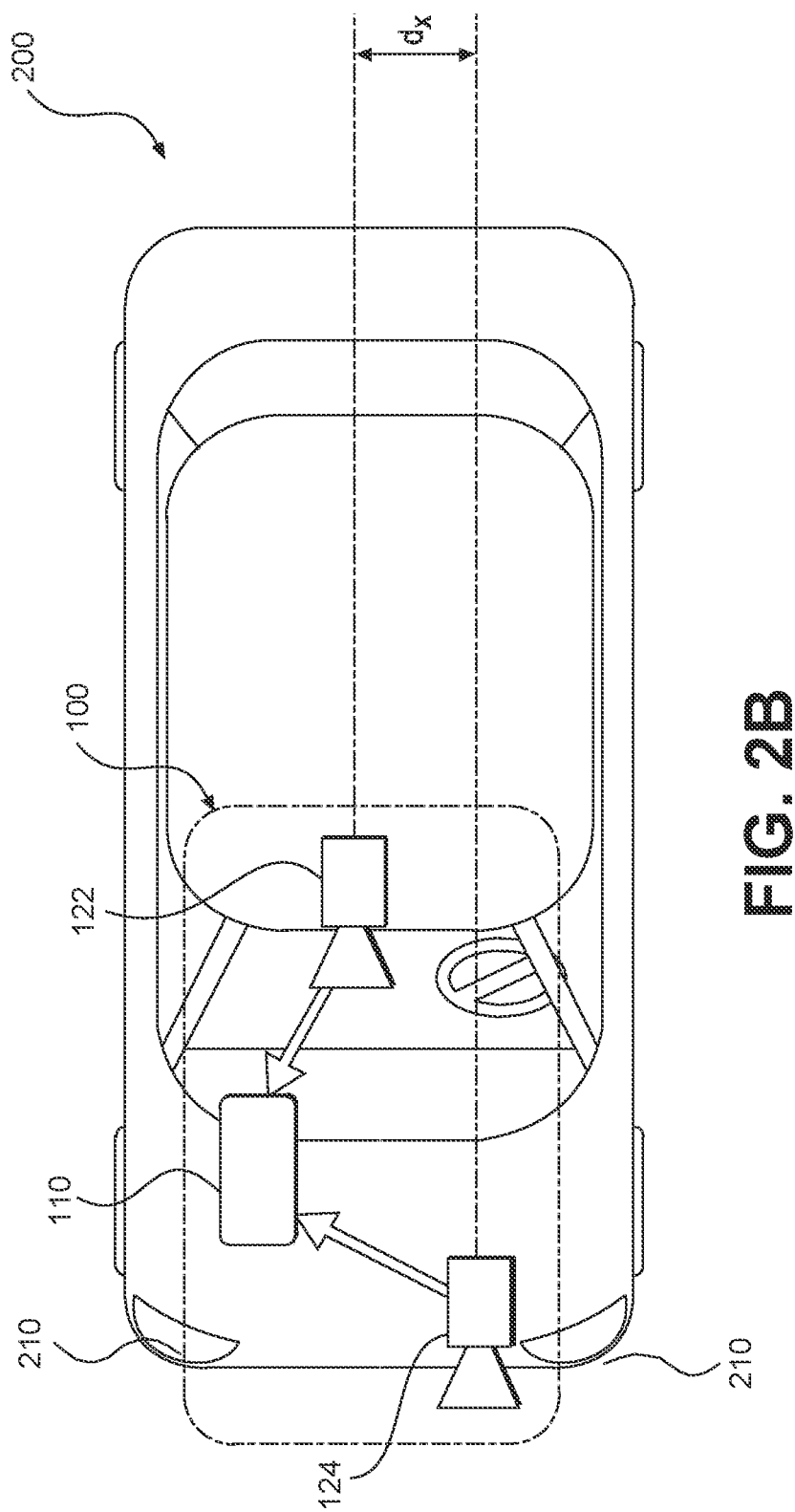
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
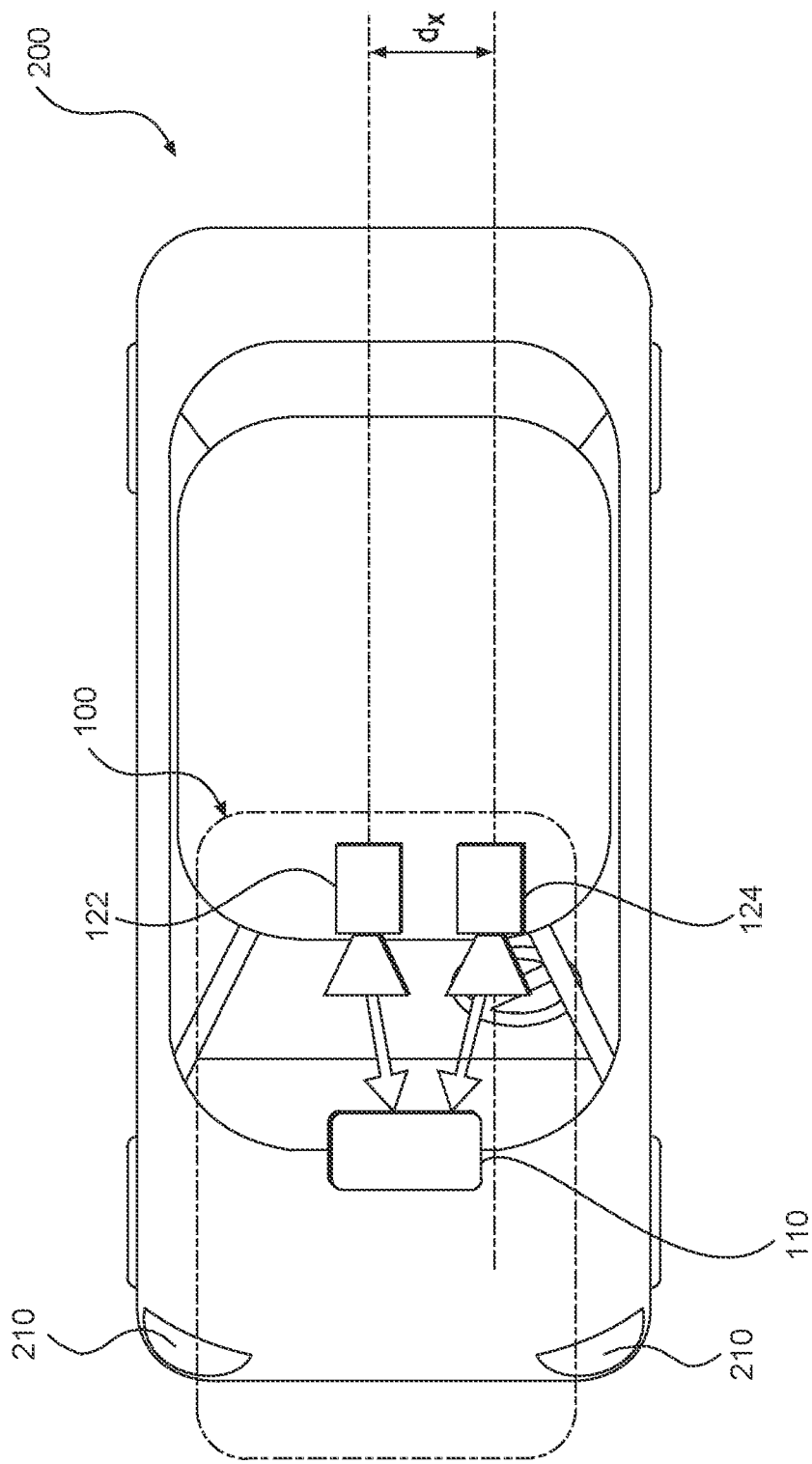
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
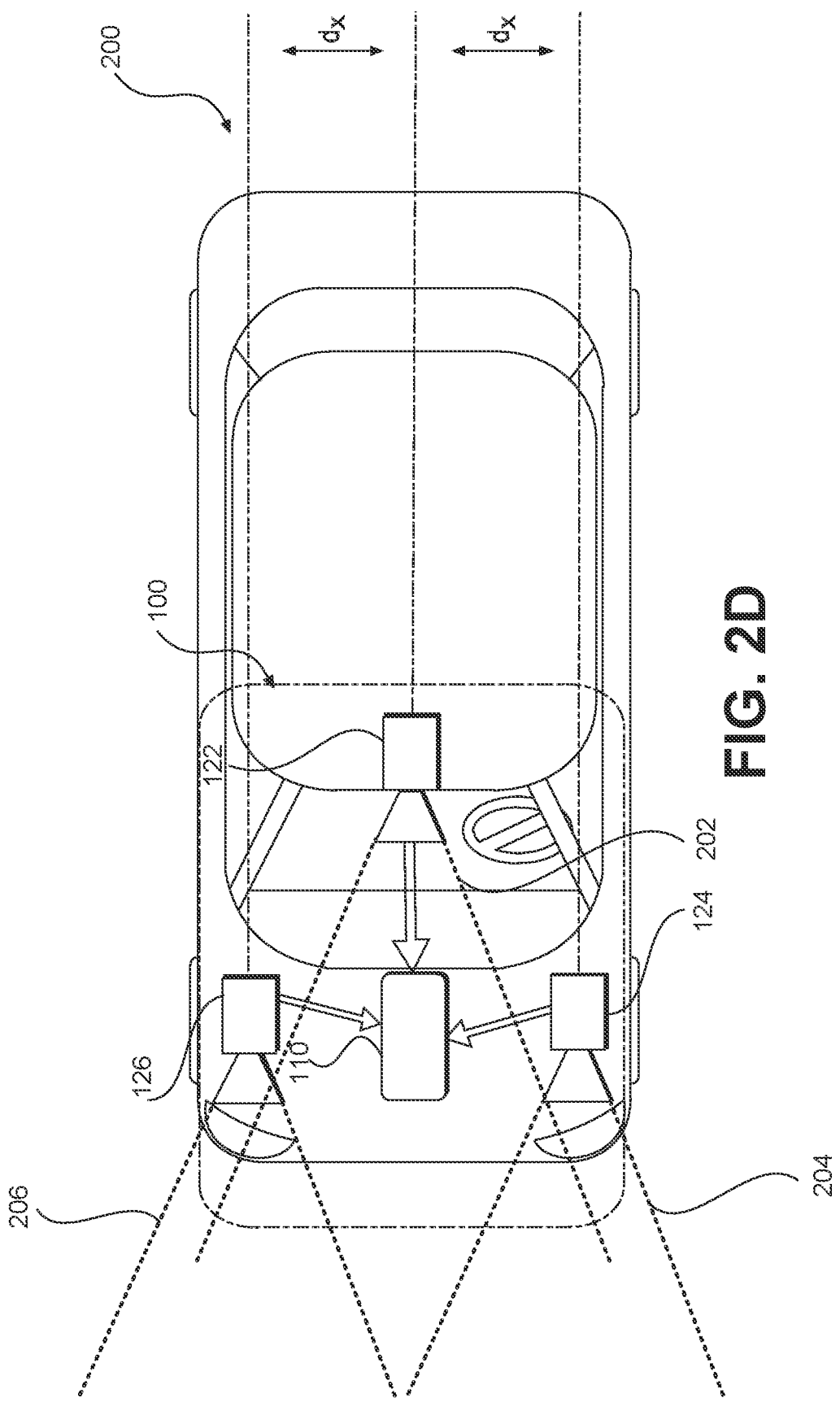
FIG. 2D is a diagrammatic top view representation of yet another embodiment of a vehicle including a system consistent with the disclosed embodiments.
Figure 2E:
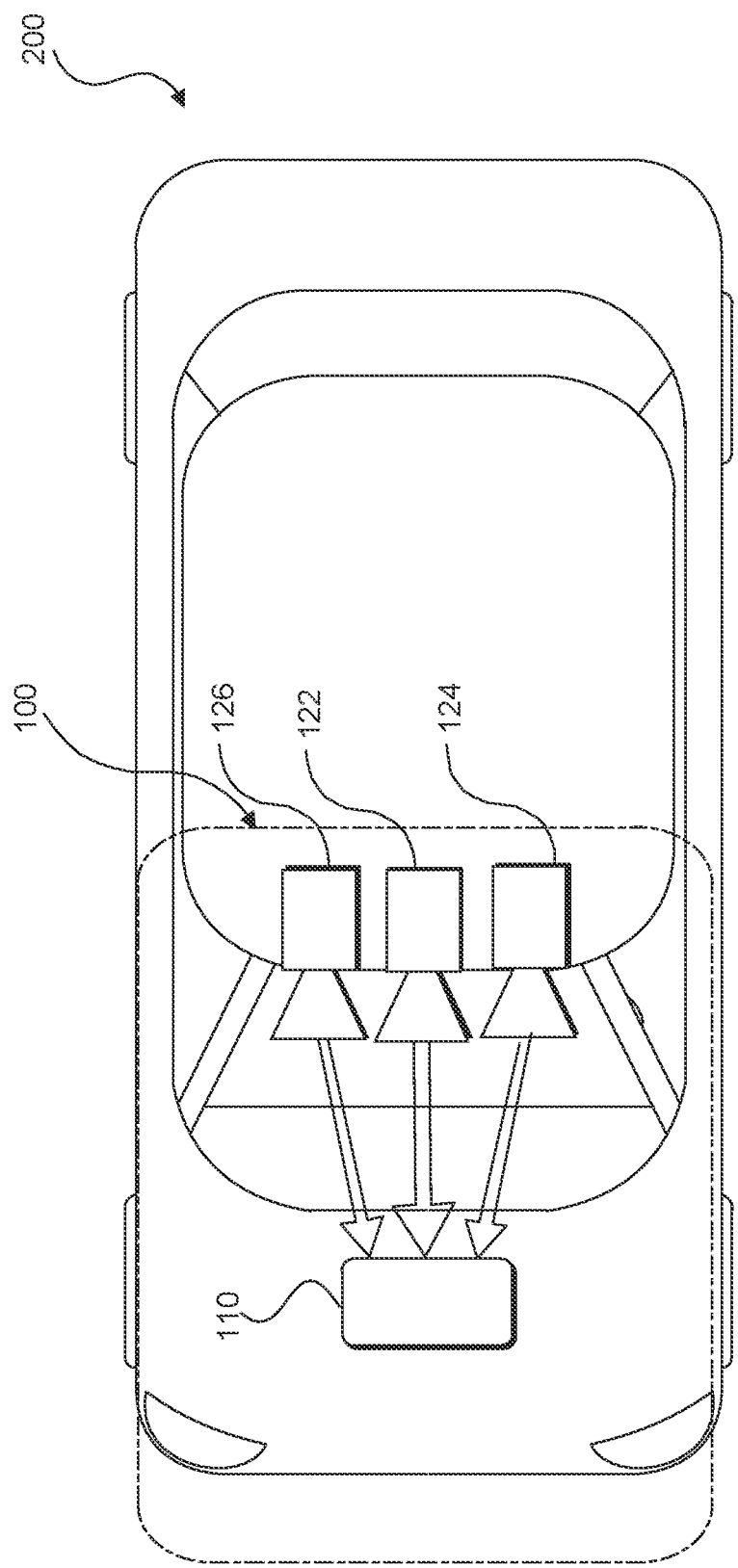
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126)

disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
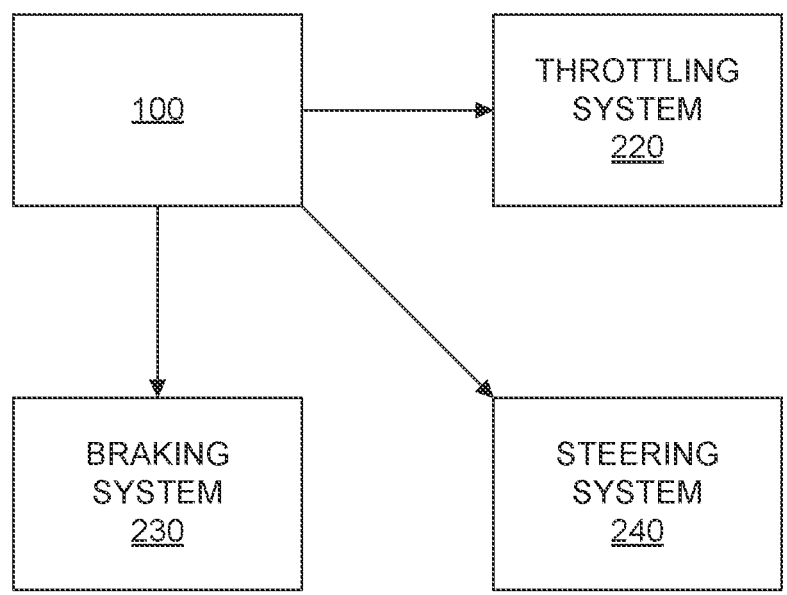
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
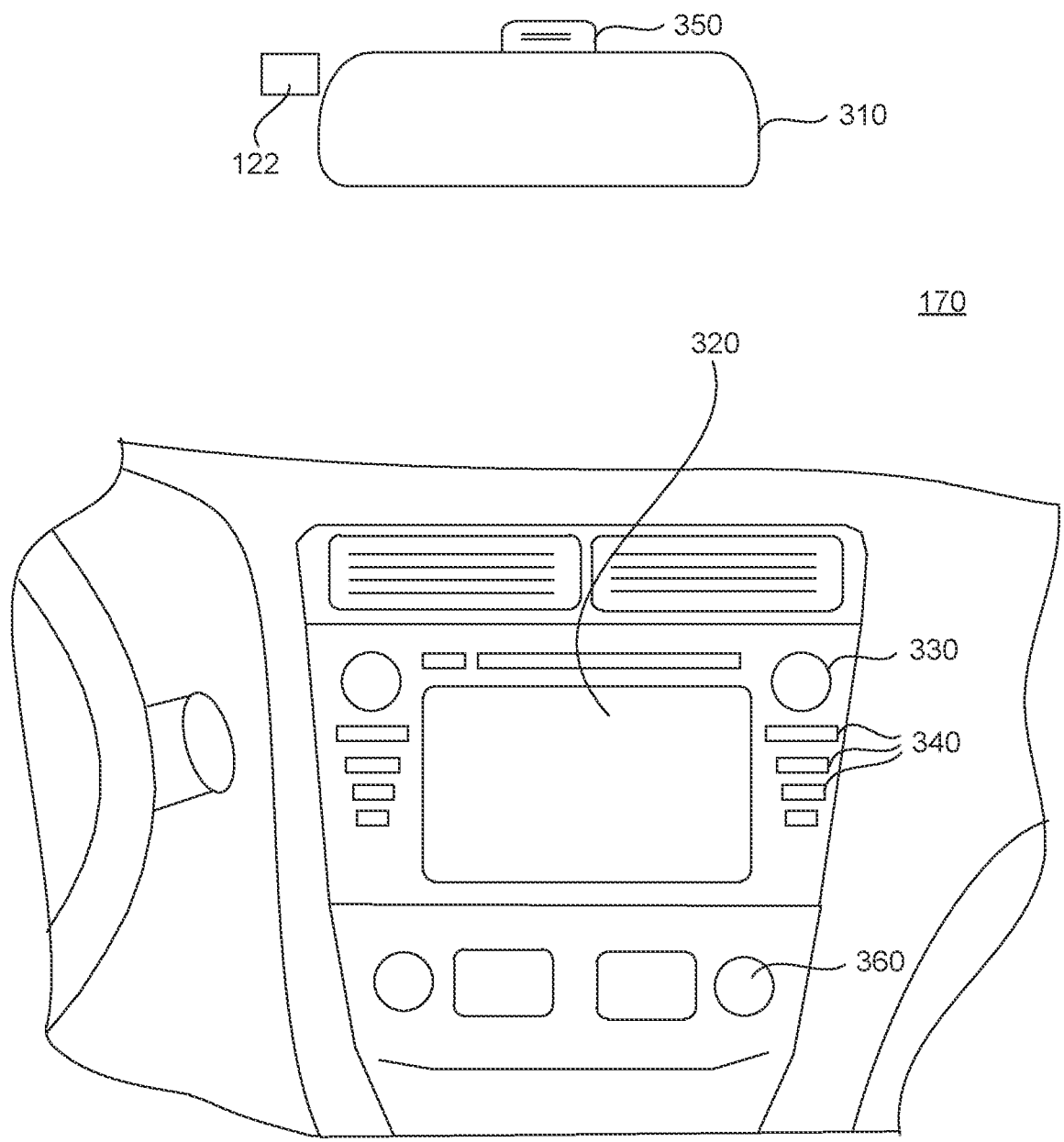
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
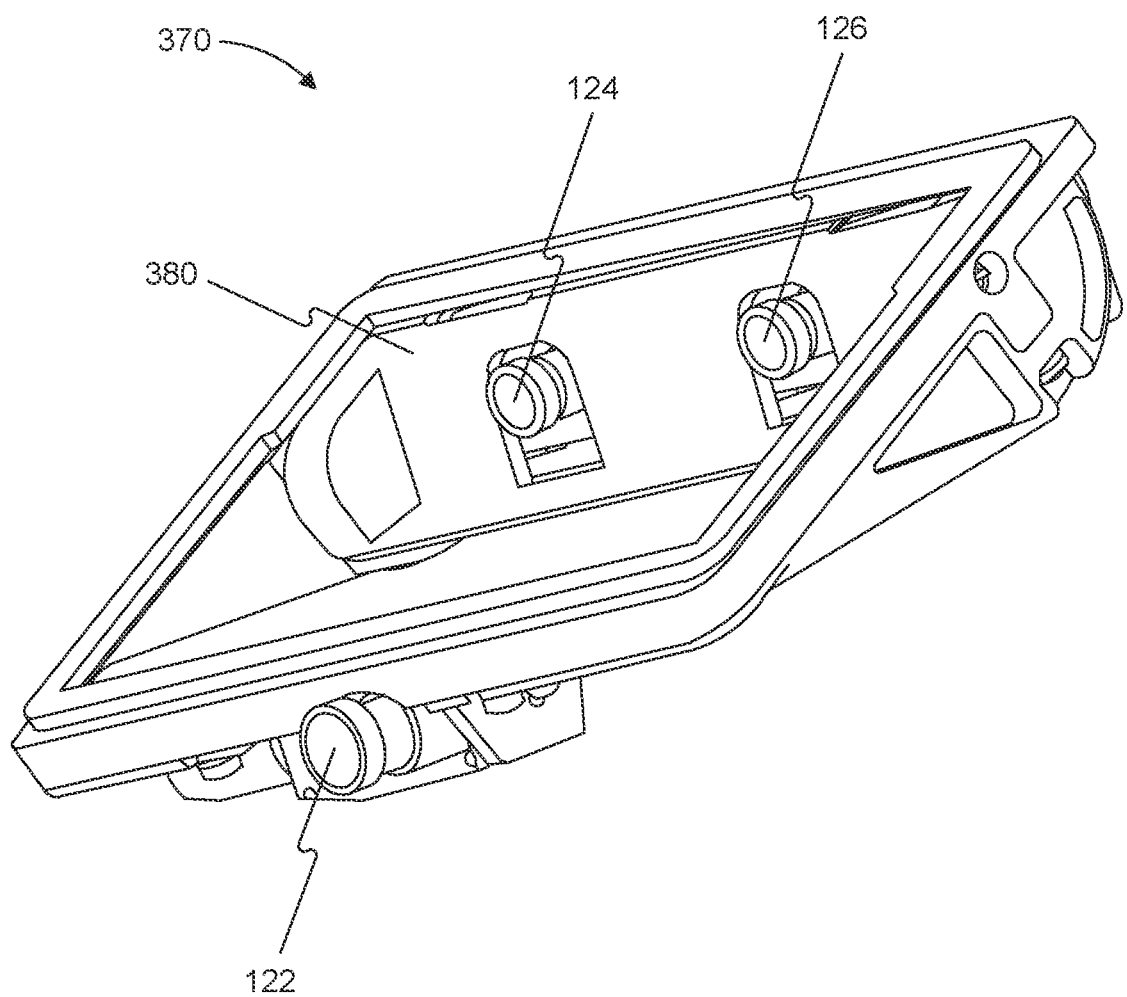
FIG. 3B is an illustration of an example of a camera mount that is configured to be positioned behind a rearview mirror and against a vehicle windshield consistent with the disclosed embodiments.
Figure 3C:
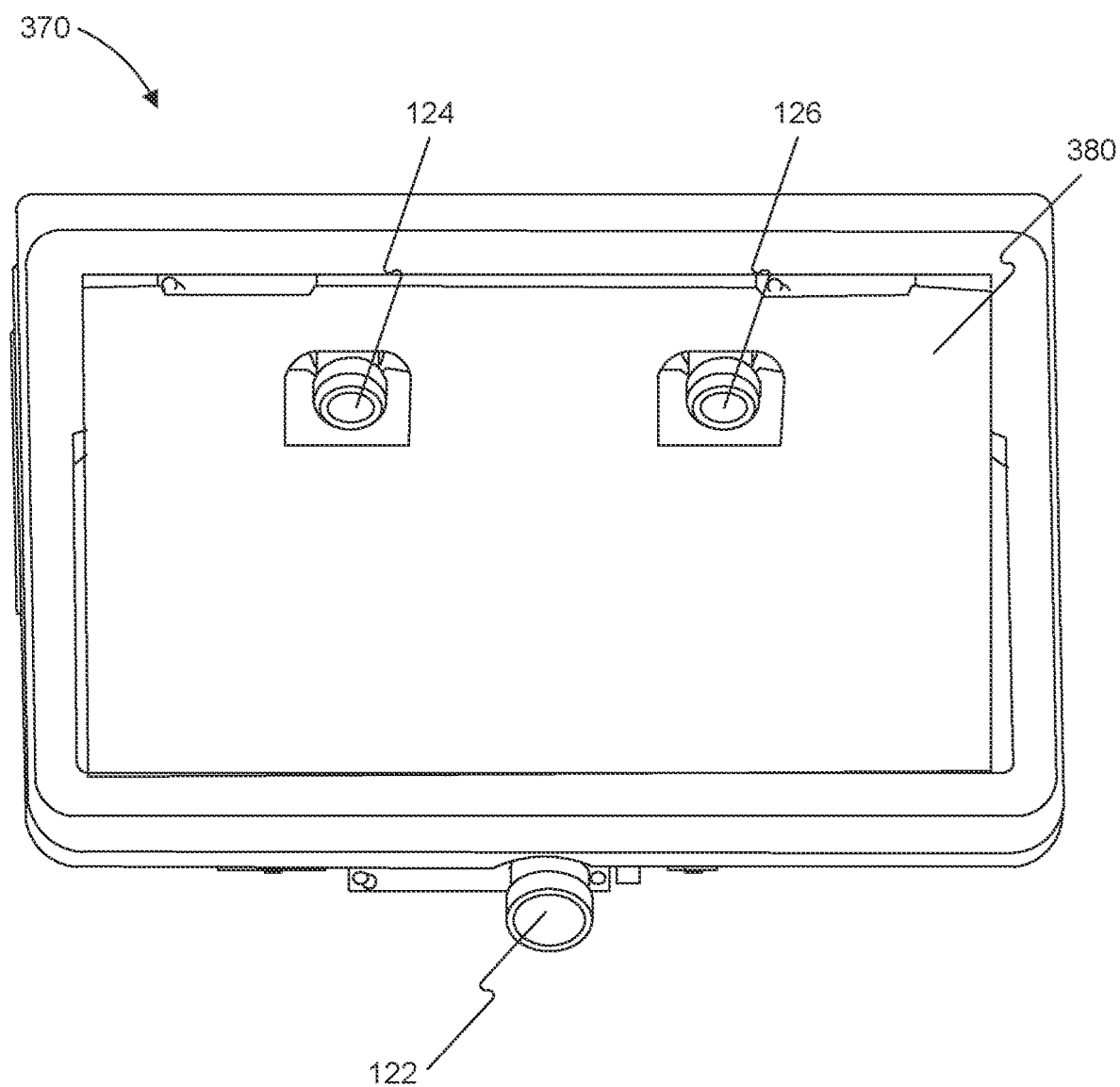
FIG. 3C is an illustration of the camera mount shown in FIG. 3B from a different perspective consistent with the disclosed embodiments.
Figure 3D:
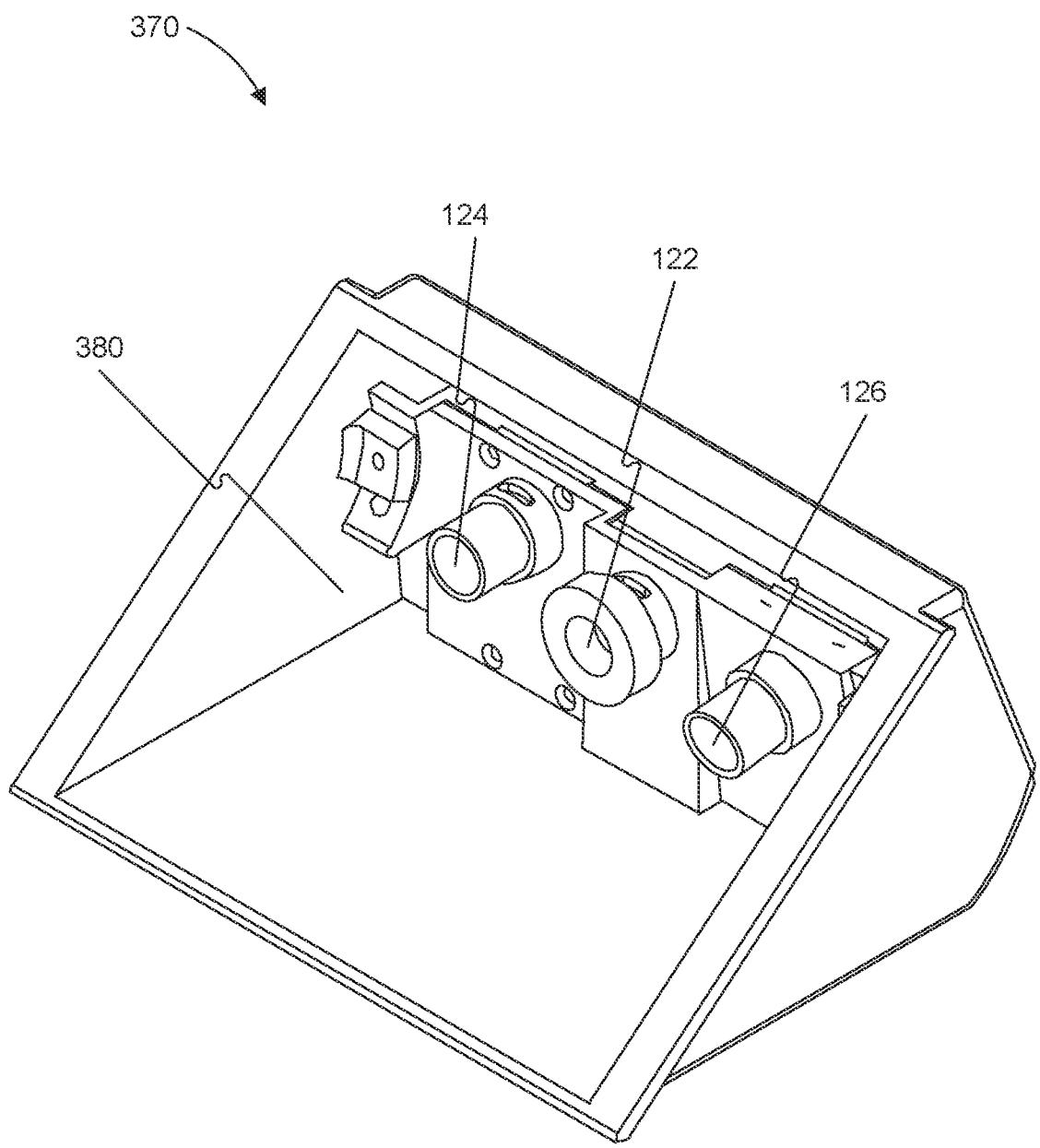
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
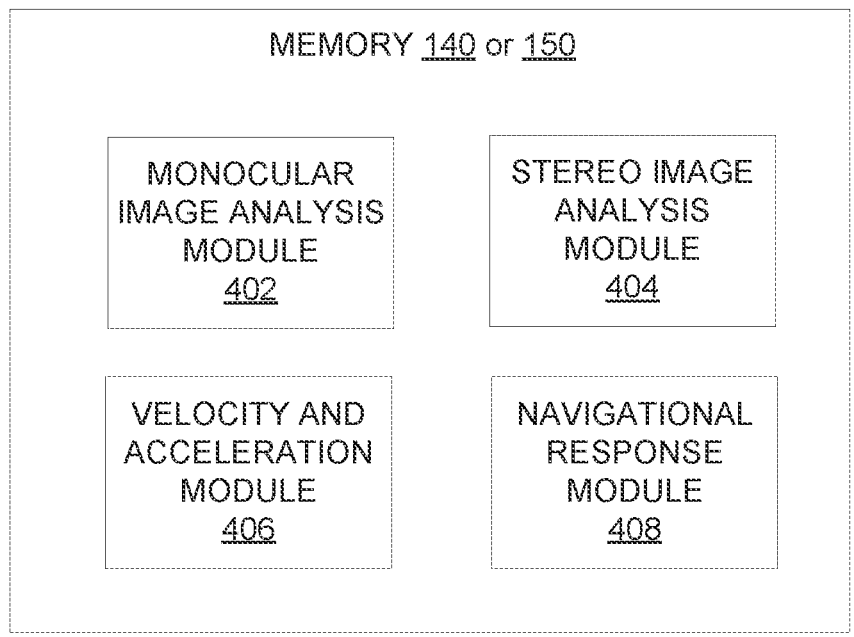
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
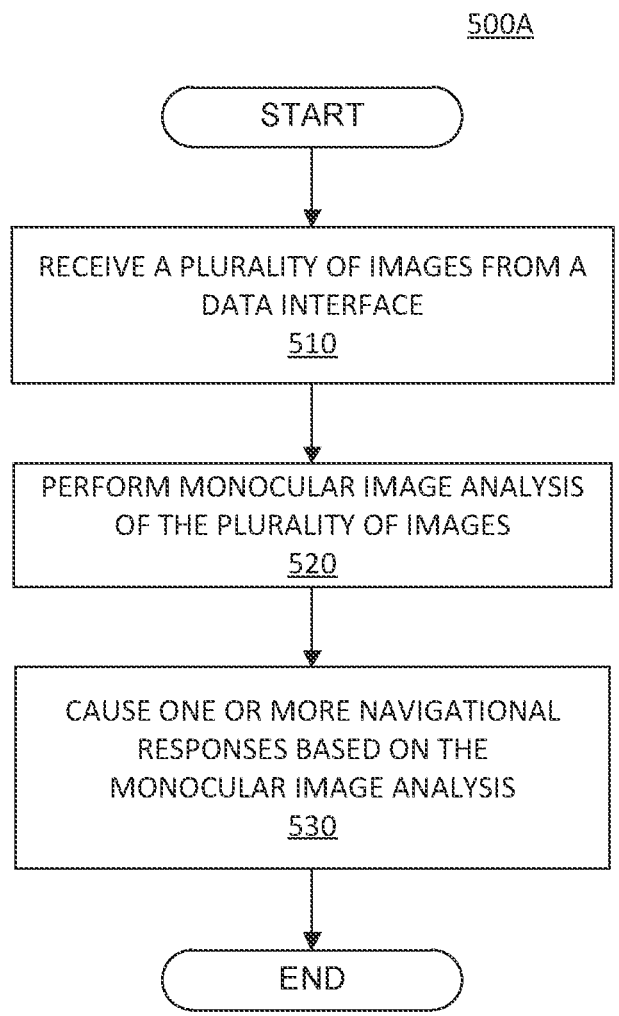
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
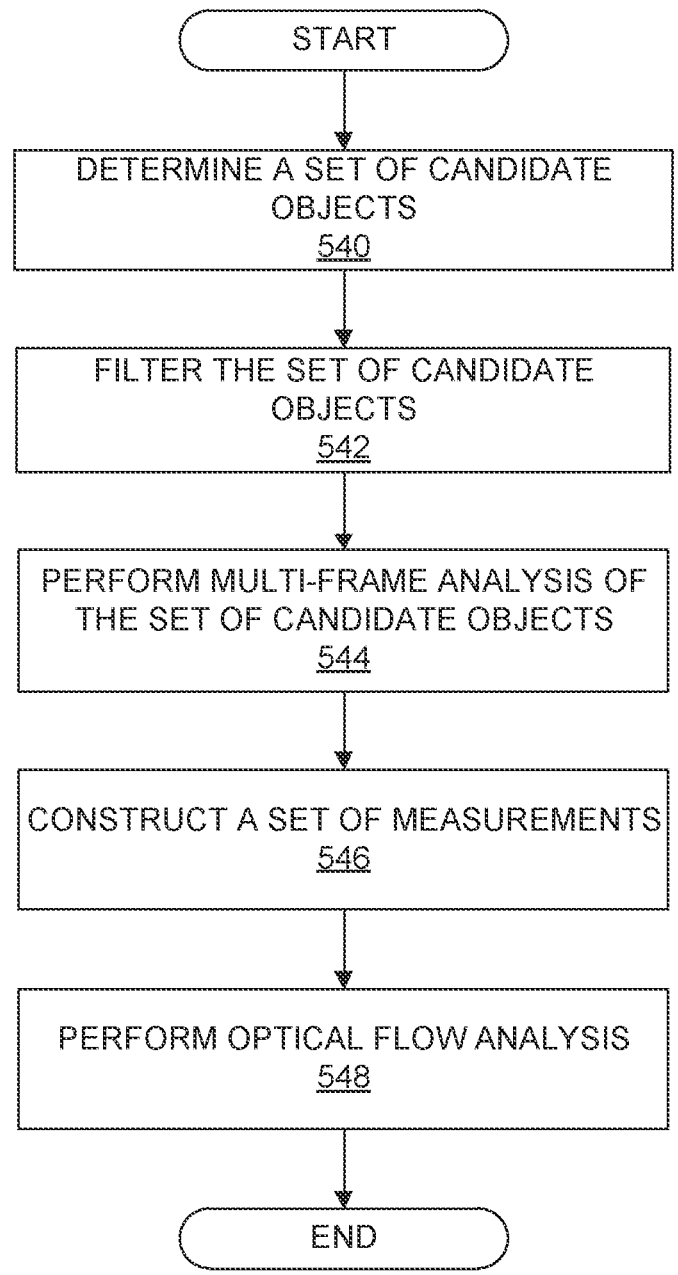
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
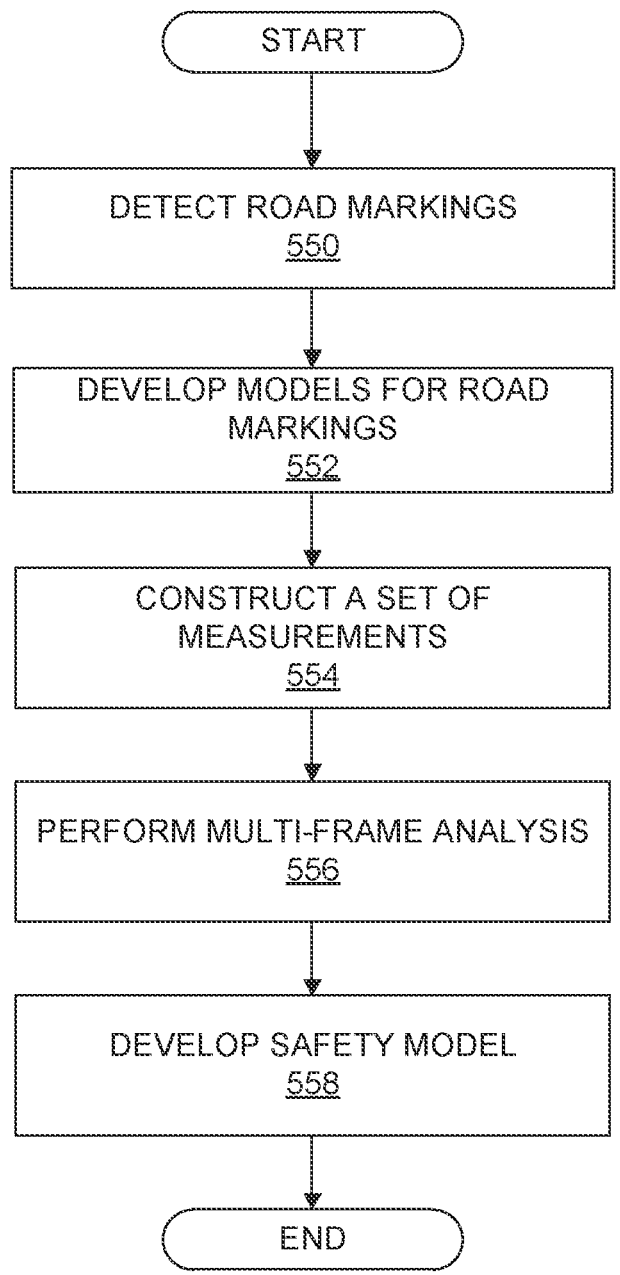
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
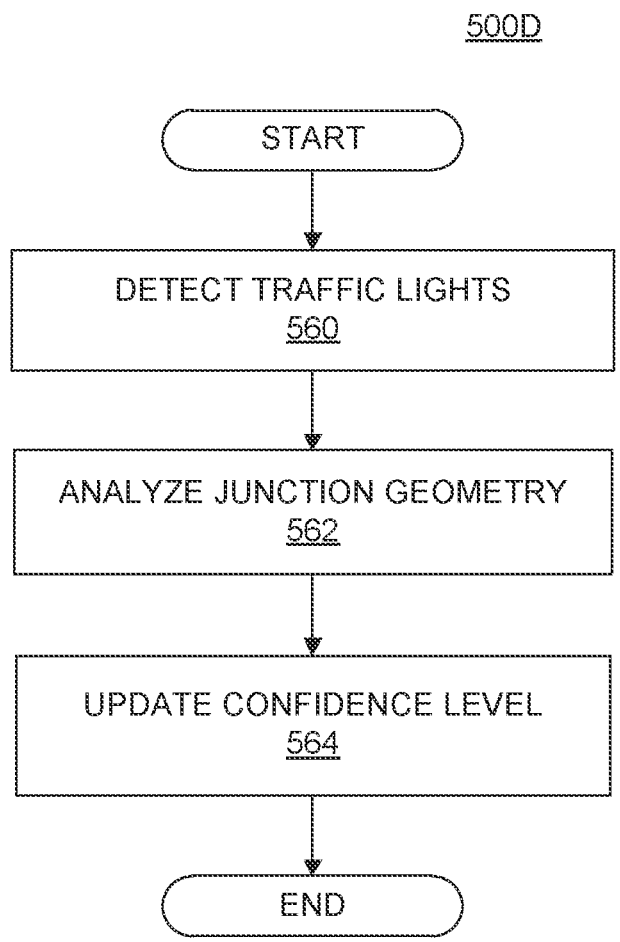
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
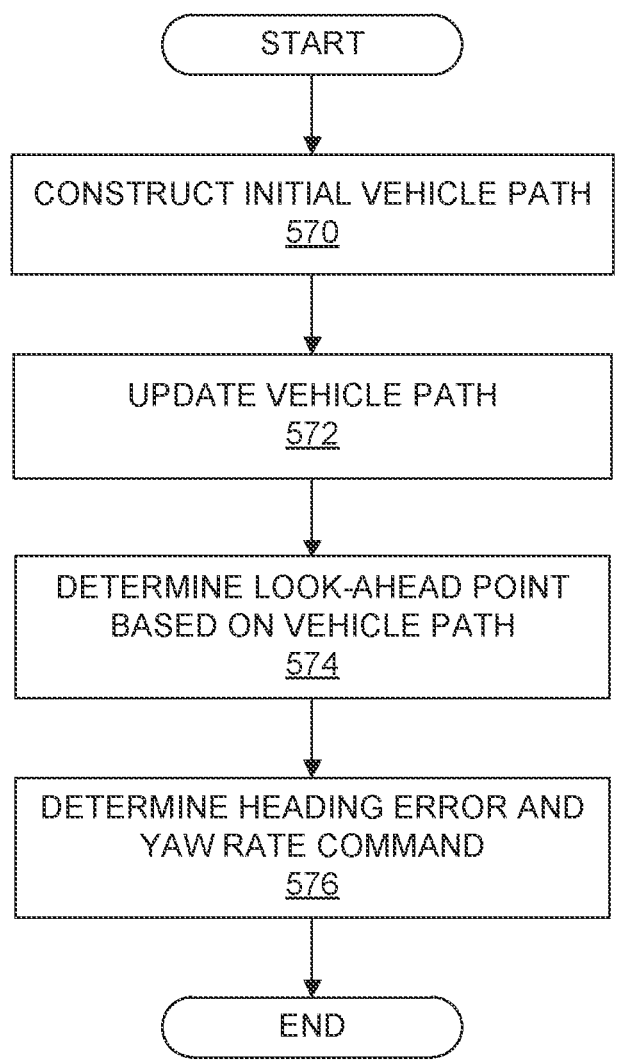
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates $(x, z)$, and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
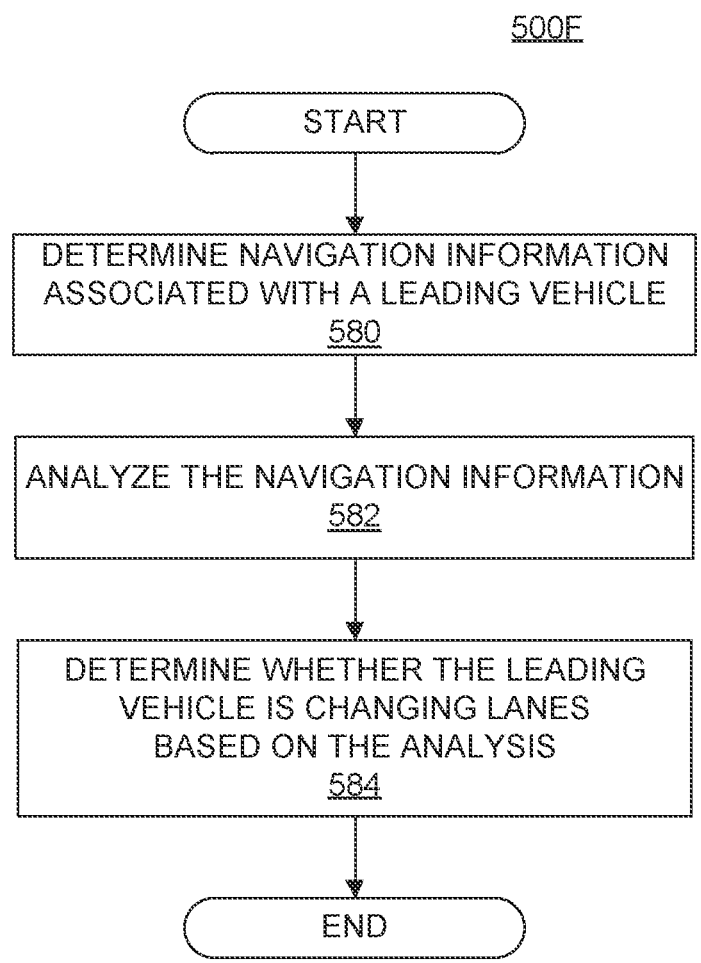
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
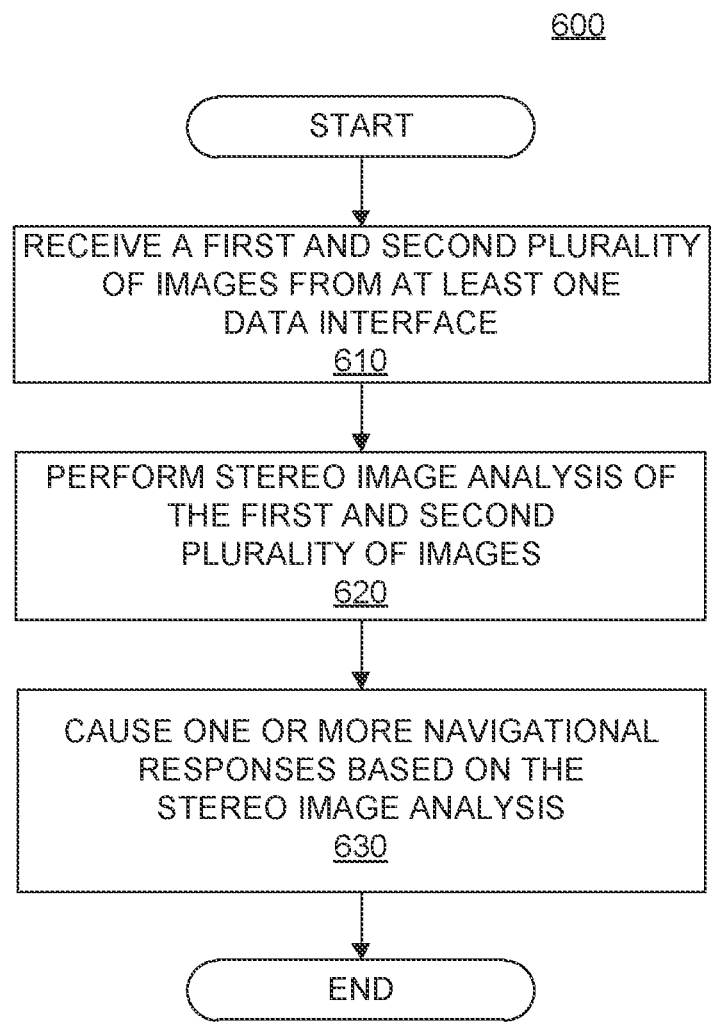
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
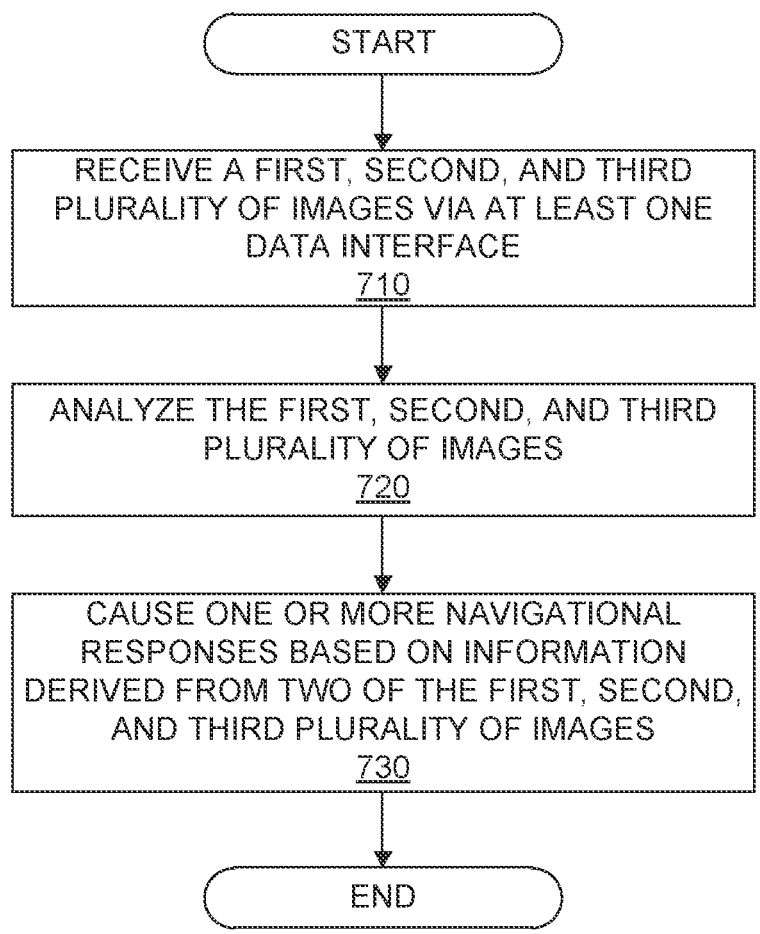
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps that may be used in navigating a vehicle. Such sub-maps may be referred to as local maps, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of during navigation by dead reckoning may be minimized.

Figure 9A:
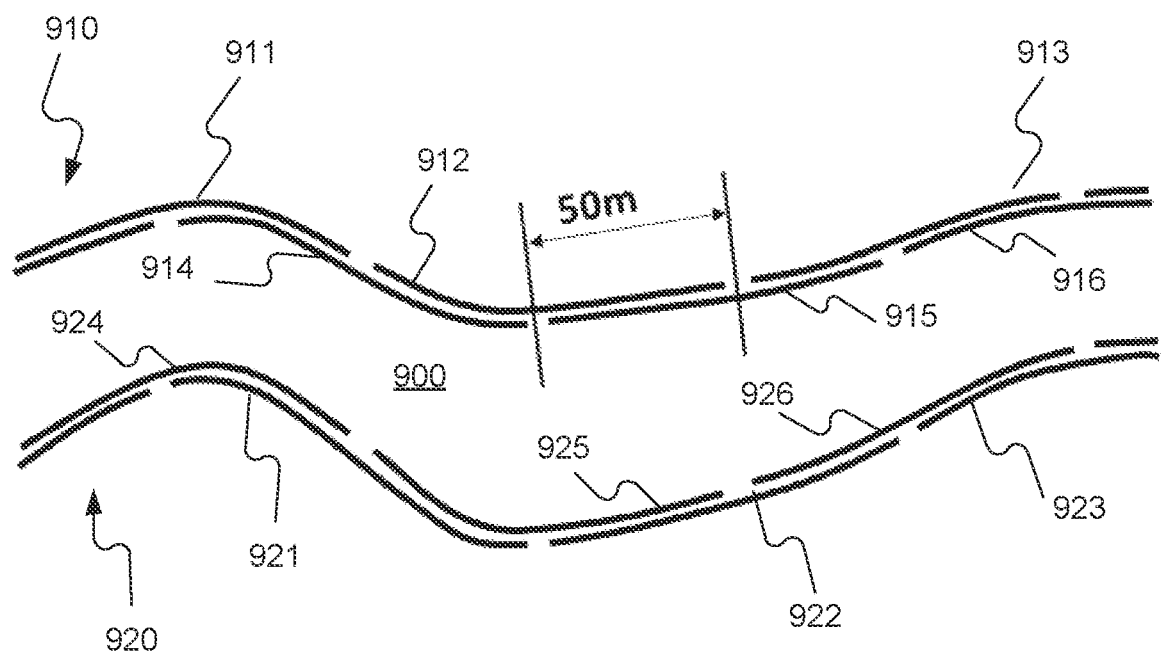
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913.

The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
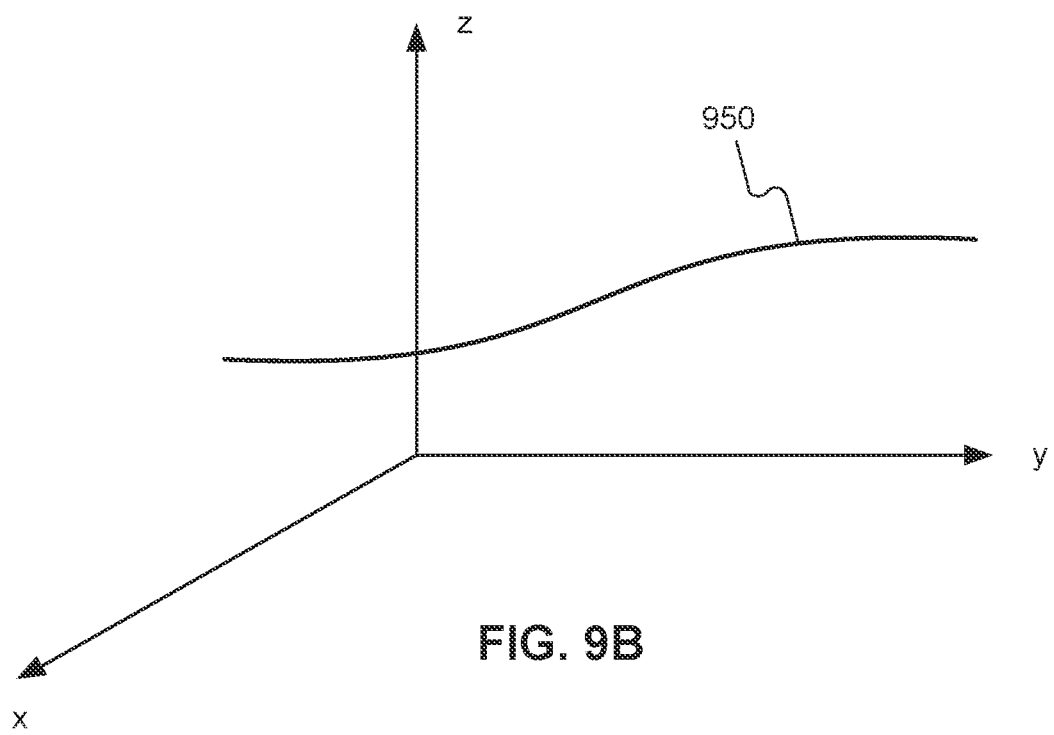
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
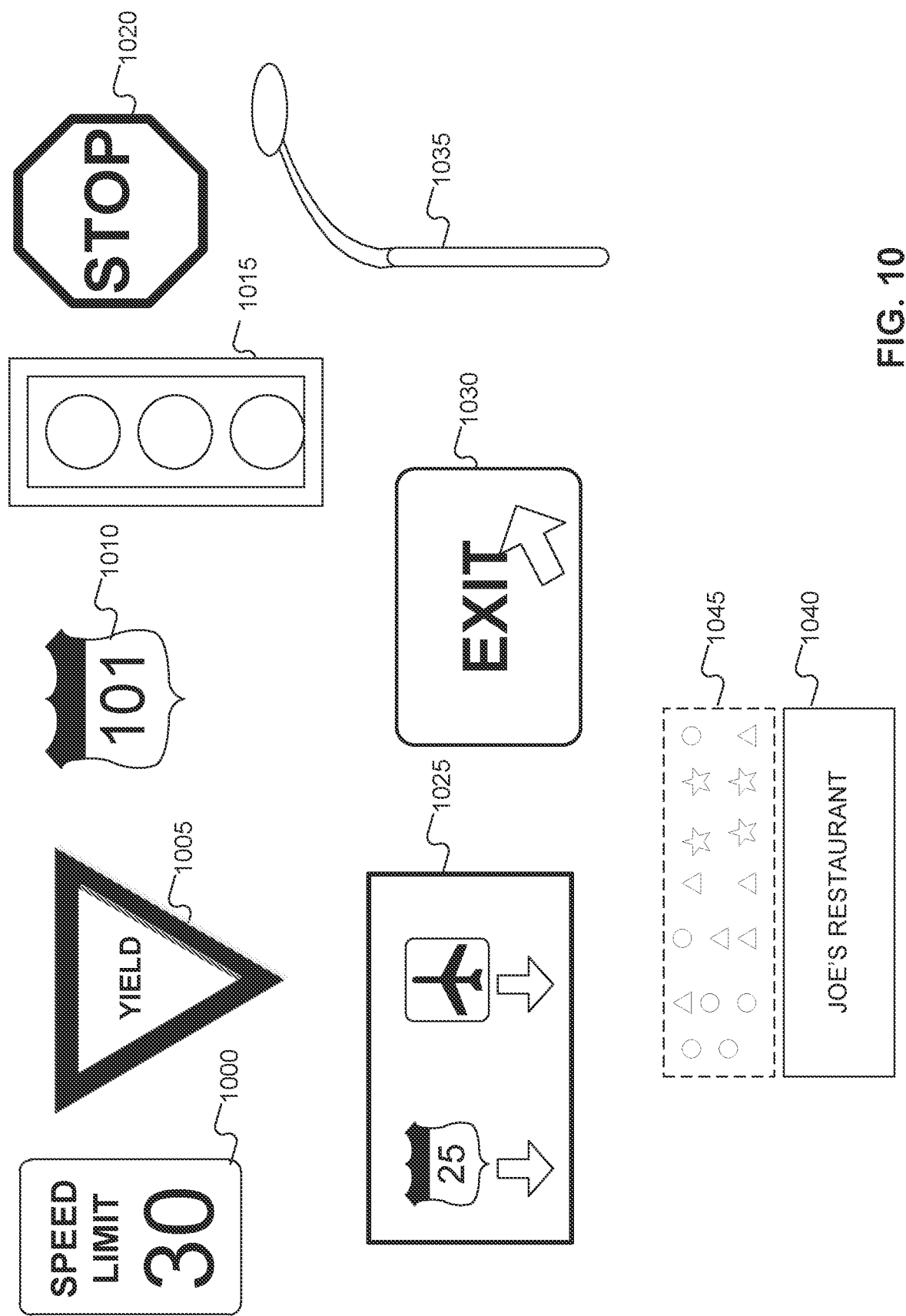
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type-what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 800 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature (e.g., condensed image signature 1045) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
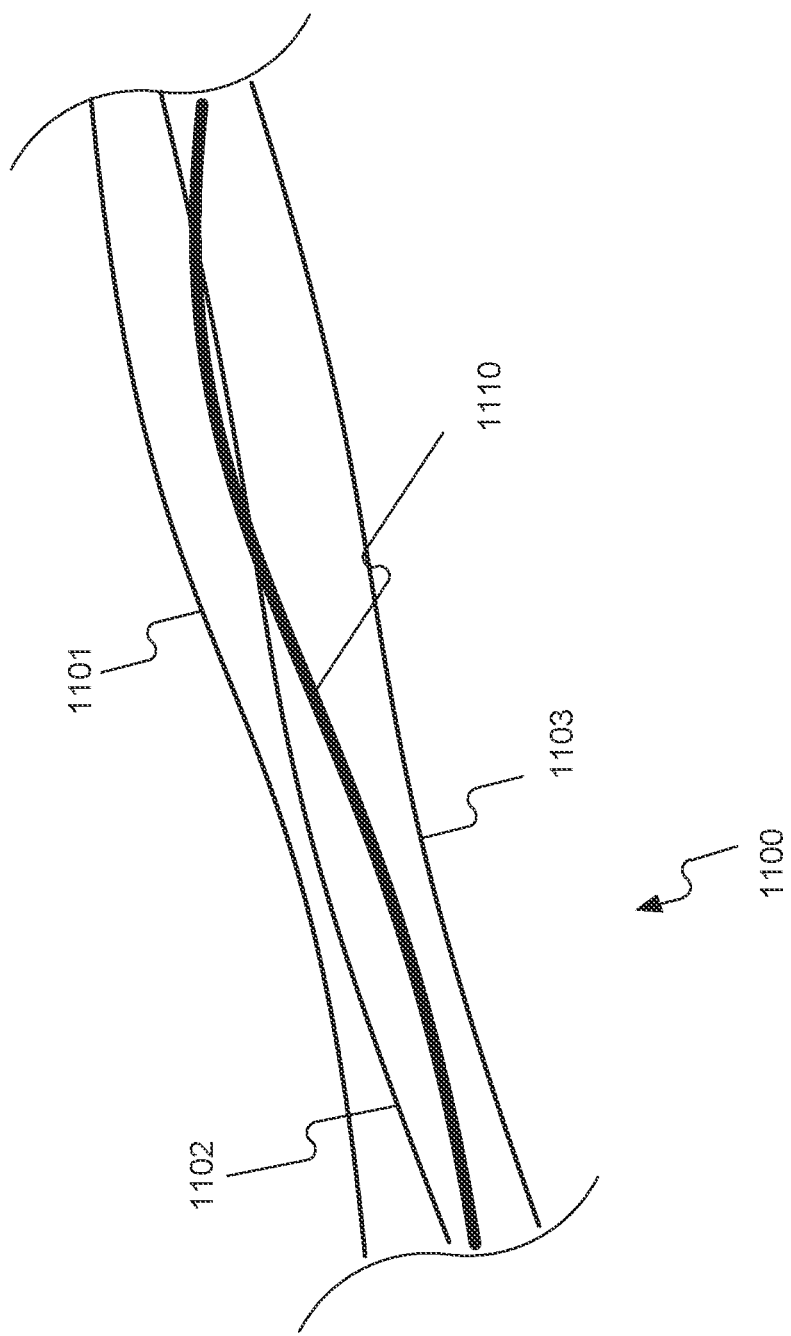
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

Figure 11B:
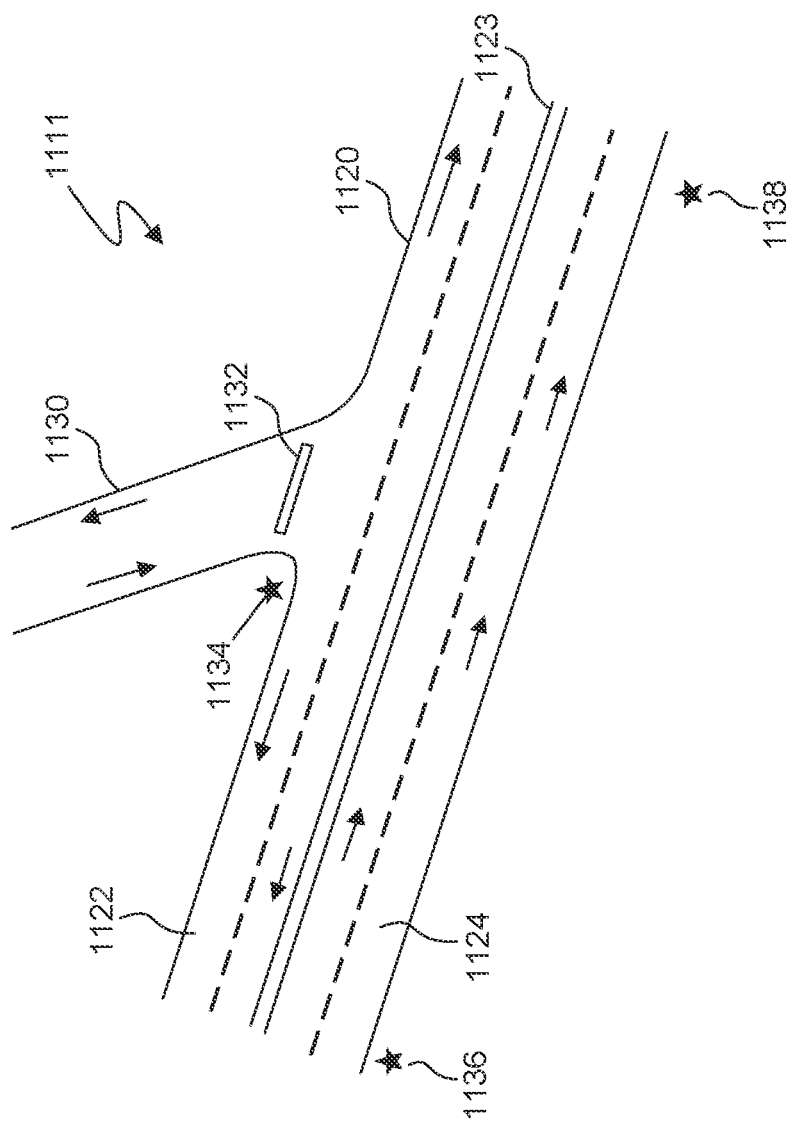
FIGS. 11B and 11C show target trajectories along a multi-lane road consistent with disclosed embodiments.
Figure 11C:
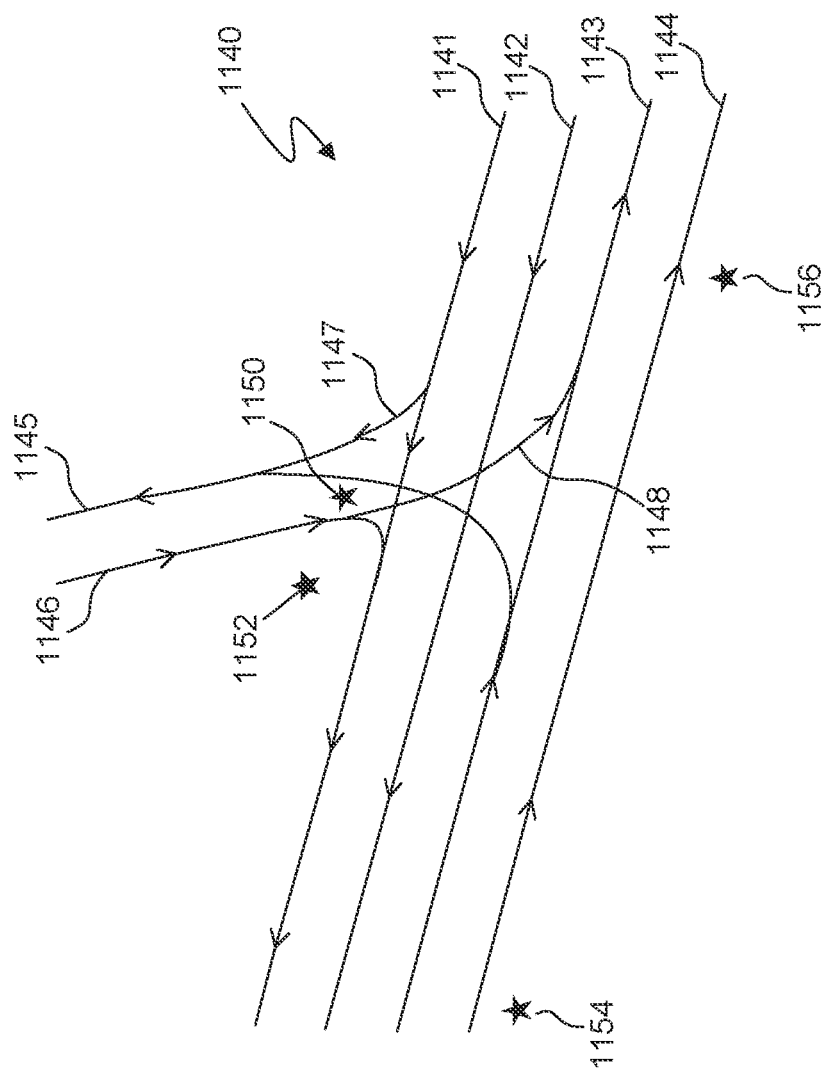

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
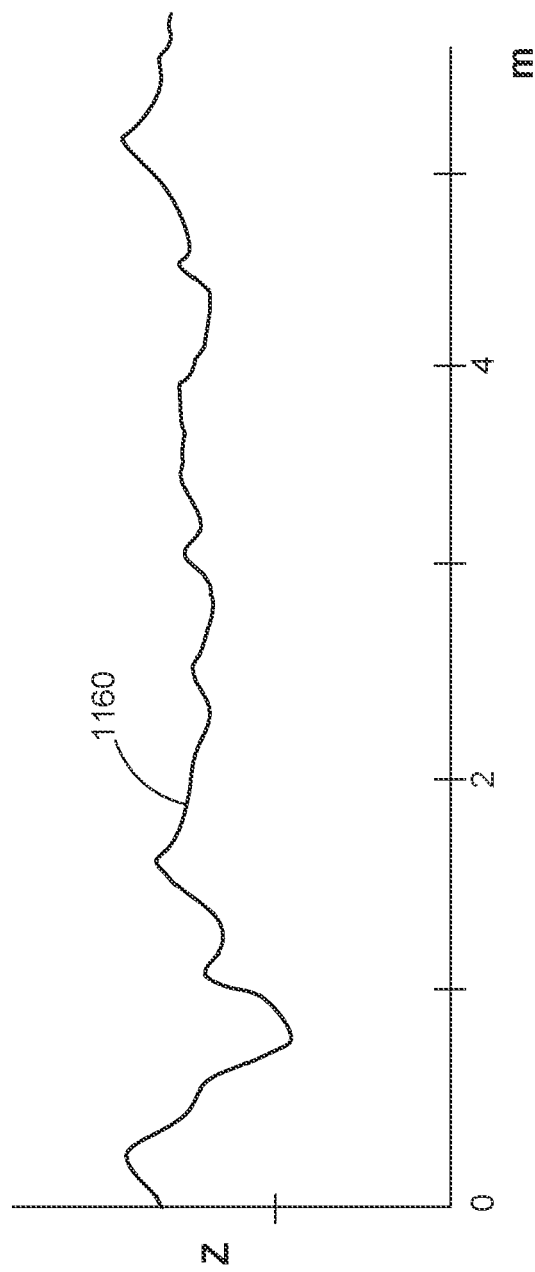
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

In some embodiments, the disclosed systems and methods may generate a sparse map for autonomous vehicle navigation. For example, disclosed systems and methods may use crowdsourced data for generation of a sparse that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated.

For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
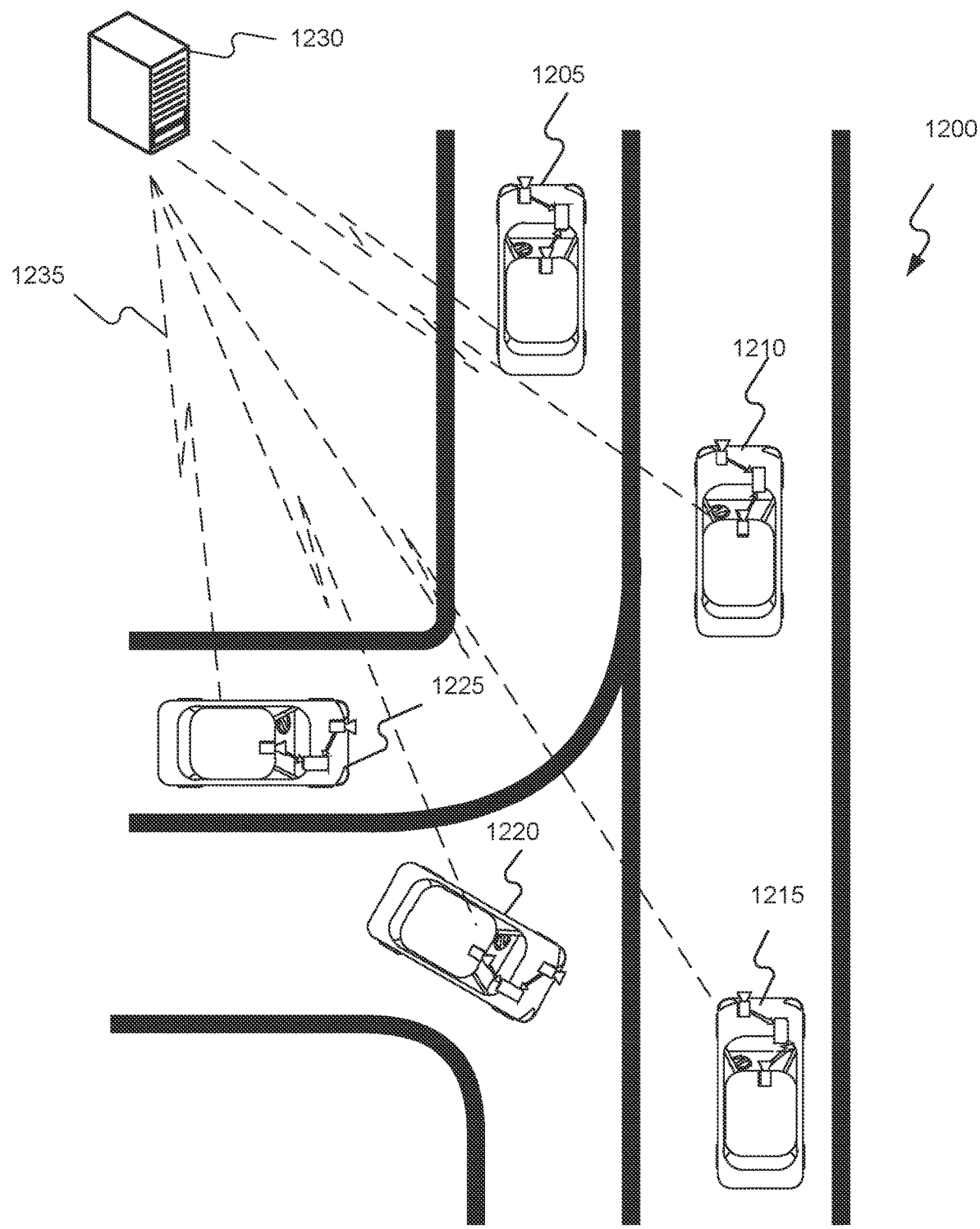
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega^2+f*\Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
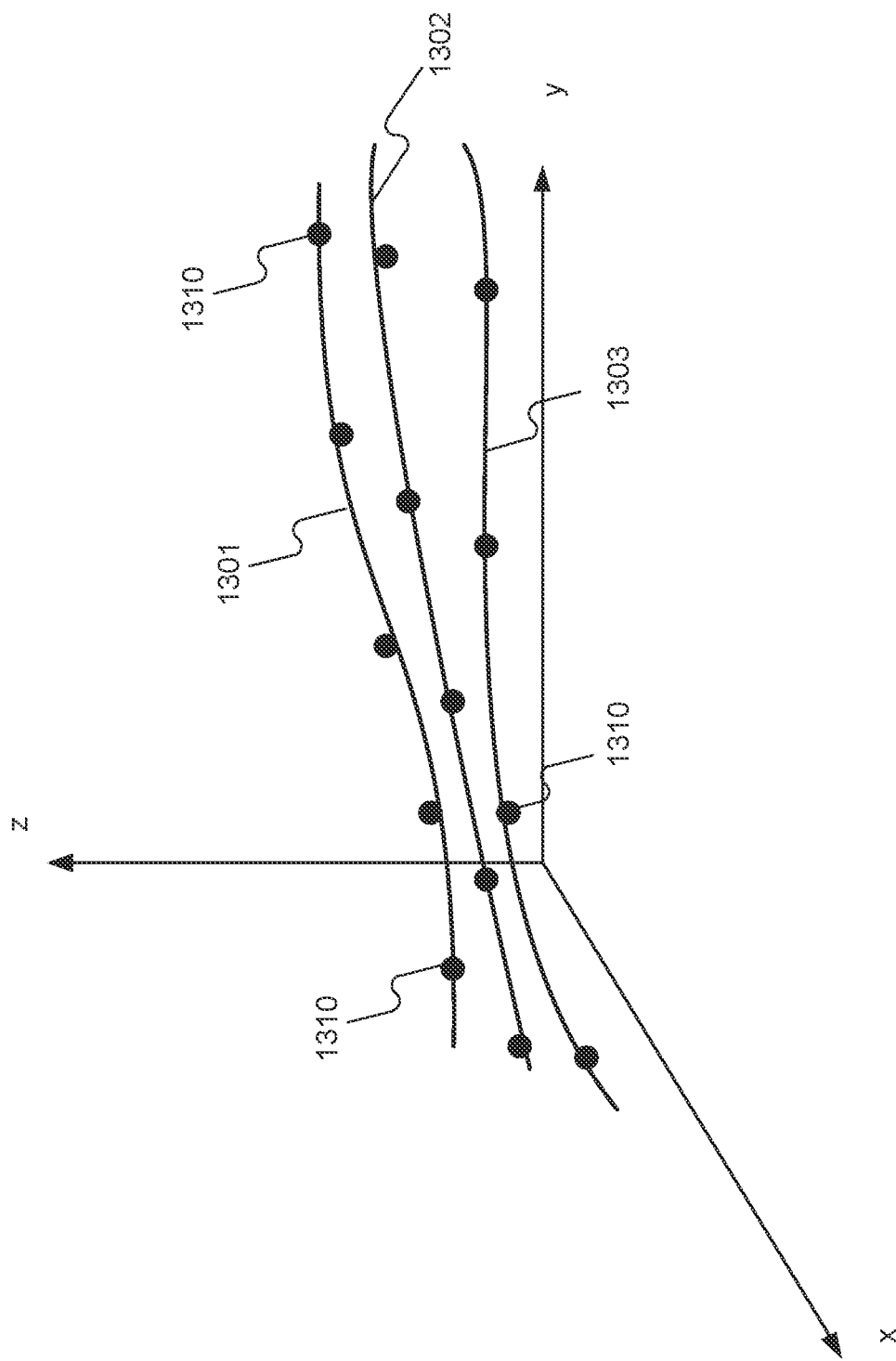
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
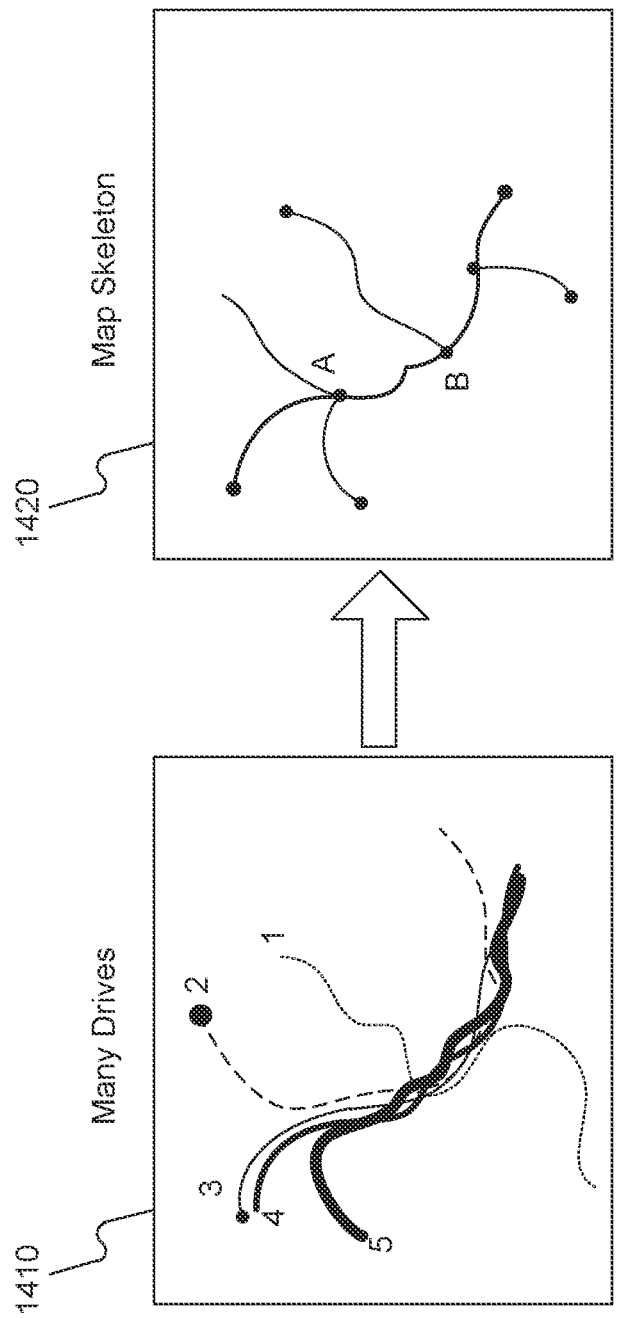
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
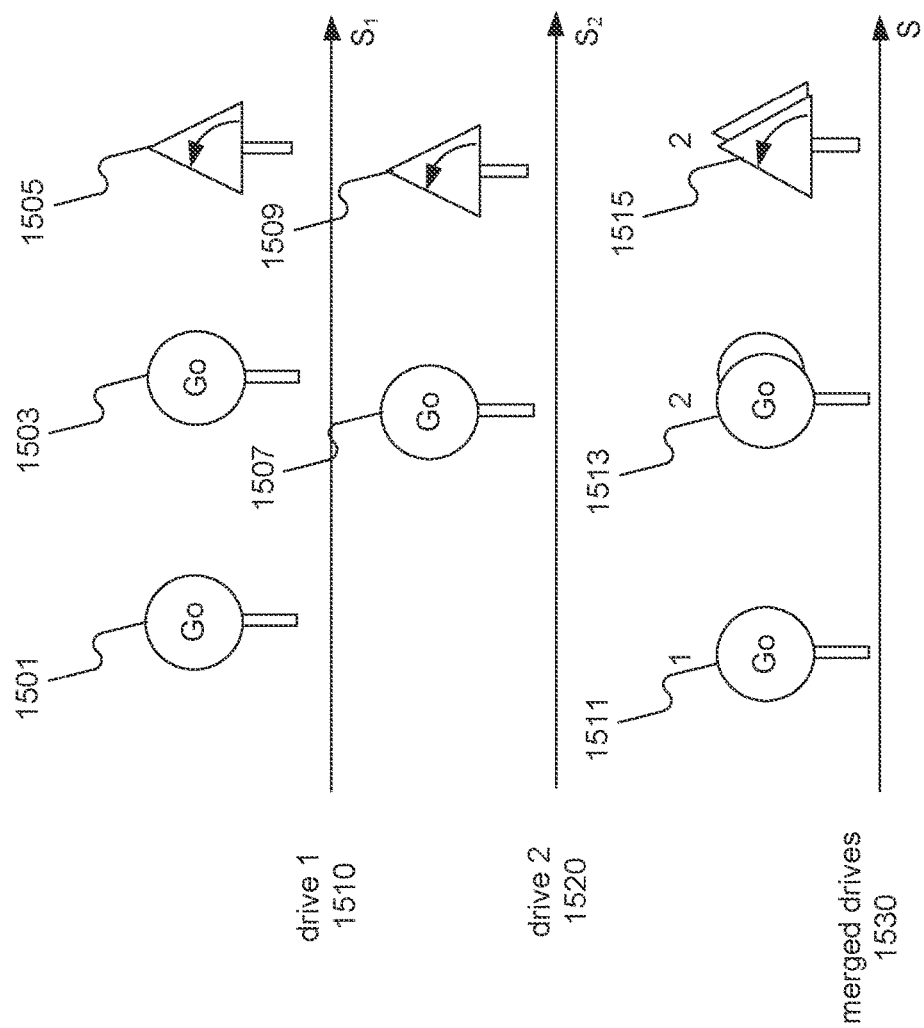
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
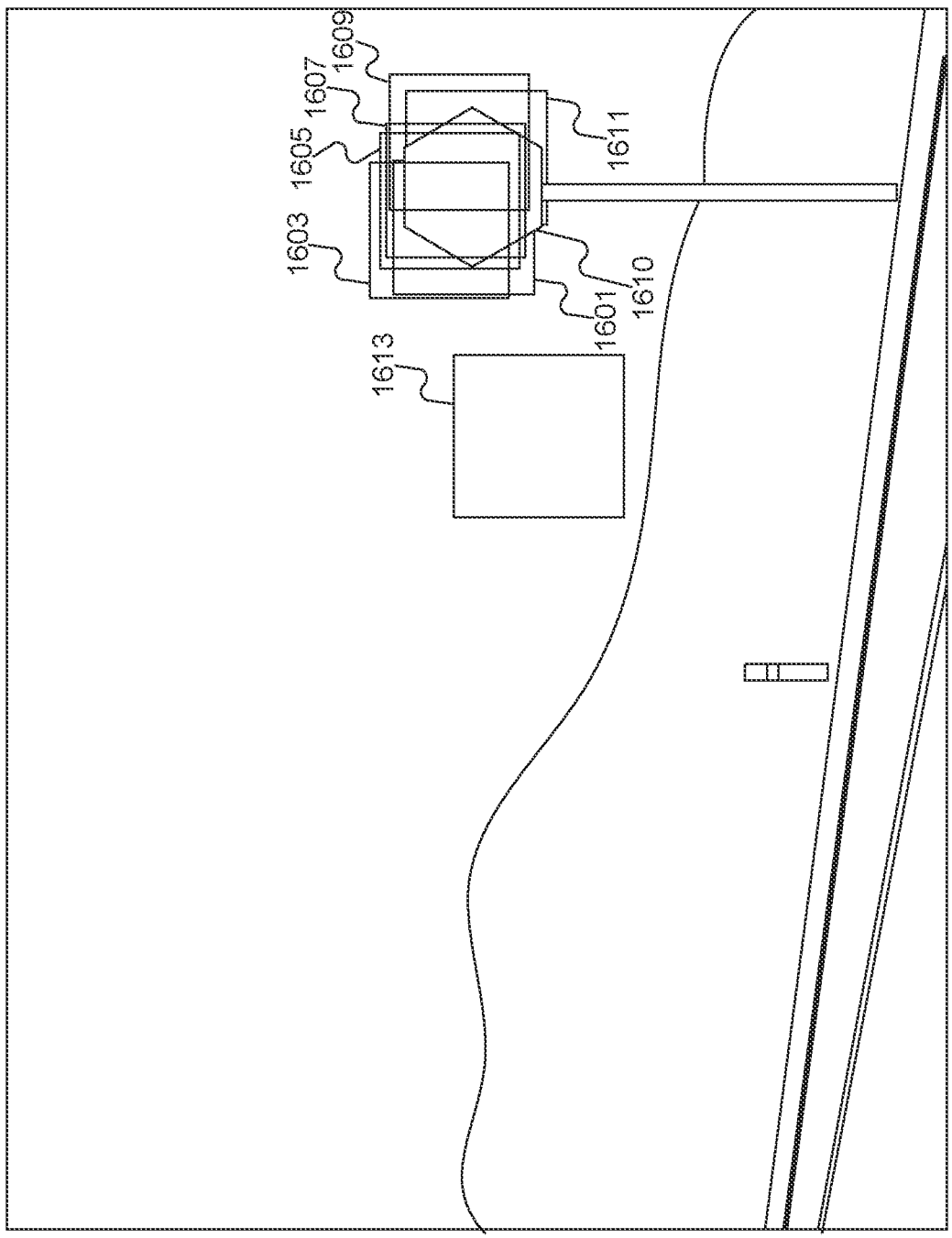
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
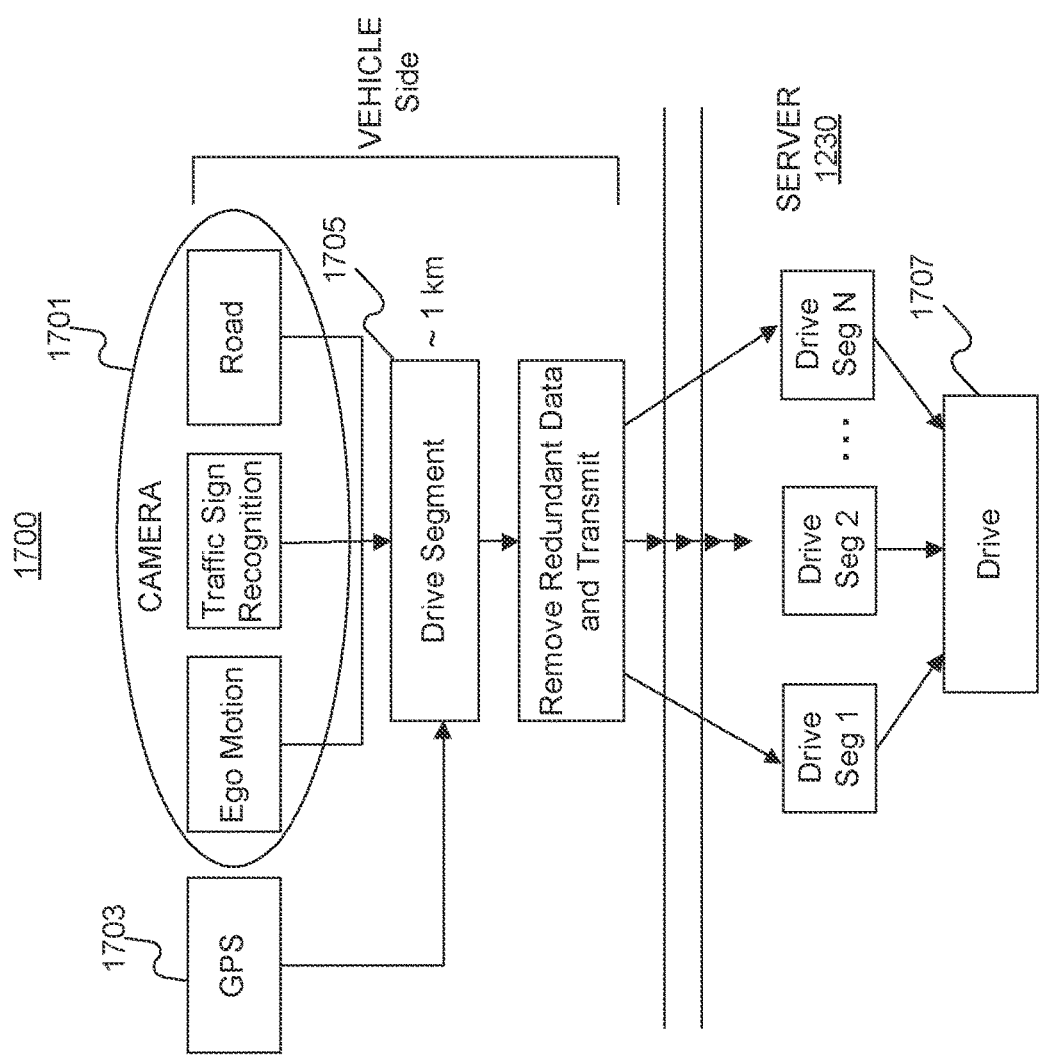
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
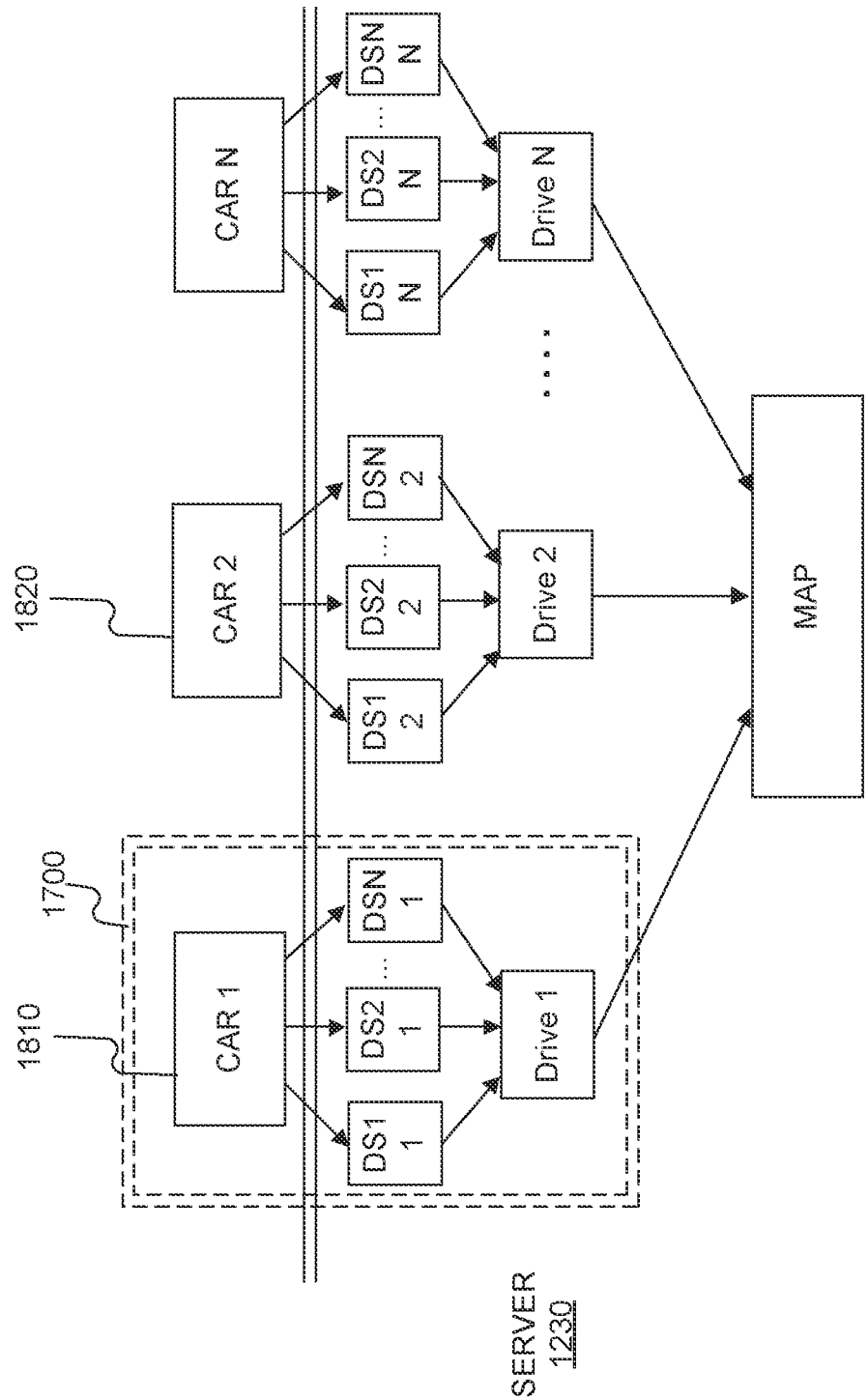
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
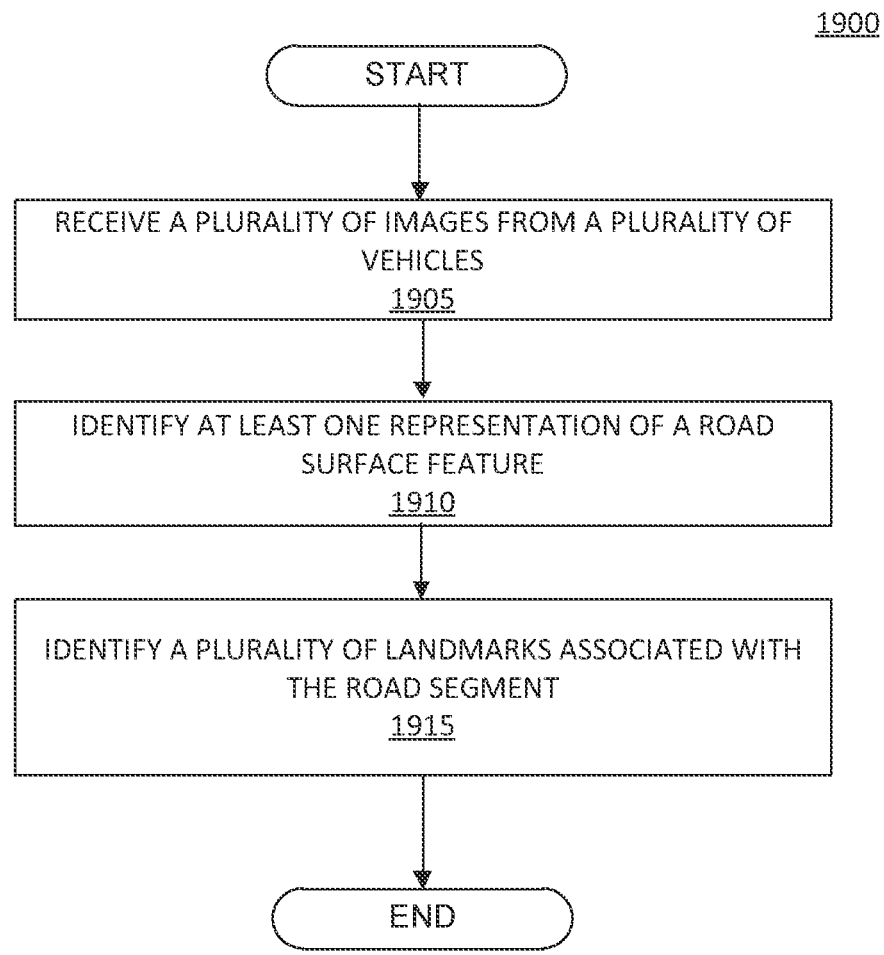
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step

1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowd-sourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
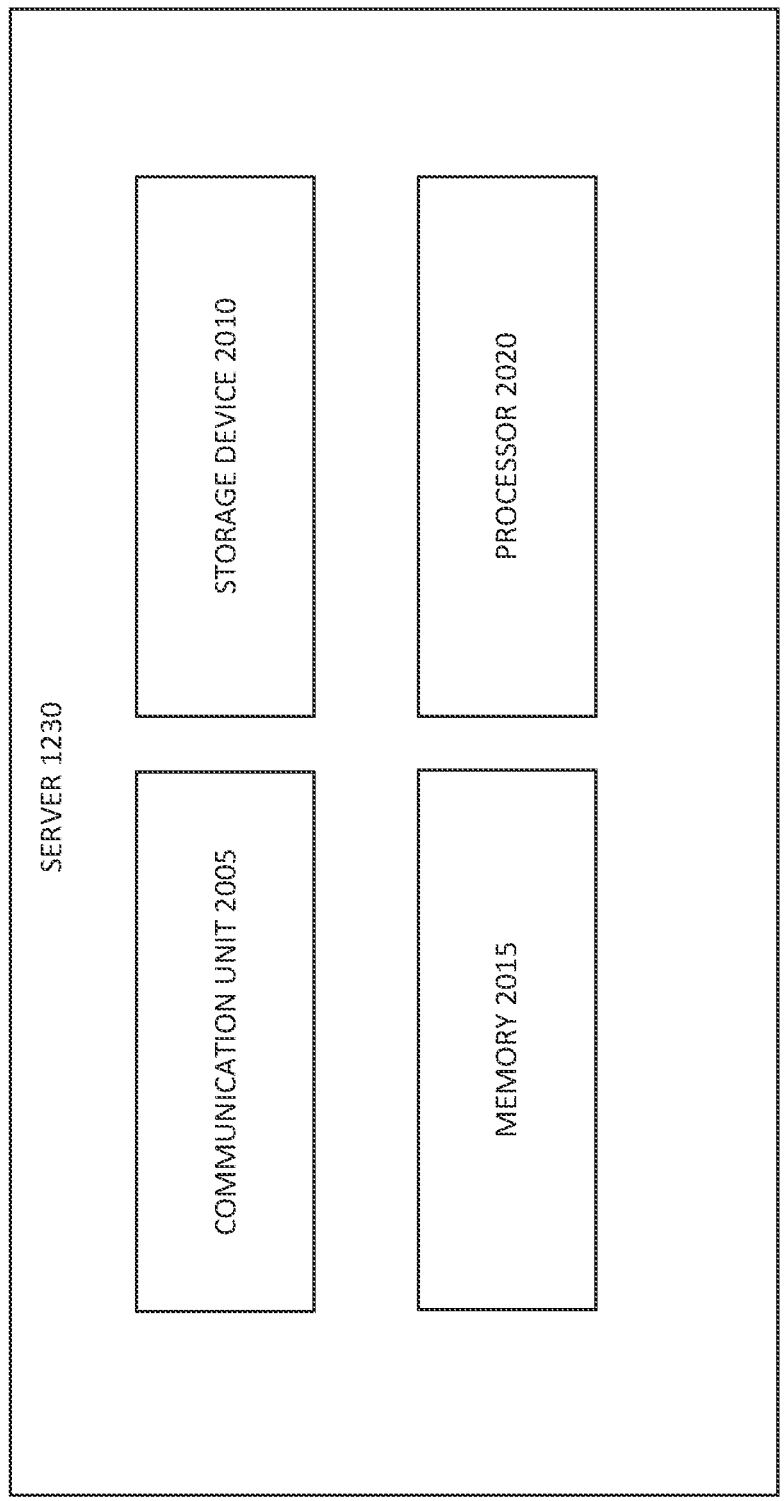
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
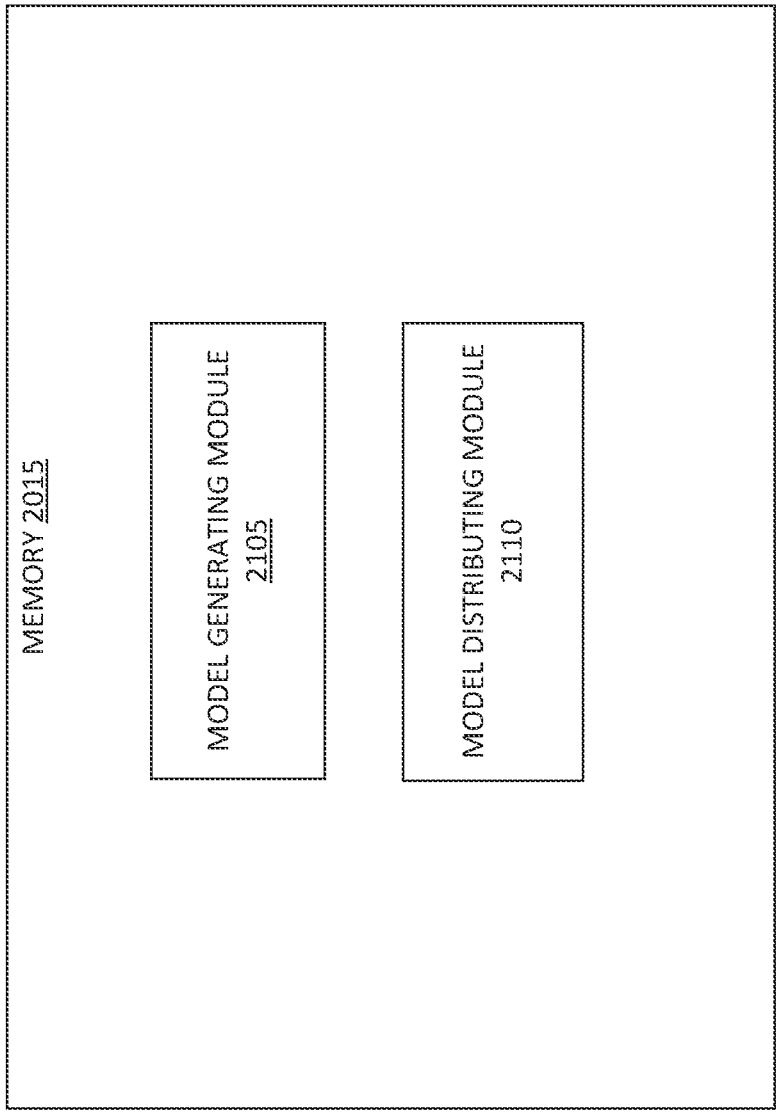
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning. Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, ..., Cn), server 1230 may find a rigid transformation that maps Ci to C0, where i=1, 2, ..., n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
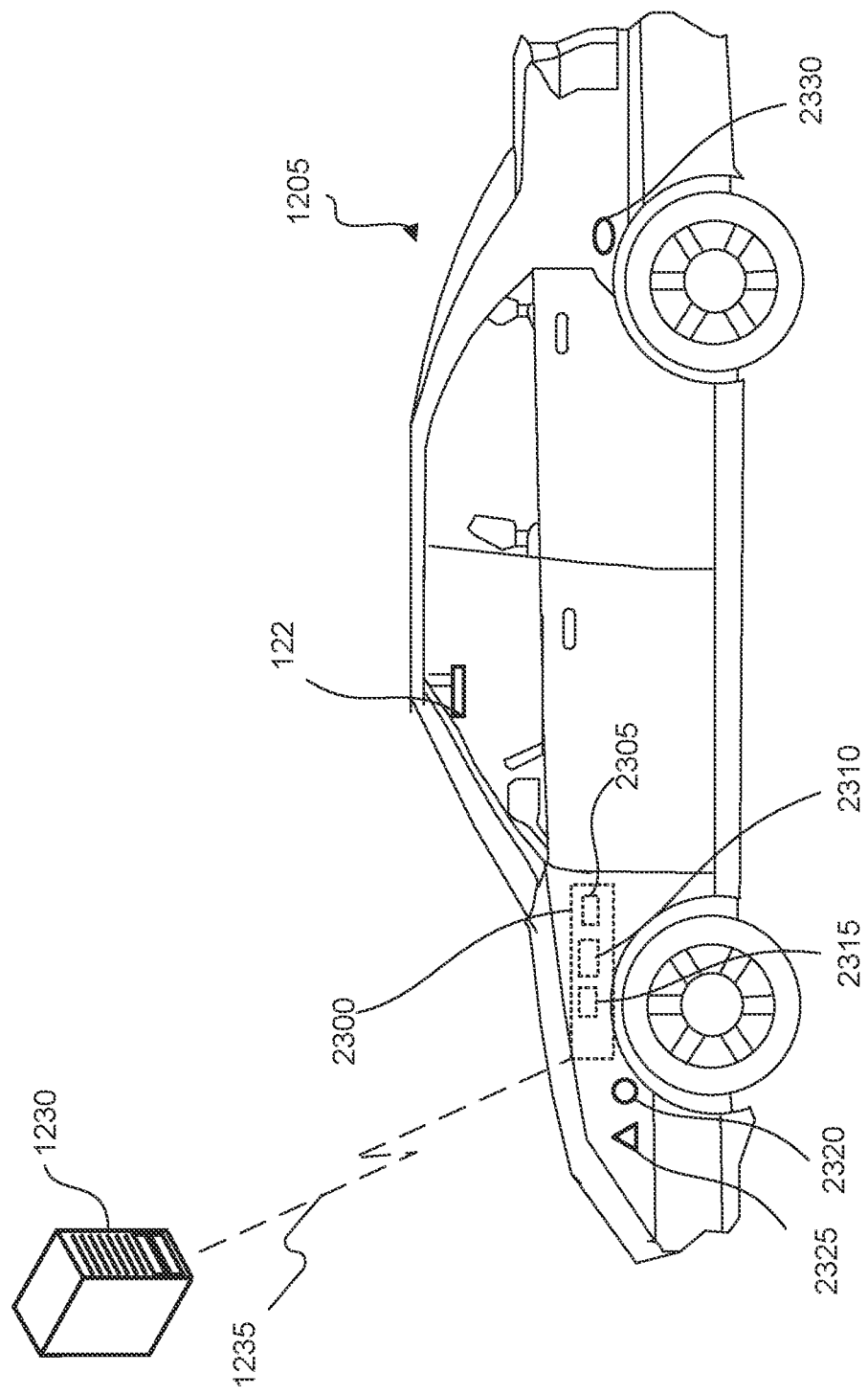
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Using Mapped Elevation to Determine Navigational Parameters

In many aspects of autonomous or semi-autonomous navigation, distance determinations relative to objects in an environment of a host vehicle may be useful. In some cases, such distance determinations may be made based on one or more outputs from a LIDAR system or a RADAR system. Alternatively or additionally, such distance determinations may be made based on analysis of images acquired from one or more image capture devices. In some cases, however, analysis of acquired images may present certain challenges. For example, where objects in the environment of the host vehicle have a different elevation relative to the host vehicle, distance measurements based on image analysis may be more difficult. For example, when analyzing collected images, a target vehicle that is located at an elevation that is higher than a host vehicle's elevation may appear to be located farther from the host vehicle than its actual distance. To address the issue, a distance determination based on image analysis may account for differences in elevation between detected objects and the host vehicle in order to provide greater accuracy in relative distance determinations. Such elevation information may be determined in a number of ways. In some embodiments, however, elevation information may be stored relative to road segments (e.g., included in the sparse maps described above). This mapped elevation information may then be used in determining distances from the host vehicle (and specifically from a device that captured an image or images under analysis) and a target object detected in the images. This technique of accounting for elevation in distance measurements based on acquired images is described in detail in the sections below.

Figure 24:
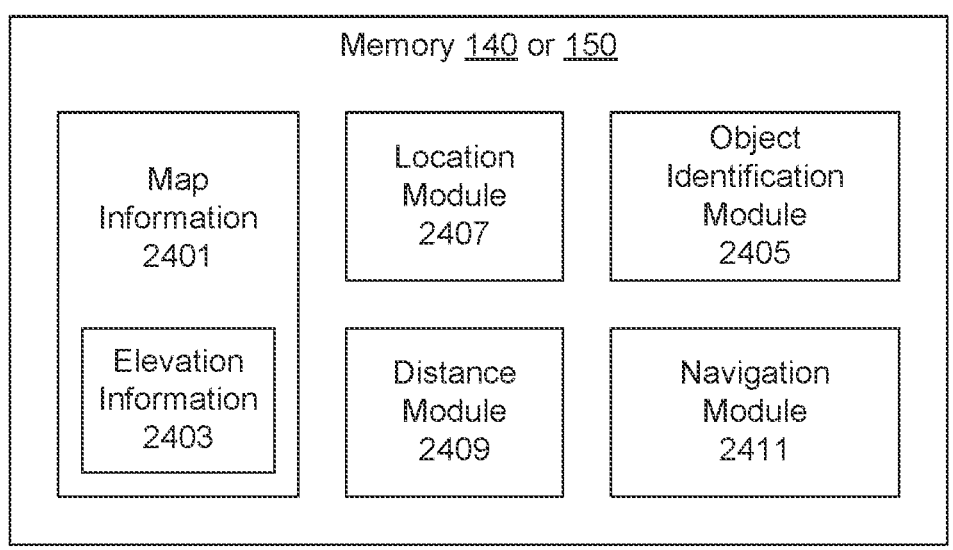
FIG. 24 illustrates a block diagram of a memory, consistent with the disclosed embodiments.

FIG. 24 illustrates a block diagram of a memory, consistent with the disclosed embodiments. In some embodiments, memory 140 or 150 may include map information 2401, elevation information 2403, object identification module 2405, location module 2407, distance module 2409, and navigation module 2411. The disclosed embodiments are not limited to any particular configuration of memory 140 or 150. Further, a processor (e.g., application processor 180, image processor 190, and/or processing unit 110) may execute the instructions stored in any of modules 2405, 2407, 2409, and 2411 included in memory 140 or 150. Further, while various modules (above and below) are described for performing certain functions associated with the disclosed embodiments, such modules need not be logically separated, but rather, may be included within or integrated with (in any combination) a comprehensive navigational system configured to analyze acquired images and determine a next navigational state based on characteristics of the host vehicle environment detected through analysis of the images.

In one embodiment, object identification module 2405 may store instructions, when executed by a processor, enable the processor to perform image analysis of a set of images and identity objects in the set of images. In one embodiment, object identification module 2405 may include monocular image analysis module 402 and/or stereo image analysis module 404. As described above, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Also, as described above, stereo image analysis module 404 may include instructions for detecting a set of features within the first and second sets of images, such as lane markings, vehicles, pedestrians, road signs, highway exit ramps, traffic lights, hazardous objects, and the like. Based on the features, object identification module 2405 may include instructions for identifying the type of objects, such as, vehicles, pedestrians, objects in a roadway, manhole covers, traffic lights, traffic signs, etc. Further, as part of the image analysis process, each identified object of a certain type may be assigned a bounding box associated with edge limits of the object in the relevant image.

In one embodiment, location module 2407 may store instructions that, when executed by a processor, enable the processor to determine a location of the host vehicle. In one embodiment, a processor may determine the location of the host vehicle, based on output of at least one sensor of the host vehicle, such as a GPS device, a speed sensor, and/or an accelerometer. In one embodiment, a processor may determine the location of the host vehicle, based on localization on a sparse map road model (as described above). Sparse maps consistent with the present disclosure may include data representing one or more road features. Such road features may include recognized landmarks, road signature profiles, and any other road-related features useful in navigating a vehicle. Using the recognized landmarks identified in one or more acquired images together with one or more target trajectories included in a sparse map, a processor may determine a location of the host vehicle relative to a target trajectory in the map. Such location information may inform the host vehicle of certain characteristics associated with the environment of the host vehicle relative to the determined position of the host vehicle. For example, in cases where the sparse map stores locations of potholes along a road segment, localizing the position of the host vehicle relative to a certain target trajectory may enable to determine that there is a pothole located 114 meters ahead of the host vehicle along the current target trajectory. Similarly, in cases where the sparse map stores road elevation information (e.g., every 10 cm, 1 m, 2 m, 5 m, 10 m, 50 m, 100 m, etc.), the processor may determine that 128 m ahead of the current localized position of the host vehicle relative to a certain target trajectory, the road segment has an elevation that is 27 m higher than an elevation of the road segment at the current localized position of the host vehicle. After localization of a host vehicle, as described above, the processor may estimate its position (e.g., between identification of recognized landmarks) relative to the target trajectory based on sensor outputs indicative of the host vehicle's ego motion between recognized landmarks.

In one embodiment, map information 2401 (e.g., including the sparse map described above) may store features associated with a specific road segment. The features may include detected lane markings, road signs, highway exit ramps, traffic lights, road infrastructure, road width information, road barriers, trees, buildings, lamp posts, and any other feature associated with an environment of a vehicle, etc. In one embodiment, map information 2401 may further include elevation information 2403. Elevation information 2403 may include a height or a the road segment at a particular location (e.g., 10 meters, 20 meters, 30 meters, and the like) or may include a degree of incline (e.g., 10 degrees or −11 degrees, etc.). In one embodiment, elevation information 2403 may include a height above an origin (e.g., sea level or a certain origin associated with a particular road segment). In one embodiment, elevation information 2403 may be stored in the form of equations (e.g., equation (2)), each corresponding to a road segment. In one embodiment, elevation information 2403 may be stored in a table, with each elevation information entry corresponding to a particular location along a road segment. Such elevation information may be stored in the sparse map at any suitable interval (e.g., every 10 cm, 1 m, 2 m, 5 m, 10 m, 50 m, 100 m, etc.). In one embodiment, referring back to FIG. 13, the plurality of three dimensional splines 1301, 1302, and 1303 may be stored together with elevation information for the lanes in the plurality of data points 1310. A processor may retrieve elevation information from the sparse map in any manner suitable for a particular elevation storage protocol (e.g., by reading the elevation information from a table, determining the elevation from a stored profile or function/equation, determining the elevation from the z axis projection of the three dimensional splines used to represent target trajectories, etc.).

In one embodiment, distance module 2409 may store instructions, when executed by a processor, is configured to determine a distance from the host vehicle to an identified object. The distance may be determined, based on measurements from image analysis, such as a scaling method and/or an optical flow method. In some cases, the distance determination made based on image analysis may be redundant with or may be used as a check of one or more distance determinations made based on an output of a LIDAR system or a RADAR system. The determined distance from the host vehicle to an object identified in one or more images may depend on the elevation of the identified object relative to the host vehicle. For example, when a target vehicle is at a higher elevation than the host vehicle, the determined distance may be greater than an actual distance if elevation is not taken into account. And, to determine appropriate navigational actions for a host vehicle, accurate distance values to detected objects should be available.

Figure 25A:
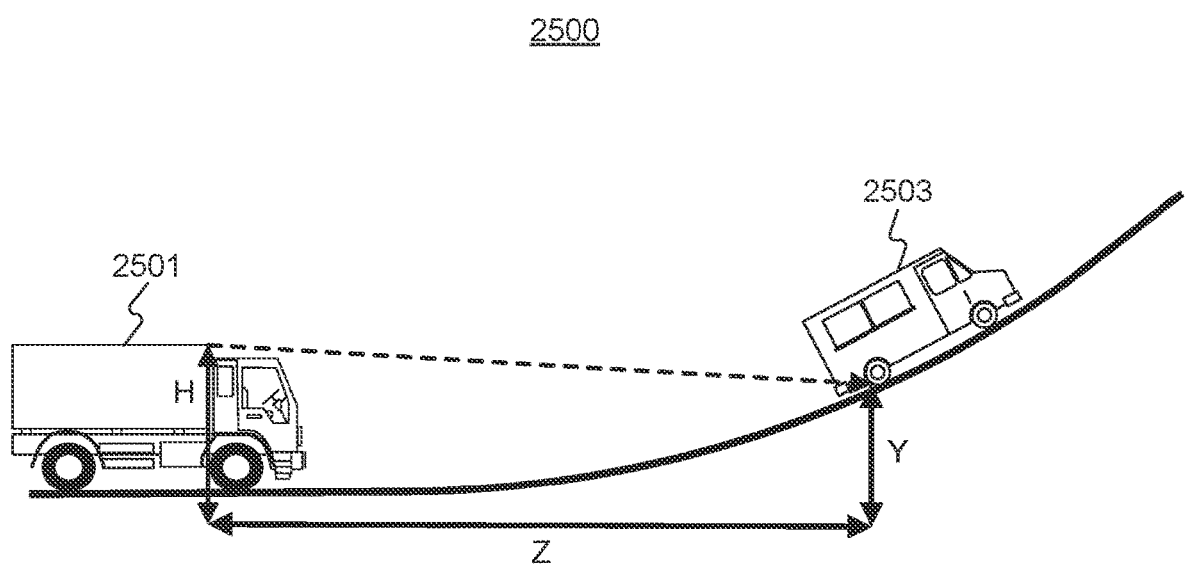
FIG. 25A illustrates an exemplary position of the host vehicle relative to the objects on the road, consistent with the disclosed embodiments.
Figure 25B:
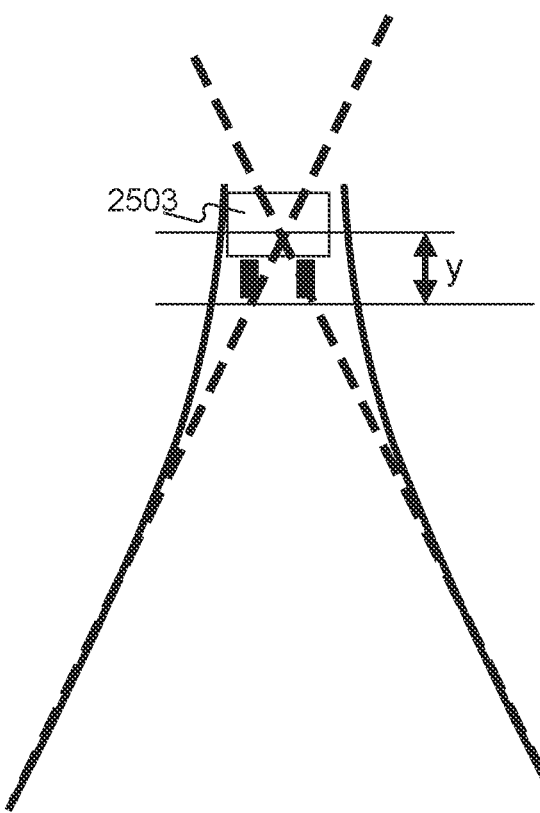
FIG. 25B illustrate an exemplary received image, consistent with the disclosed embodiments.

Consistent with the disclosed embodiments, a processor may determine the distance from the host vehicle to an identified object, based on elevation information 2403. FIGS. 25A and 25B provide diagrammatic representations of a scenario in which a target vehicle 2503 is located on a road segment at a higher elevation than host vehicle 2501. For example, host vehicle 2501 may be situated on a ground plane, and target vehicle 2503 may be assumed to be positioned on a plane at an elevated position above the ground plane. Height Y, the height from the ground plane to the plane on which the target vehicle 2503 is disposed, can be described using the following equation:

$$Y = -y\frac{Z}{f} \quad (1)$$

where y is the vertical displacement in image space of the bottom of the target vehicle 2503, f is the focal length of the capturing device, and Z is the distance from the host vehicle to the target vehicle.

Further, based on the road model, height Y may be determined by the following equation:

$$Y = aZ^2 - H \quad (2)$$

where a is a predetermined constant, and H is the height of the capturing device with respect to the ground plane. In one embodiment, constant a can be stored in map information, sparse map, and/or three dimensional spline. In some cases, constant a may be a local approximation of a spline. In one embodiment, equation (2) may include a more complex function (e.g., Y=Function (Z)).

In some cases, distance Z, which is the distance from host vehicle 2501 to target vehicle 2503, may be determined by a processor using equations (1) and (2). For example, the near region may be approximated as a plane. The vanishing line of the plane (horizon) may be determined from the vanishing point of the nearby parts of the road. Alternatively, the local road plane may be determined by any suitable image analysis technique. The bottom of the vehicle in the image relative to the "horizon" may define a line in space to the bottom of the vehicle: Y=−yZ/f. This yields:

$$aZ^2 - H = -y\frac{Z}{f} \quad (3)$$

This quadratic equation can be solved for Z to determine a distance between the host vehicle and the target vehicle.

In one embodiment, navigation module 2411 may store software instructions executable by a processor to determine a desired navigational action based on the determined distance. In one embodiment, navigation module 2411 includes navigational response module 408. The determined distance from host vehicle to an identified object (e.g., a target vehicle) may be important in generating an appropriate navigational response of an autonomous vehicles, for example. Based on the determined distance, navigational actions may be determined to advance one or more navigational goals of the autonomous vehicle (e.g., travel from point A to point B, do not hit a pedestrian, stay at least 1 meter from pedestrian, stay at least 10 meters from pedestrian if speed is greater than 30 km/hr (etc.), stay at least a safe distance from a leading vehicle, brake to avoid approaching within safe distance, and many other navigational goals). To achieve these goals, a processor may be dependent at least upon an accurate distance determination between the host vehicle and detected object. For example, when the host vehicle approaches a detected pedestrian, a brake system may be triggered to stop the host a safe distance from the pedestrian. In one embodiment, a processor may compare the determined distance to a predetermined threshold. When the determined distance is greater than the predetermined threshold (e.g., a safe distance relative to a leading vehicle, which may correspond to a sum of a distance the host vehicle can travel at its maximum acceleration rate for a reaction time associated with the host vehicle, a distance within with the host vehicle may be stopped at a maximum braking level for the host vehicle, a distance within which the target vehicle may be stopped at a maximum braking level for the target vehicle, and optionally a predetermined minimum approach buffer to maintain relative to the target vehicle after stopping), then a processor may allow the host vehicle to continue at its current speed and heading, accelerate, etc. When the determined distance is equal to or below the predetermined threshold, however, then a processor may cause the host vehicle to brake or change heading, etc. In some embodiments, navigational responses may be determined based on a combination of the determined distance values and relative velocity and acceleration.

Figure 26:
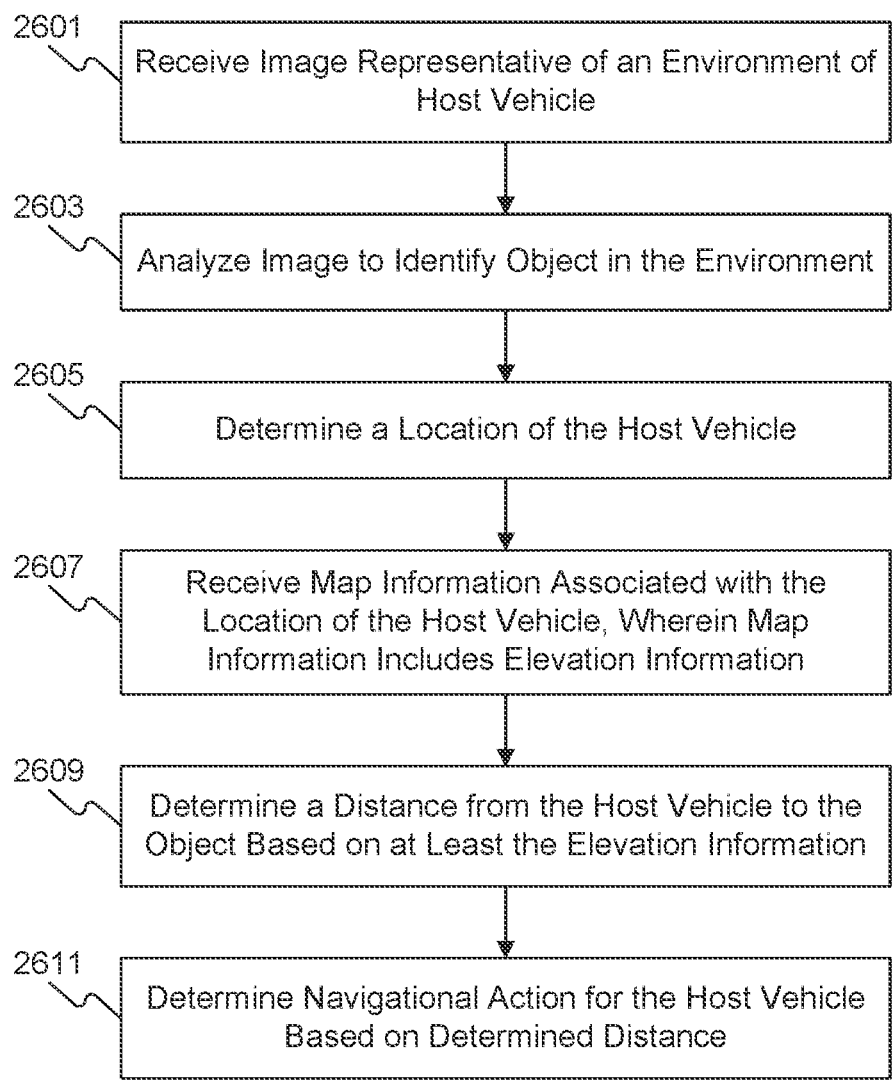
FIG. 26 is a flowchart showing an exemplary process for navigating a host vehicle, consistent with the disclosed embodiments.

FIG. 26 is a flowchart for navigating a host vehicle, consistent with the disclosed embodiments. At step 2601, a processor may receive, from an image capture device, at least one image representative of an environment of the host vehicle. The image may be raw or processed data from capturing device 122, 124, and/or 126 via a network or a communication channel. The data may include any appropriate image format.

At step 2603, a processor may analyze the at least one image to identify an object in the environment of the host vehicle. Image 2500 illustrates an environment of a host vehicle with many different objects. A processor may analyze image 2500 to identify objects in the image; the processor may access object identification module 2405 and use any suitable image analysis technique including, for example, object recognition, image segmentation, feature extraction, optical character recognition (OCR), object-based image analysis, shape region techniques, edge detection techniques, pixel-based detection, etc. Additionally, a processor may further use classification algorithms to distinguish between the different objects in the images. In one embodiment, a processor may utilize suitably trained machine learning algorithms and models to perform the object identification. The algorithms may include linear regression, logistic regression, linear discriminant analysis, classification and regression trees, naïve Bayes, k-nearest neighbors, learning vector quantization, support vector machines, bagging and random forest, and/or boosting and adaboost, or the like. In some embodiments, a processor when executing object identification module 2405 may identify the object in the image based at least on visual properties of the object (e.g., size, shape, texture, text, color, etc.).

At step 2605, a processor may determine a location of the host vehicle. In one embodiment, a processor may determine a location based on the analysis of the images. Furthermore, as described above, a processor may determine the location of the host vehicle as a localized position of the host vehicle along a three-dimensional spline representative of a target trajectory for the host vehicle along a road segment. And, consistent with the disclosed embodiments, the prediction of the location of the host vehicle along the pre-determined three-dimensional spline may be based on an observed location of at least one recognized landmark. Consistent with the disclosed embodiments, a processor may predict the location of the host vehicle, based on localization on a sparse map road model. In one embodiment, as described above, the location of the host vehicle may be determined based on an output of at least one sensor of the host vehicle, such as, GPS device, a speed sensor, and/or an accelerometer. For example, a location information from a GPS receiver may help determine the location of the host vehicle.

At step 2607, a processor may receive map information associated with the determined location of the host vehicle, wherein the map information includes elevation information associated with the environment of the host vehicle. Based on a determined location (e.g., a GPS output or a previous localization relative to a sparse map), a processor may retrieve map information for a specific location or specific road segment. The retrieved map information may include elevation information for a road segment on which the host vehicle travels. The elevation information may be stored in the map in any manner discussed above, for example.

At step 2609, a processor may determine a distance from the host vehicle to the object based on at least the elevation information. Consistent with the disclosed embodiments, a processor may use the equations above to determine the distance to an object identified in one or more images. For example, based on the elevation information from a stored map, equation (2) maybe used to compute the relative distance to the target object.

At step 2611, a processor may determine a navigational action for the host vehicle based on the determined distance. In one embodiment, a processor may access navigation module 2411 to determine a navigational action. The navigational action may include any navigational action described above, which may depend on the distance determined to the identified target object.

In some cases, as noted above, the determined navigational action may include one or more navigational actions developed in response to a goal of the host vehicle to maintain at least a safe distance relative to other vehicles. For example, if the determined distance accounting for elevation differences between the host vehicle and an identified target vehicle is not greater than a safe distance or if the host vehicle is approaching a safe distance buffer, the navigational processor may determine a navigational action for the host vehicle intended to establish or maintain at least a safe distance relative to the identified target vehicle. For example, in some cases, the safe distance may correspond to a sum of: a current stopping distance for the host vehicle based on the current velocity of the host vehicle and its current maximum braking capability, an acceleration distance corresponding to a distance the host vehicle would travel at its current maximum acceleration capability over a reaction time associated with the host vehicle, and a stopping distance of the target vehicle from its current speed to zero at a maximum braking capability for the target vehicle. The navigational actions may be determined based on one or more of the formulas described relative to the Responsibility-Sensitive Safety (RSS) model.

In some embodiments, a processor may implement the determined navigational action if, given the maximum braking capability of the host vehicle, the current speed of the host vehicle, the maximum acceleration capability of the host vehicle, and/or a reaction time associated with the host vehicle, the host vehicle can be stopped within a stopping distance that is less than the determined next-state distance between the host vehicle and the target vehicle (i.e., the distance between the host vehicle and the target vehicle that would result if the determined navigational action was taken). In some cases, implementation of the determined navigational action may also account for the stopping distance of the target vehicle based on its determined speed and maximum braking capability. If the host vehicle processor determines that there is enough distance to stop in a next-state distance between the leading visible target vehicle and the host vehicle, without collision or without collision for which responsibility would attach to the host vehicle and assuming the leading visible target vehicle will suddenly at any moment come to a complete stop, then the processor of the host vehicle may take the planned navigational action. On the other hand, if there would be insufficient room to stop the host vehicle without collision or without liability for a collision, then the determined navigational action may not be taken.

Using Mapped Lane Width to Determine Navigational Parameters

Similar to the embodiments described above, in which elevation information may be stored in a sparse map for a particular road segment, measured lane width for the road segment may also be stored in the sparse map. For example, as vehicle traverse a road segment, lane width determinations may be made along the road segment. Through crowd-sourcing, these lane width measurements may be refined and incorporated into the sparse maps described above. For example, lane width information may be stored as a table relative to a longitudinal road segment dimension, as a function or equation defining the width along the longitudinal dimension, relative to one or more three dimensional splines representing target trajectories for lanes of travel along a road segment, or in any other suitable manner. The mapped lane width information, as described in further detail below, may be useful in determining distances between a host vehicle and one or more target objects identified on a road segment. The determined distances may then be used in checking measurements from a LIDAR system, a RADAR system, or in determining one or more navigational actions for the host vehicle, etc.

In one embodiment, a processor may receive one or more acquired images representative of the environment surrounding the host vehicle, as described above. In one embodiment, as described above, object identification module 2405 may store instructions, when executed by a processor, enable the processor to perform image analysis of a set of images and identify objects in the set of images. A processor may identify objects in the plurality of images, a plurality of landmarks (e.g., road signs) associated with the road segment. Objects may be identified by any of the techniques disclosed above. For example, object recognition, image segmentation, feature extraction, optical character recognition (OCR), object-based image analysis, shape region techniques, edge detection techniques, pixel-based detection, etc. may all be used alone or in combination.

Figure 27A:
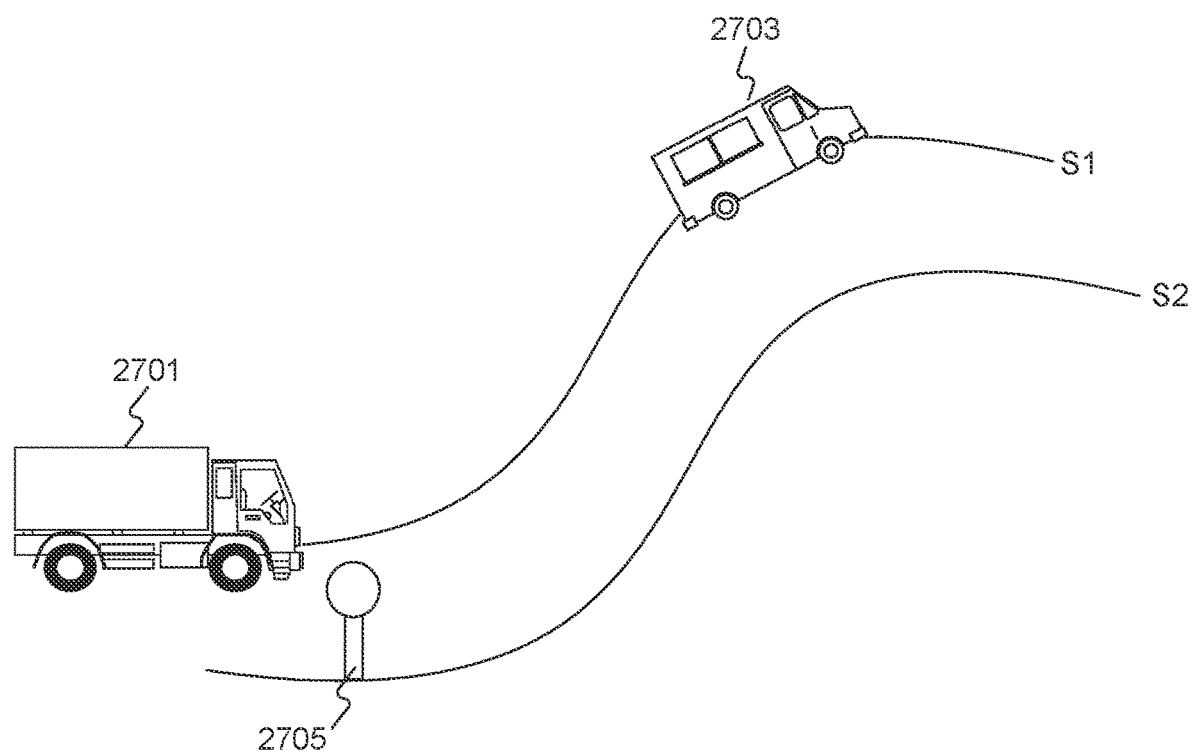
FIG. 27A illustrates two exemplary splines in a three dimensional coordinate, consistent with the disclosed embodiments.

In one embodiment, as described above, a processor may determine a location of the host vehicle. As discussed above, the position may be determined by various techniques, such as, GPS localization, recognized landmark localization along a target trajectory of a sparse map, combinations of the two, or other. For example, referring to FIG. 27A, using the techniques described above, land mark 2705 may be used to determine a localized position of host vehicle 2701 along a spline representative of a target trajectory associated with a lane of a road segment along which host vehicle 2701 travels.

In one embodiment, as described above, distance module 2409 may store instructions that, when executed by a processor, enable the processor to determine a distance from the host vehicle to an identified object. For example, referring to FIG. 27A, host vehicle 2701, target vehicle 2703, landmark 2705, and two splines S1 and S2 are shown in a three dimensional space with respect to (X,Y,Z) coordinates. Splines S1 and S2 may represent lane boundaries associated with a road segment along which host vehicle 2701 travels. The distance determination between host vehicle 2701 and target vehicle 2703 may be based on outputs of a LIDAR or RADAR system. The distance between host vehicle 2701 and target vehicle 2703 may also be determined through image analysis, e.g., using scaling of objects over a series of images. The distance determination may account for elevation differences, as discussed in the section above. The distance determination may also be made based on a tracked trajectory of the target vehicle 2703 and a comparison of the observed tracked trajectory to mapped information (such as a spline representative of a lane of travel) to determine where along a target trajectory the target vehicle is located. The distance between host vehicle 2701 and target vehicle 2703 may be determined as a linear, shortest distance between the host vehicle and the target vehicle. In other cases, the distance between host vehicle 2701 and target vehicle 2703 may be determined as a distance along a curved, three-dimensional path between the host vehicle and the target vehicle (e.g., along a spline between lane edge splines S1 and S2 and representing a target trajectory along with the host vehicle travels).

Figure 27B:
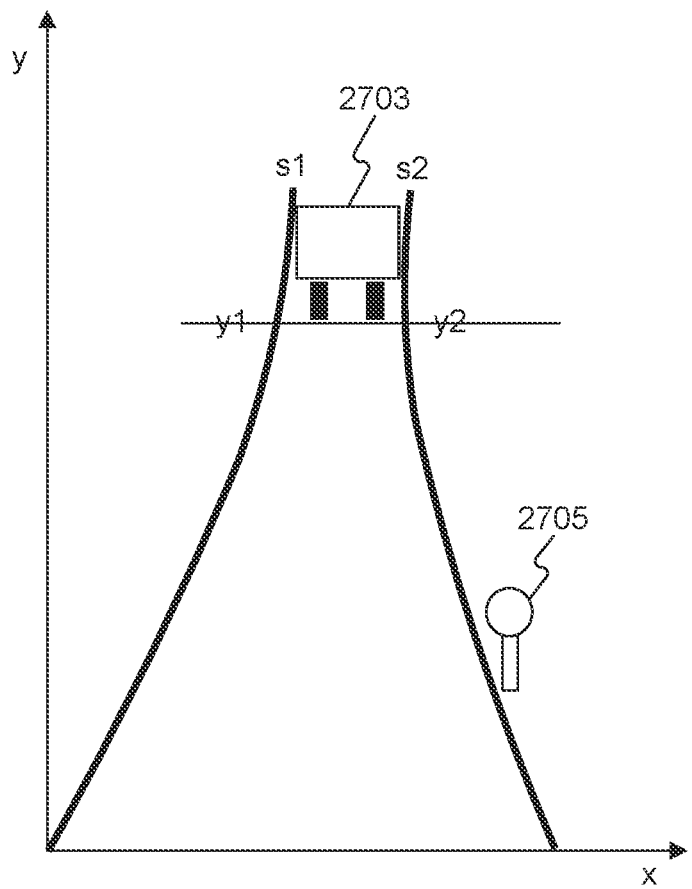
FIG. 27B illustrate an exemplary received image, consistent with the disclosed embodiments.

A processor may also determine a distance from the host vehicle to an identified object, based on mapped lane width information. Map information, including, for example, in the sparse maps described above, may include lane width information associated with the road segment along which the host vehicle travels. As noted the sparse map may store lane width information in any suitable format (e.g., relational tables, periodic values along a longitudinal road segment direction, three-dimensional splines from which the lane width may be determined-such as between splines S1 and S2 shown in FIGS. 27A and 27B). For example, a lane width between splines S1 and S2 at a longitudinal distance associated with target vehicle 2703 may be represented as a difference between an x coordinate projection at point y2 associated with spline S2 and an x coordinate projection at point y1 associated with spline S1.

Figure 28A:
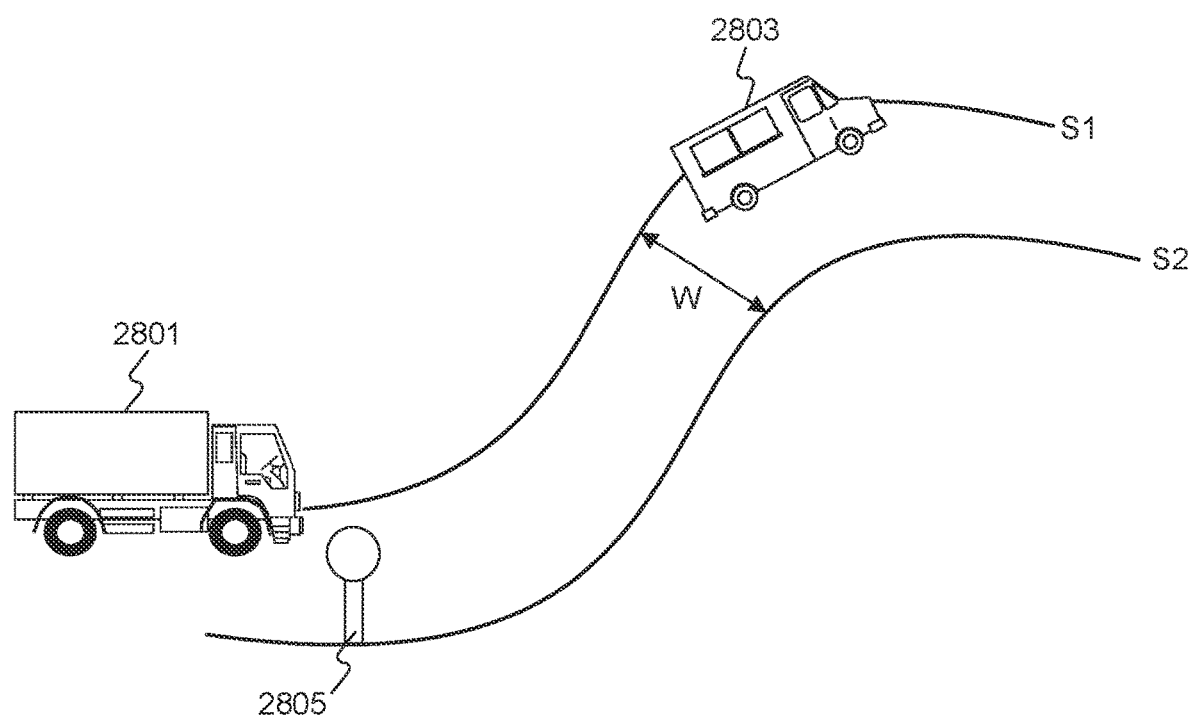
FIG. 28A illustrates two exemplary splines in a three dimensional coordinate, consistent with the disclosed embodiments.
Figure 28B:
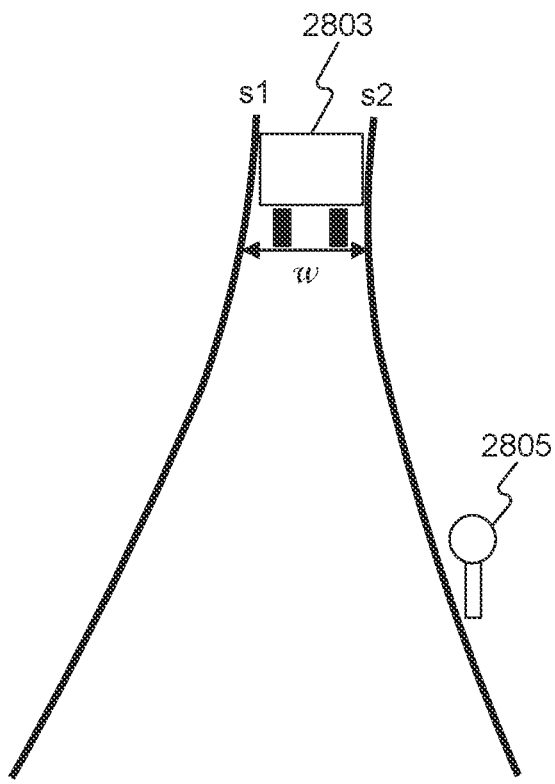
FIG. 28B illustrate an exemplary received image, consistent with the disclosed embodiments.

Referring to FIG. 28A, host vehicle 2801, target vehicle 2803, landmark 2805, and two splines S1 and S2 are shown. Splines S1 and S2 may be representative of lane boundaries associated with a road segment along which the host and target vehicles travel. As shown, splines S1 and S2 have a width W between them. In some embodiments, width W may be constant or nearly constant between two splines representative of detected lane boundaries. FIG. 28B shows splines S1 and S2 projected to an (x,y) two dimensional coordinate system (e.g., in image space). Based on known lane width information (e.g., W=3.8 meters), a distance Z from host vehicle 2801 to target vehicle 2803 may be determined, using the following equation:

$$Z = f\frac{W}{w} \quad (4)$$

where f is the focal length of the capturing device, and w is the width of the lane in image space. For example, w may be 125 pixels, and f may be 1400 pixels. If the lane width W in physical space is known to be 3.8 meters (e.g., based on the stored sparse map), Z may be calculated to be 42.56 meters.

Figure 29A:
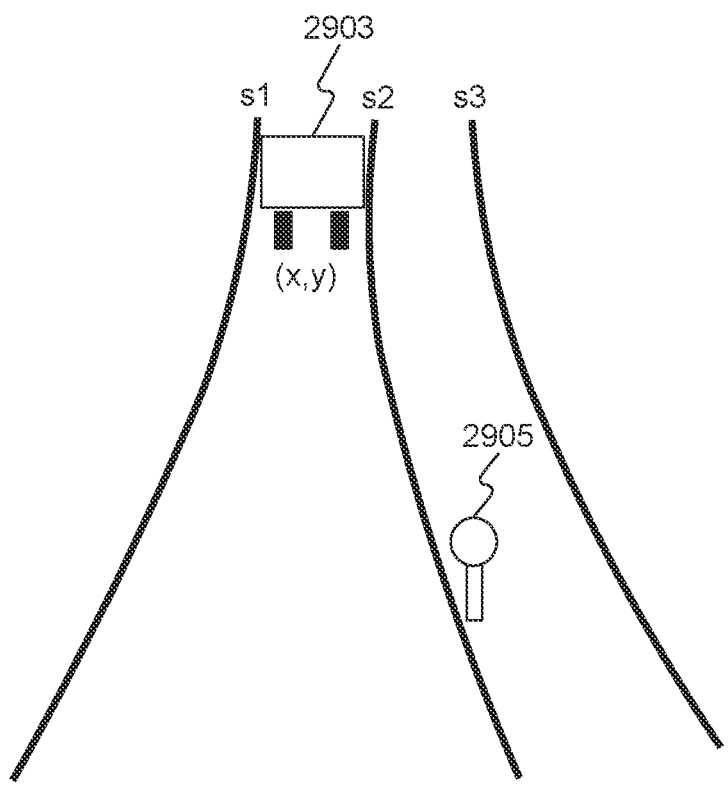
FIG. 29A illustrates exemplary splines in a two dimensional coordinate, consistent with the disclosed embodiments.
Figure 29B:
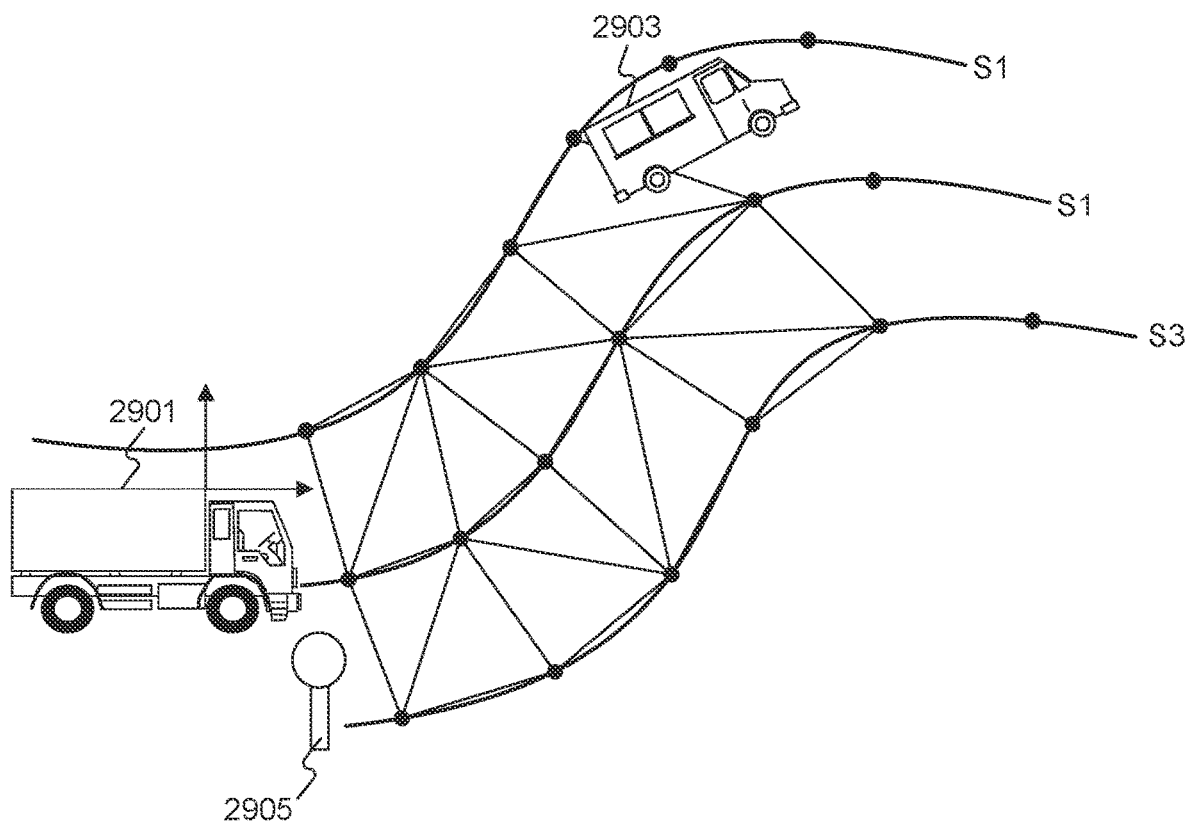
FIG. 29B illustrates exemplary splines in a three dimensional coordinate, consistent with the disclosed embodiments.

FIG. 29A illustrates another image including splines s1, s2, and s3 in an (x,y) two dimensional coordinate system. FIG. 29B illustrates an image of splines S1, S2, and S3 in three dimensional coordinates. In one embodiment, a server may receive an acquired image 2900 and use that image to construct image 2910, by mapping the (x,y) two dimensional coordinate to the (X,Y,Z) three dimensional coordinate system. For example, in order to construct image 2910, a server may detect the target vehicle 2903 and determine an (x,y) value for the bottom of the target vehicle 2903. In some embodiments, by applying a mapping function, a server may calculate the (X,Y,Z) value of the point (x,y). Hence, three dimensional splines may be constructed, based on the two dimensional image.

Figure 30:
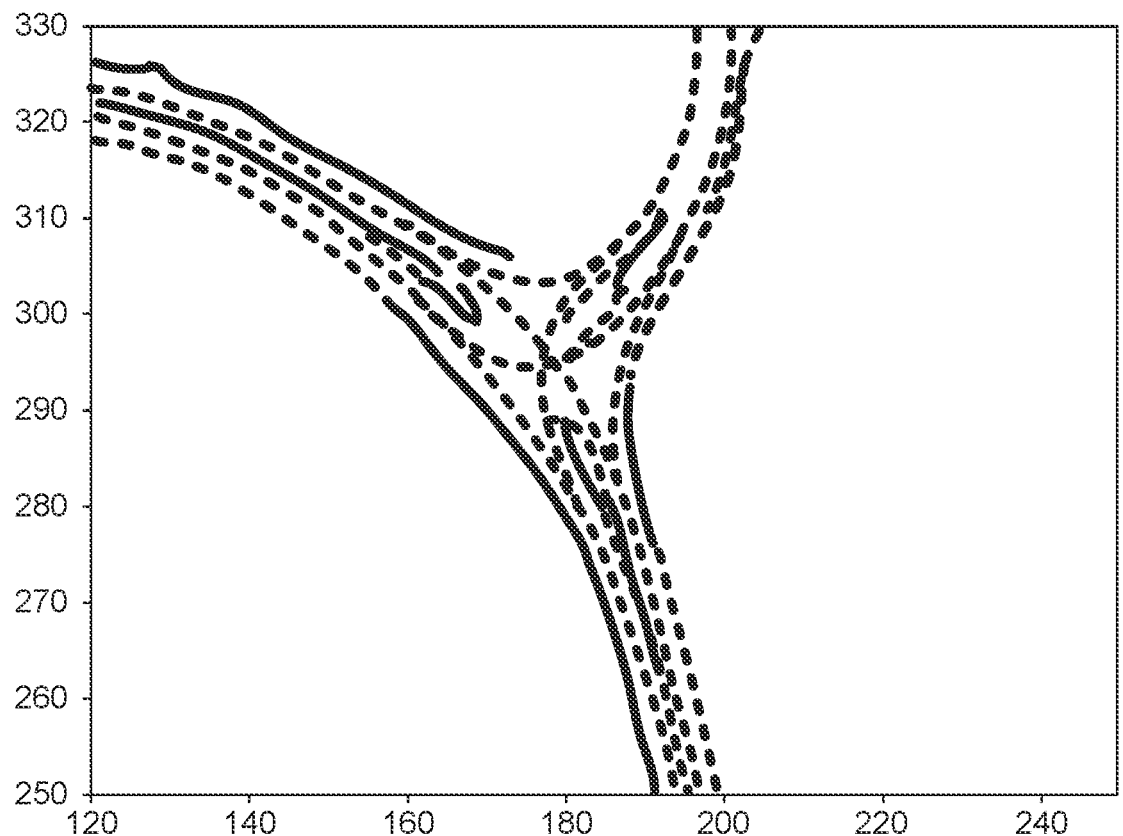
FIG. 30 illustrates exemplary splines that are projected to a two dimensional coordinate, consistent with the disclosed embodiments.
Figure 31:
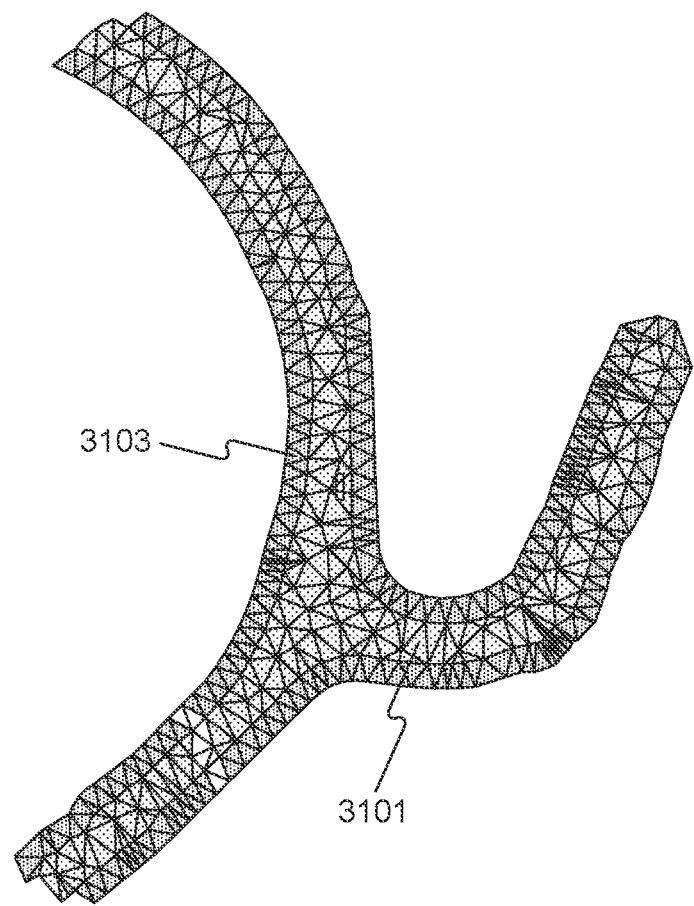
FIG. 31 shows the Delaunay Triangulation results, consistent with the disclosed embodiments.

In one embodiment, by using all the splines constructed, a server may create a road surface model. For example, using image 2910, a server may create a road surface model and may use this as a segment of the map. For example, to create the road surface model, a server may select the points with a predetermined spacing (e.g., 1-meter apart) on splines S1, S2, and S3. Further, a server may apply Delaunay Triangulation, as shown in FIG. 29B. FIG. 30 illustrates exemplary splines that are projected to a two dimensional coordinate. FIG. 31 shows the Delaunay Triangulation results. As shown in the figure, the points outside the edge of road 3101 have been filtered out. And, a margin of fixed width beyond the road edge, area 3103, is further added. These (X,Y,Z) three dimensional coordinates may be constructed from (x,y) two dimensional coordinates, by a server, as described above. From the three dimensional values, a server may obtain information for the road 3101 and areas near the road (e.g., area 3103).

In some embodiments, the server may use one or more 3D splines from a map and map coordinates (e.g., position and rotation information) to map the (x,y) two dimensional coordinate to the (X,Y,Z) three dimensional coordinate system. For example, the server may project 3D splines, which represent lane boundaries, into the image. For every 3D point along the spline (e.g., with some spacing) the server may compute the 2D image project using information known about the camera or cameras that captured the images (e.g., focal length, principal point, lens distortion, etc.). Instead of determining an RGB value, the server may determine and store the (X,Y,Z) values of the projected point. Accordingly, the server may determine the (X,Y,Z) values for every (x,y) two dimensional coordinate along the projected splines in the images. If the server detects a vehicle and its point of contact with the road (e.g., detected in the image data), the server may look at the points y1 and y2 on the splines s1 and s2 nearby and determine ae distance to the vehicle as the (weighted) average of y1 and y2. Such an approach may provide an advantage in situations in which a vehicle is equipped with multiple surround cameras.

Figure 32:
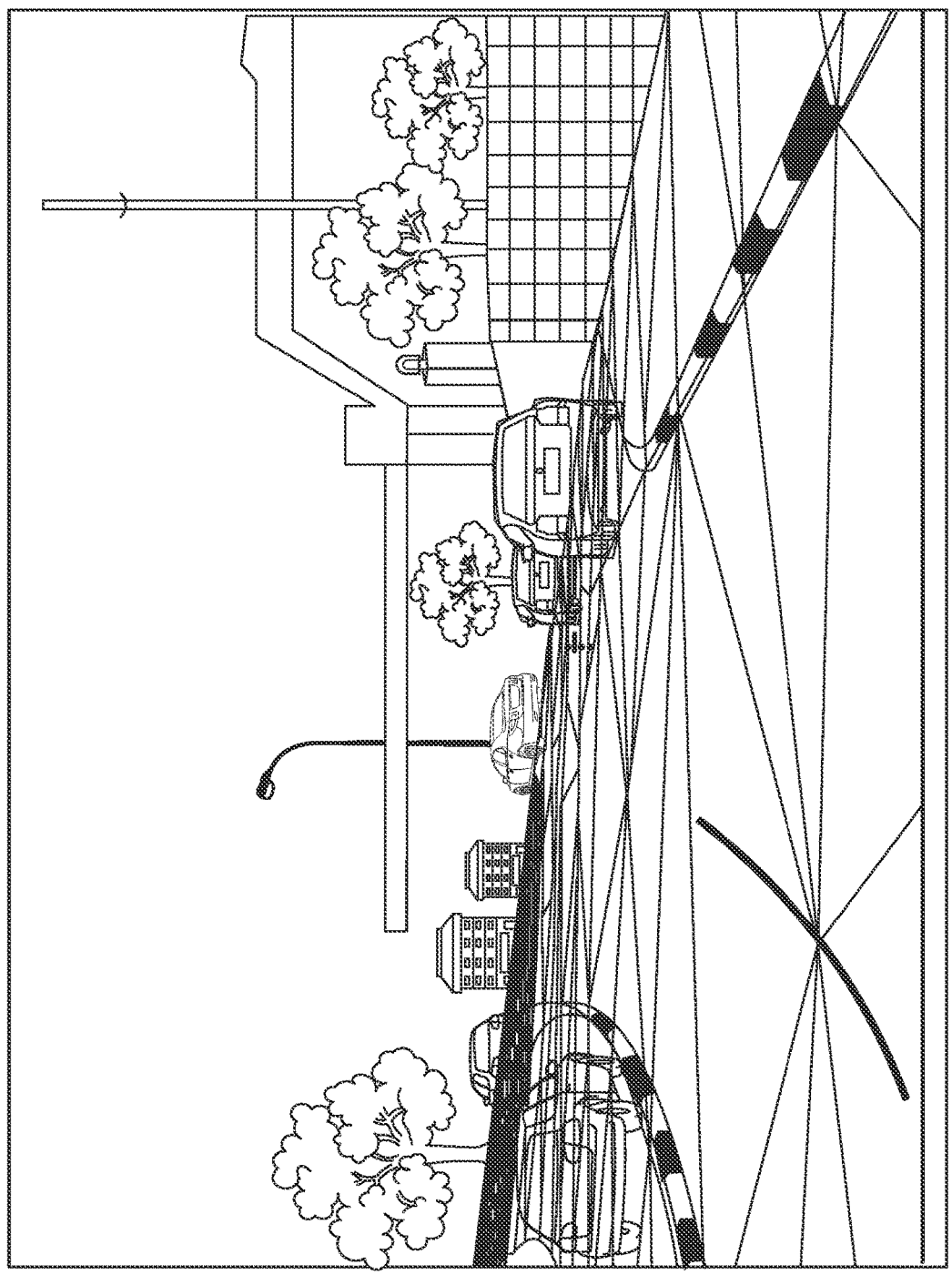
FIG. 32 shows the relevant triangles projected onto the image based on localization of the camera, consistent with the disclosed embodiments.

FIG. 32 shows the relevant triangles projected onto the image based on localization of the camera. When applying a Delaunay Triangulation function, if a point in the image falls inside a triangle, then the point will be assigned the a the (X,Y,Z) three dimensional value based on the triangle, by a server.

In one embodiment, a processor on the host vehicle may receive the surface model. As described above, a processor may determine a location of the host vehicle and the position of the host vehicle in the three dimensional coordinate system, using the techniques described above. For example, such a position determination may be based on localization relative to identified landmarks and/or localization based on determined ego motion of the host vehicle relative to the identified object (e.g., a target vehicle) between landmarks. A processor may determine the distance from the host vehicle to the identified object, using the road surface model. For example, when a target vehicle 2903 is detected, the (x,y) point of contact with the road is a line in space. The 3D point of intersection of the line and the surface gives the distance Z from the host vehicle to the target vehicle.

As described above, a processor may determine a navigational action, at least based on the determined distance. For example, when the determined distance from the host vehicle to the target vehicle is below the current stopping distance, then a processor may determine to cause braking, etc.

Figure 33:
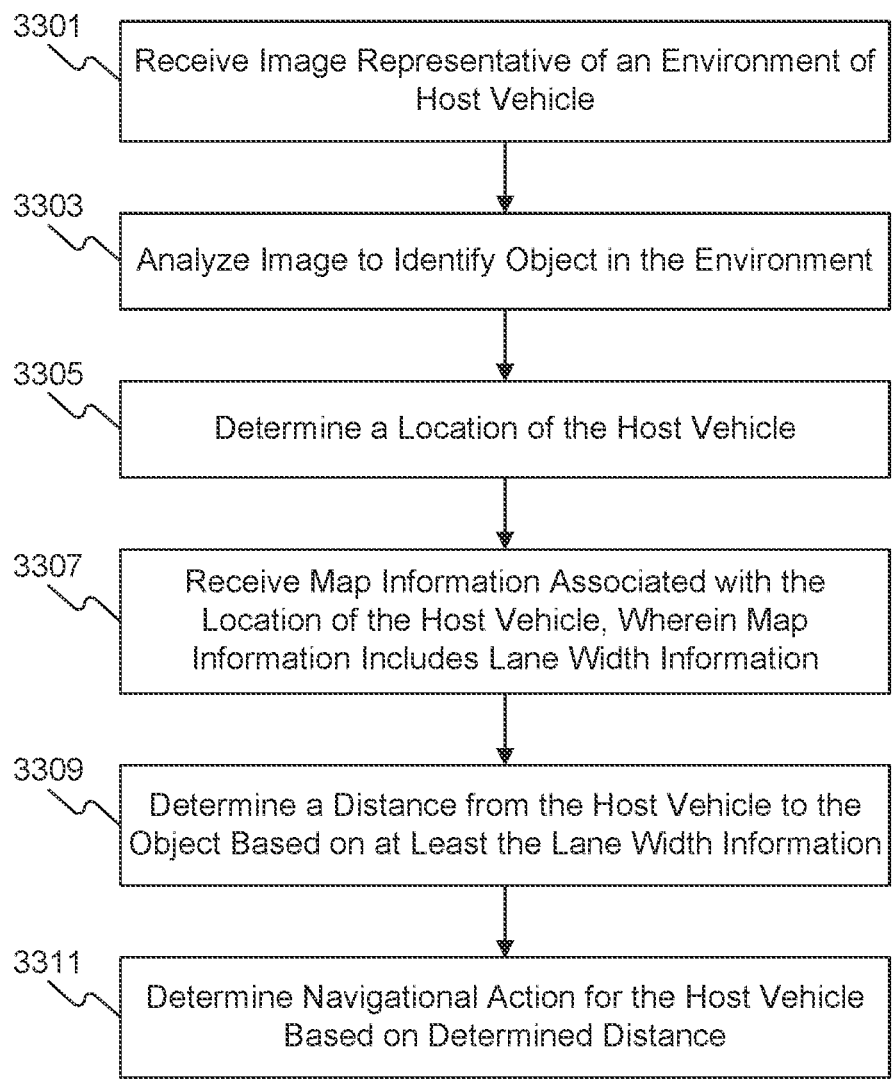
FIG. 33 is a flowchart showing an exemplary process for navigating a host vehicle, consistent with the disclosed embodiments.

FIG. 33 is a flowchart showing an exemplary process for navigating a host vehicle, consistent with the disclosed embodiments. At step 3301, a processor may receive, from an image capture device, at least one image representative of an environment of the host vehicle. The image may be raw or processed data from capturing device 122, 124, and/or 126 via a network or a communication channel. The data may include an be described in an image format.

At step 3303, a processor may analyze the at least one image to identify an object in the environment of the host vehicle. Image 2800 illustrates an environment of a host vehicle with many different objects. A processor may analyze image 2800 to identify objects in the image; the processor may access object identification module 2705 and use any suitable image analysis technique, as described above. Additionally, a processor may also use classification algorithms to distinguish between the different objects in the images. In one embodiment, a processor may utilize suitably trained machine learning algorithms and models to perform the object identification.

At step 3305, a processor may determine a location of the host vehicle. In one embodiment, as described above, a processor may determine the location of the host vehicle based on prediction of a location of the host vehicle along a pre-determined three-dimensional spline representative of a target trajectory for the host vehicle along a road segment. For example, referring to FIG. 27A, a processor may determine the location of the host vehicle based on the identified landmark 2705. And, consistent with the disclosed embodiments, the prediction of the location of the host vehicle along the pre-determined three-dimensional spline may be based on an observed location of at least one recognized landmark. In one embodiment, as described above, the location of the host vehicle may be determined based on an output of at least one sensor of the host vehicle, such as, GPS device, a speed sensor, and/or an accelerometer.

At step 3307, a processor may access map information associated with the determined location of the host vehicle, wherein the map information includes lane width information associated with a road in the environment of the host vehicle. In one embodiment, a processor may receive the sparse map relevant to a particular segment on which the host vehicle is traveling. Then, as described above, a processor may determine a location of the host vehicle relative to a trajectory in the map. When a trajectory is determined, a processor may determine the future path of the host vehicle based on the determined localized position of the host vehicle along the three dimensional spline representative of its target trajectory. Further, a processor may receive lane width information at all points (or at least for periodic points) along the road segments leading the host vehicle. The lane width information can be stored in the sparse map in any suitable format, examples of which are described above. In some embodiments, the lane width information can also include left and right values relative to a target trajectory spline at predetermined longitudinal distance values along the spline, and/or any other storage format.

At step 3309, a processor may determine a distance from the host vehicle to the object based on at least the lane width information. For example, as described above, a processor may average the values of y when the splines are projected on a two dimensional coordinate (e.g., Z=(y1+y2)/2). In another example, using equation (4), a processor may determine the distance from the host vehicle to the object. Alternatively, the distance may be determined based on an output of at least one sensor of the host vehicle, such as, LIDAR system, RADAR system, GPS device, a speed sensor, and/or an accelerometer. In one embodiment, the image analysis based method of determining a distance from the host vehicle to the object based on at least the lane width information may be used as a check of the distance as determined based on outputs of other sensors of the host vehicle.

At step 3311, a processor may determine a navigational action for the host vehicle based on the determined distance. For example, as described above, navigational actions may be determined in order to maintain or establish a safe distance relative to one or more detected vehicles (e.g., as described above relative to the RSS model).

Determining Lane Position of a Partially Obscured Target Vehicle

In some cases, target vehicles may be fully represented in images acquired by an image capture device associated with a host vehicle. In such cases, determining distances to the target vehicles may be based upon an observed line or location in an image at which the target vehicle contacts a road surface. In other cases, however, acquired images may not fully represent one or more target vehicles. For example, one or more target vehicles may be partially obscured such that an intersection of the target vehicle and a road surface may not be observed from the captured image(s). In such cases, other techniques may be used to infer location information relative to one or more detected target vehicles and to determine distances between a host vehicle and the detected target vehicles. Additionally or alternatively, the location information inferred relative to detected target vehicles, optionally in combination with stored map information (e.g., from the sparse maps described above) can be used to determine a lane of travel in which a detected target vehicle travels, a likely future heading direction for the target vehicle, etc.

In one embodiment, a processor for image processing may receive one or more images acquired representing the environment surrounding the host vehicle, as described above. In one embodiment, as described above, a processor may perform image analysis of a set of images and identify objects in the set of images. A processor may identify objects in the plurality of images, a plurality of landmarks (e.g., road signs, etc.) associated with the road segment. Objects may be identified by any of the techniques disclosed above. For example, object recognition, image segmentation, feature extraction, optical character recognition (OCR), object-based image analysis, shape region techniques, edge detection techniques, pixel-based detection, etc.

Figure 34A:
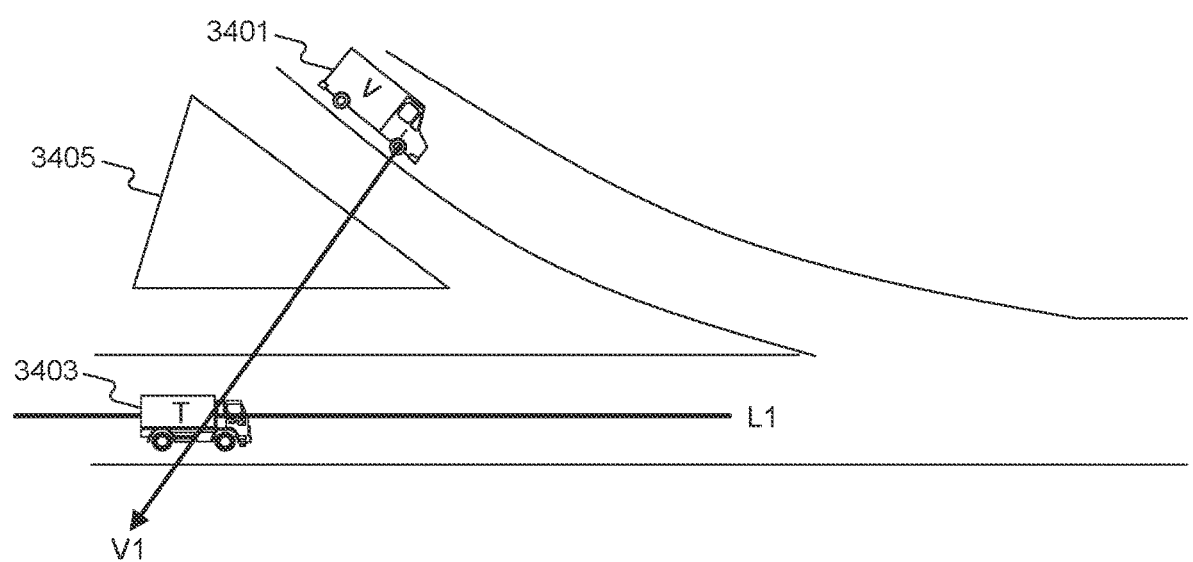
FIG. 34A illustrates an exemplary position of the host vehicle relative to the objects on the road, consistent with the disclosed embodiments.

In one embodiment, based on the analysis, a processor may identify a first object (e.g., target vehicle) in the environment, wherein the first object and the road on which the first object is located are partially obscured by a second object (e.g., divider, road sign, etc.). FIG. 34A represents one exemplary scenario in which a target vehicle may be at least partially obscured in images captured from host vehicle 3401. FIG. 34A illustrates the position of host vehicle 3401 relative to other objects, such as target vehicle 3403 and road divider 3405.

Figure 34B:
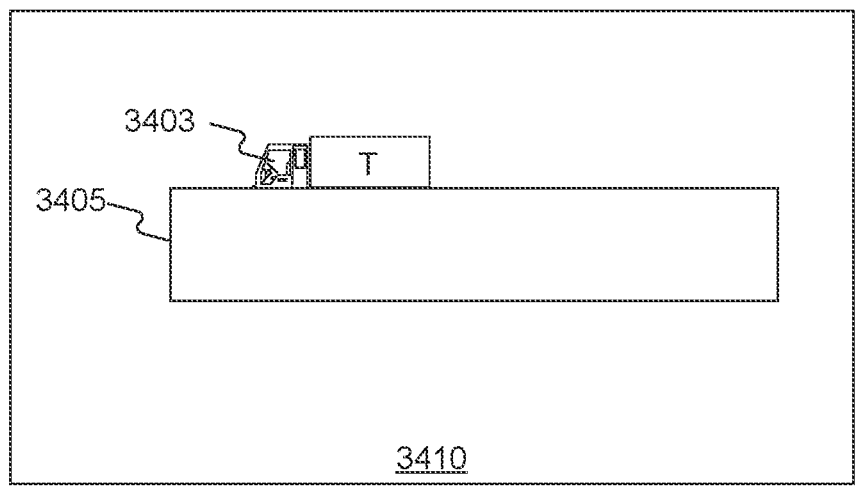
FIG. 34B illustrates an exemplary received image, consistent with the disclosed embodiments.

FIG. 34B is representative of an exemplary image that may be acquired by a camera associated with host vehicle 3401. In the image represented by FIG. 34B, target vehicle 3403 may be detected in the image, but the representation of barrier 3405 partially obscures the image of target vehicle 3403. For example, the bottom of target vehicle 3403 is obscured by divider 3405. Nevertheless, a relevant lane in which target vehicle travels (or a path along with target vehicle is traveling and is expected to travel) may be determined, for example, by tracking movements of target vehicle 3403 over time (e.g., as represented by two or more acquired images), comparing those movements to mapped information (e.g., the sparse maps described above) to infer a lane or path of the travel for target vehicle 3403.

More specifically, based on two or more acquired images, a processor may determine a lane position and/or location of the target vehicle relative to stored map information. For example, based on sparse map that stores trajectories for available lanes of travel along a road segment (which may include multiple intersecting roads portions), a processor may determine that target vehicle 3403 is located in a lane associated with a target trajectory L1. That is, using the localization techniques described above, a processor may determine the location of the host vehicle 3401. The image coordinate of the target vehicle 3403 may be mapped by line V1. As described above, the image coordinate can be translated to map coordinates. Based on the map coordinates, and the intersection of line V1 and lane L1, a processor may determine the location of target vehicle 3403.

Additionally or alternatively, the host vehicle may capture two or more images of target vehicle 3403 and observe how the representation of the target vehicle changes in the acquired images. For example, as host vehicle 3401 and target vehicle 3403 approach the merge, acquired images of target vehicle 3403 will show target vehicle 3403 as occupying a larger portion of the acquired images, as the distance between host vehicle 3401 and target vehicle 3403 decreases. Based on how the image representation size of target vehicle 3403 changes (or based on any other observable image characteristic associated with a relative motion between host vehicle 3401 and target vehicle 3403), a processor may infer a lane of travel for target vehicle 3403. For example, the processor may access the stored sparse map, and determine what lanes of travel may exist on the other side of the barrier 3405 observed in the acquired image represented in FIG. 34B. In the example shown, the processor may determine that one lane of travel exists on the other side of barrier 3405 and that lane is associated with the target trajectory L1. The processor may test the observed motion characteristics associate with target vehicle 3403 to determine if those motion characteristics are consistent with movement of the target vehicle along target trajectory L1. If they are consistent, the navigational processor of host vehicle 3401 may infer that target vehicle 3403 is traveling along path L1 in the lane opposite barrier 3405. With this information, the host vehicle processor may estimate a future path of the target vehicle, including, for example, an estimation of how the target vehicle may interact with the host vehicle or how they will meet at the upcoming lane merge. In some cases, the host vehicle may slow down in order to follow a target vehicle at the upcoming lane merge, even when the target vehicle is partially obscured. In some cases, the host vehicle may speed up so as to continue in front of the target vehicle at the upcoming lane merge. The host vehicle may also determine a distance to the target vehicle based on the sparse map information and the image coordinate of the target vehicle 3403 may be mapped by line V1.

While the example shown includes only one lane of travel, the lane inference and difference determination techniques may be used in situations where multiple lanes are obscured from view of an image capture device on the host vehicle. For example, if there were two, three, or more lanes obscured by barrier 3405, the same technique of comparing observed motion characteristics of the target vehicle in two or more captured images with lane/trajectory information stored in a sparse map would allow the host vehicle processor to infer in which obscured lane the target vehicle is traveling. From this information, the future path of the target vehicle can be determined.

Figure 35A:
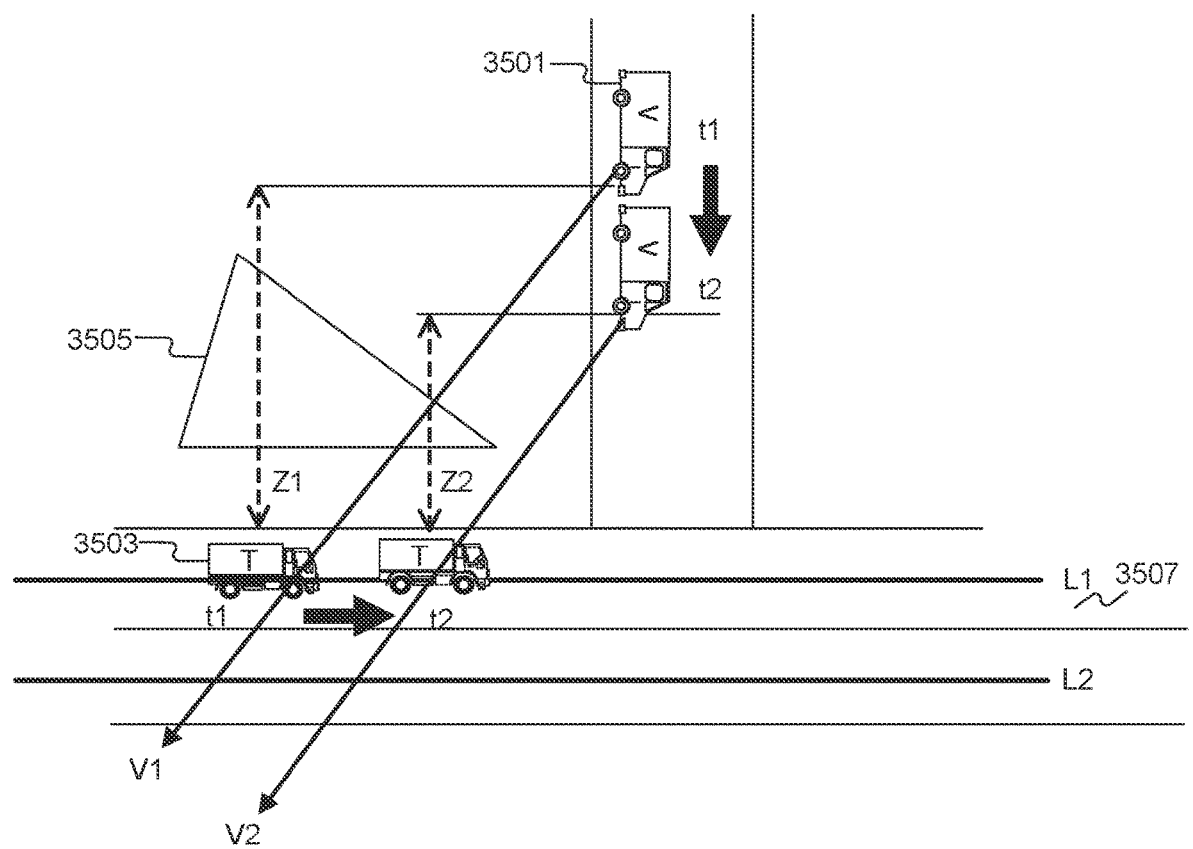
FIG. 35A illustrates an exemplary position of the host vehicle relative to the objects on the road, consistent with the disclosed embodiments.
Figure 35B:
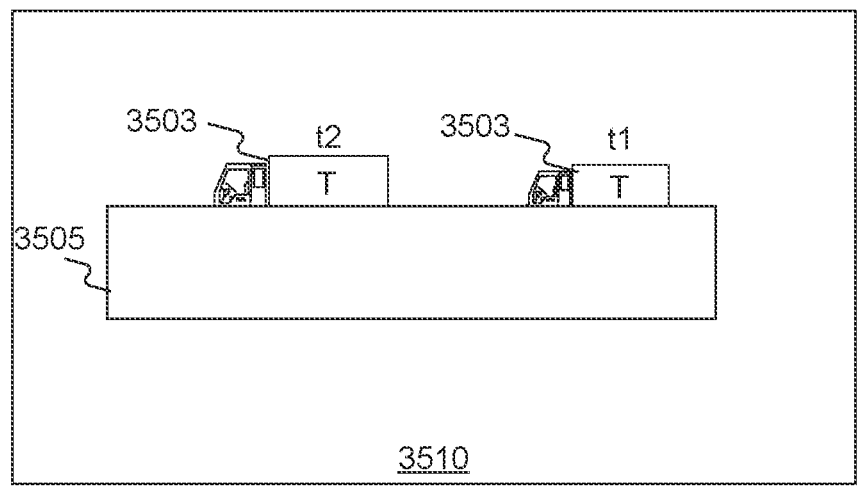
FIG. 35B illustrates exemplary received images at t1 and t2, consistent with the disclosed embodiments.

FIG. 35A illustrates an example in which multiple obscured lanes exist. FIG. 35B illustrates the image coordinate of the target vehicle 3503 at t1 and t2, which are mapped by lines V1 and V2 respectively. Host vehicle 3501 is approaching an intersection with a two-lane road 3507. A processor may determine whether the identified target vehicle 3503 is located in lane L1 or lane L2. Such a determination may be important in developing an appropriate navigational action. For example, if target vehicle is determined to be in the lane associated with trajectory L1, then there may be insufficient space for the host vehicle to make a left turn into the lane associated with trajectory L1. On the other hand, if through the inference technique based on observed motion characteristics of vehicle 3503 and the stored map data, the host vehicle processor determines that target vehicle 3503 is traveling in the lane associated with trajectory L2, then the processor may conclude that there will be sufficient space for host vehicle 3501 to make a left turn into the lane associated with trajectory L1 without impeding the detected target vehicle. In one embodiment, based on the distance from the host vehicle to the target vehicle, and the location of the target vehicle from the images, a processor may determine or infer the speed of the target vehicle. For example, based on line V1 and V2, a processor may determine the travel distance of target vehicle 3503, relative to a known time interval of t2−t1. Hence, the speed of the target vehicle may be determined.

As shown in FIG. 35B, as host vehicle 3501 approaches the intersection from time t1 to t2, the distance from host vehicle 3501 to target vehicle 3503 decreases, and a size of target vehicle 3503 in the image 3510 increases. In one embodiment, a processor may determine the distance Z1 form host vehicle 3501 to target vehicle 3503 at t1 and the distance Z2 from host vehicle 3501 to target vehicle 3503 at t2, using the following equations:

$$\frac{Z1}{Z2} = \frac{w2}{w1} \tag{5}$$

$$Z1 - Z2 = dZ \tag{6}$$

wherein, w1 may be the size of target vehicle 3503 in image 3510 at t1, w2 may be the size of target vehicle 3503 in image 3510 at t2, and dZ may be the distance host vehicle 3501 traveled from t1 to t2, which may be detected by the processor, using the image analysis techniques above. The dZ value may be determined by the information from a speed sensor (e.g., speedometer). Based on the calculated Z1 and Z2, a processor may determine the lane position of target vehicle 3503.

Figure 36A:
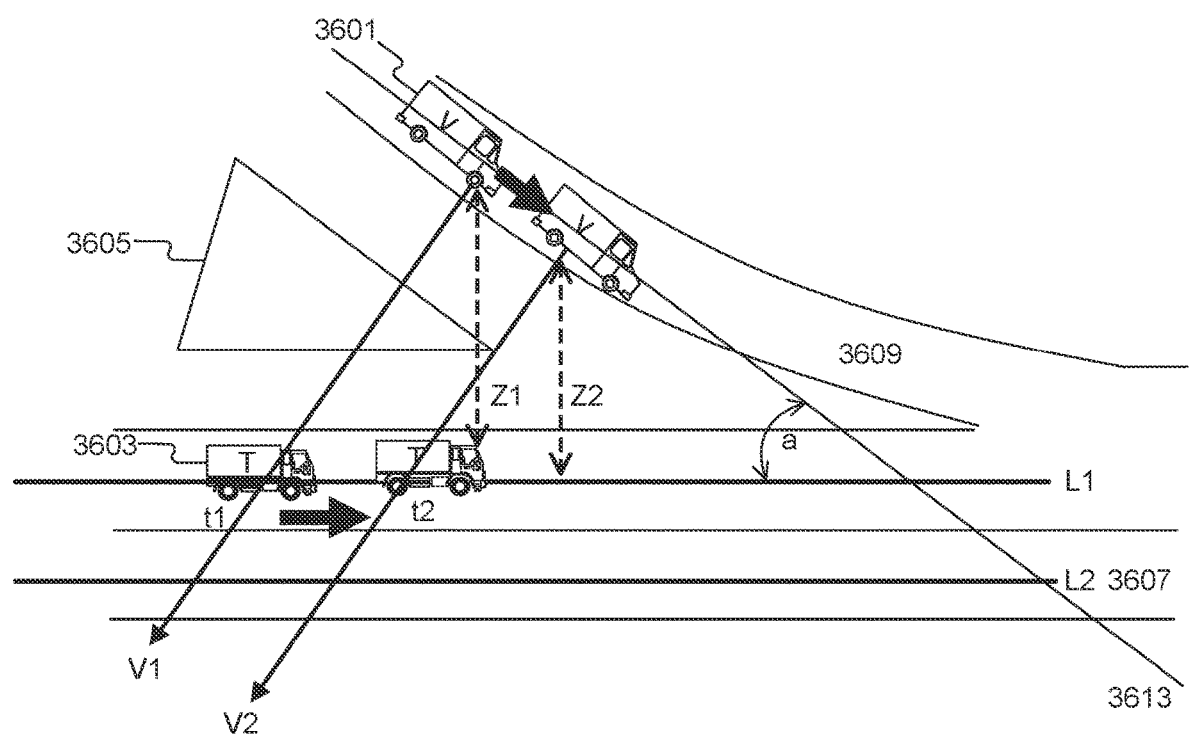
FIG. 36A illustrates an exemplary position of the host vehicle relative to the objects on the road, consistent with the disclosed embodiments.
Figure 36B:
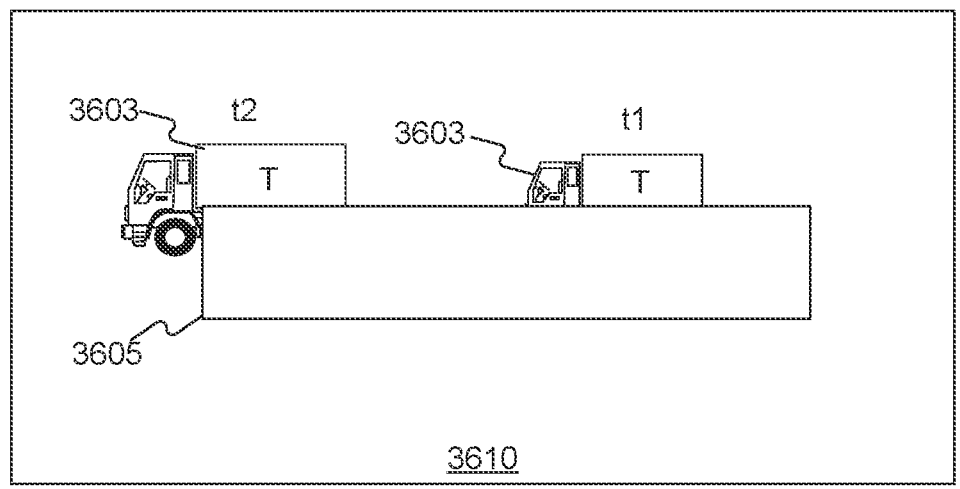
FIG. 36B illustrates an exemplary received images, consistent with the disclosed embodiments.

FIG. 36A provides another multi-lane example in which host vehicle 3601 and target vehicle 3603 are both approaching a lane merge. FIG. 36B illustrates the image coordinate of the target vehicle 3603 at time t1 to t2, which are mapped by lines V1 and V2 respectively. As shown in FIG. 36A, curved lane 3609 merges with road 3607. A processor may approximate the curved lane 3609 as straight line 3613, for a simpler calculation. A processor may determine the distance Z1 from host vehicle 3601 to target vehicle 3603 at time t1 and the distance Z2 from host vehicle 3601 to target vehicle 3603 at time t2, using the following equations:

$$Z1 - Z2 = dZ \times \sin(a) \tag{7}$$

$$\frac{Z1}{Z2} = \frac{w2}{w1} \tag{5}$$

where dZ may be the distance host vehicle 3601 traveled from t1 to t2, a is the angle between line 3613 and road 3607, w1 may be the size of target vehicle 3603 in image 3610 at t1, and w2 may be the size of target vehicle 3603 in image 3610 at t2. In one embodiment, for simplicity, a processor may cause a capturing device (e.g., a camera) to virtually rotate so that the optical axis is perpendicular to lanes L1 and L2, and hence, the motion of target vehicle 3603 may be ignored. Further, based on the calculated Z1 and Z2, a processor may determine the lane position of the target vehicle 3603 through inference based on a comparison with the stored map data (e.g., determining which lane trajectory best fits with the observed motion characteristics of the target vehicle).

In one embodiment, a processor may determine scale change information for an identified object. Scale change information may include size change information of an identified object in the images. For example, in images 3510, a processor may determine the size of target vehicle 3503 (or an identifiable component or portion of the target vehicle) in the image is greater at t2 than the size at t1. Scale change information may also include position change information of an identified object in the images. For example, in image 3510, a processor may detect that target vehicle 2503 moves from right to left in the images from time t1 to t2. The size of an object in the images may be described by pixels. In one embodiment, based on the time stamps of the images, a time interval may be determined. In one embodiment, the scale change information includes configuration information related to a lane structure of the road. Based on the image analysis, a processor may determine a lane structure of the road. The structure may contain features of a lane (e.g., a straight lane, a detour, 2-meter wide lane, a right turn in the front, etc.).

In one embodiment, as described above, a processor may determine a desired navigational action based on the determined lane position of the identified object. For example, if target vehicle 3503 is determined to be located in lane L2 in FIG. 35A, a processor may cause host vehicle 3501 to turn left safely into L1. If target vehicle 3503 is determined to be located in lane L1, a processor may cause host vehicle 3501 to slow down and wait for a period of time to turn left. In another example, if target vehicle 3603 is located in lane L1 in FIG. 36A, a processor may cause host vehicle 3601 to slow down, to avoid hitting target vehicle 3603. Further, as described above, a processor may determine a navigational action, based on the determined lane position of target vehicles and RSS safe distance, as well.

Figure 37:
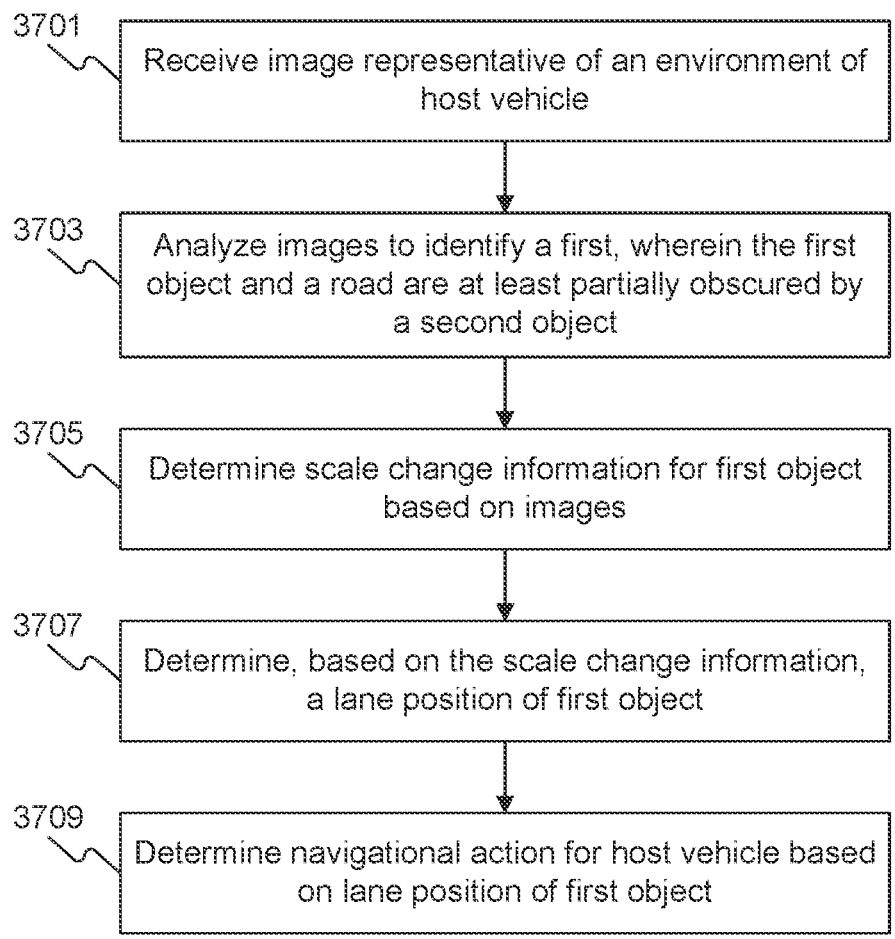
FIG. 37 is a flowchart showing an exemplary process for navigating a host vehicle, consistent with the disclosed embodiments.

FIG. 37 is a flowchart for navigating a host vehicle, consistent with the disclosed embodiments. At step 3701, a processor may receive, from an image capture device, at least one image representative of an environment of the host vehicle. The image may be raw or processed data from capturing device 122, 124, and/or 126 via a network or a communication channel. The data may include an be described in an image format.

At step 3703, a processor may analyze at least one of the plurality of images to identify a first object in the environment of the vehicle, wherein the first object and a road on which the first object is located are at least partially obscured by a second object in the environment of the vehicle. As described above, images 3410, 3510, and 3610 may illustrate an environment of a host vehicle. As described above, a processor may analyze the images to identify objects in the image, using the image analysis technique including, for example, object recognition, image segmentation, feature extraction, optical character recognition (OCR), object-based image analysis, shape region techniques, edge detection techniques, pixel-based detection, etc. For example, based on the analysis, a processor may identify first target vehicle 3503 being obscured by divider 3505 image 3510.

At step 3705, a processor may determine scale change information for the first object based on at least two of the plurality of images. For example, a processor may compare images 3510 that contains the image of target vehicle 3503 at both t1 and t2, and may determine that the size change of target vehicle 3503 in the images.

At step 3707, a processor may determine, based on the determined scale change information for the first object, a lane position of the first object relative to a lane of the road on which the first object is located. As described above, based on Z1 and Z2, a processor may determine a lane position for the target vehicle.

At step 3709, a processor may determine a navigational action for the host vehicle based on the determined lane position of the first object. As described above, for example, if target vehicle 3503 is determined to be located in lane L2 in FIG. 35A, a processor may cause host vehicle 3501 to turn left safely into L1. If target vehicle 3503 is determined to be located in lane L1, a processor may cause host vehicle 3501 to slow down and wait for a period of time to turn left.

Determining Road Location of Target Vehicle Based on Tracked Trajectory

As noted above, target vehicles may be partially obscured in acquired images. In such cases, comparisons with stored sparse map information may be used to determine distances to the detected target vehicles. Additionally or alternatively, as noted, motion characteristics of a detected target vehicle (observed through image analysis) may be compared to the sparse map information in order to infer a lane of travel of the detected target vehicle travel, a likely future heading direction for the target vehicle, etc.

In one embodiment, a processor for image processing may receive one or more images acquired as of the environment surrounding the host vehicle, as described above. In one embodiment, as described above, a processor may perform image analysis of a set of images and identify objects in the set of images. A processor may identify objects in the plurality of images, a plurality of landmarks (e.g., road signs) associated with the road segment. Objects may be identified by any of the techniques disclosed above. For example, object recognition, image segmentation, feature extraction, optical character recognition (OCR), object-based image analysis, shape region techniques, edge detection techniques, pixel-based detection, etc.

Figure 38A:
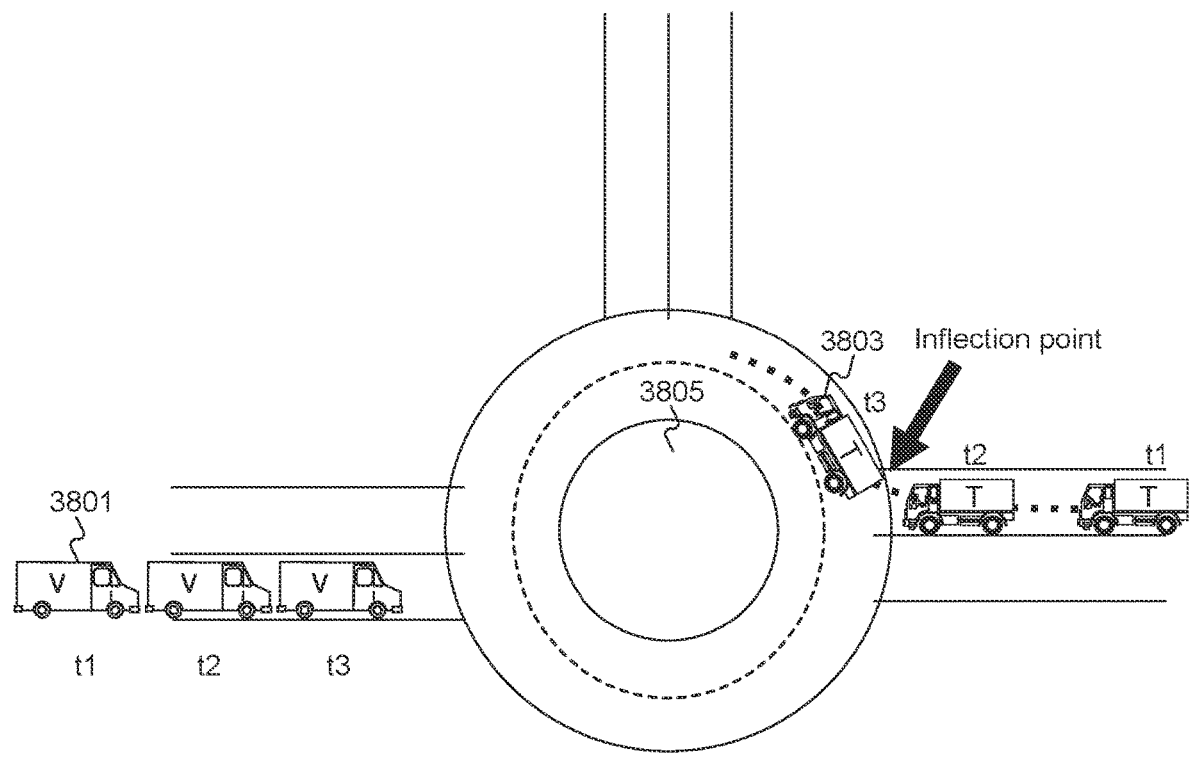
FIG. 38A illustrates an exemplary position of the host vehicle relative to the objects on the road, consistent with the disclosed embodiments.

In one embodiment, based on the analysis, a processor may identify a first object (e.g., target vehicle) in the environment, wherein the first object and the road on which the first object is located are partially obscured by a second object (e.g., divider, road sign, roundabout, etc.). FIG. 38A illustrates the position of a host vehicle 3801 relative to objects on a road segment. A processor on host vehicle 3801 may detect target vehicle 3803 and roundabout 3805 through analysis of one or more acquired images. Based on a determined location for the host vehicle, a processor associated with the host vehicle may receive map information associated with the environment of the host vehicle, as described above. For example, a sparse map associated with the road segment on which host vehicle 3801 travels may be provided to host vehicle 3801.

Figure 38B:
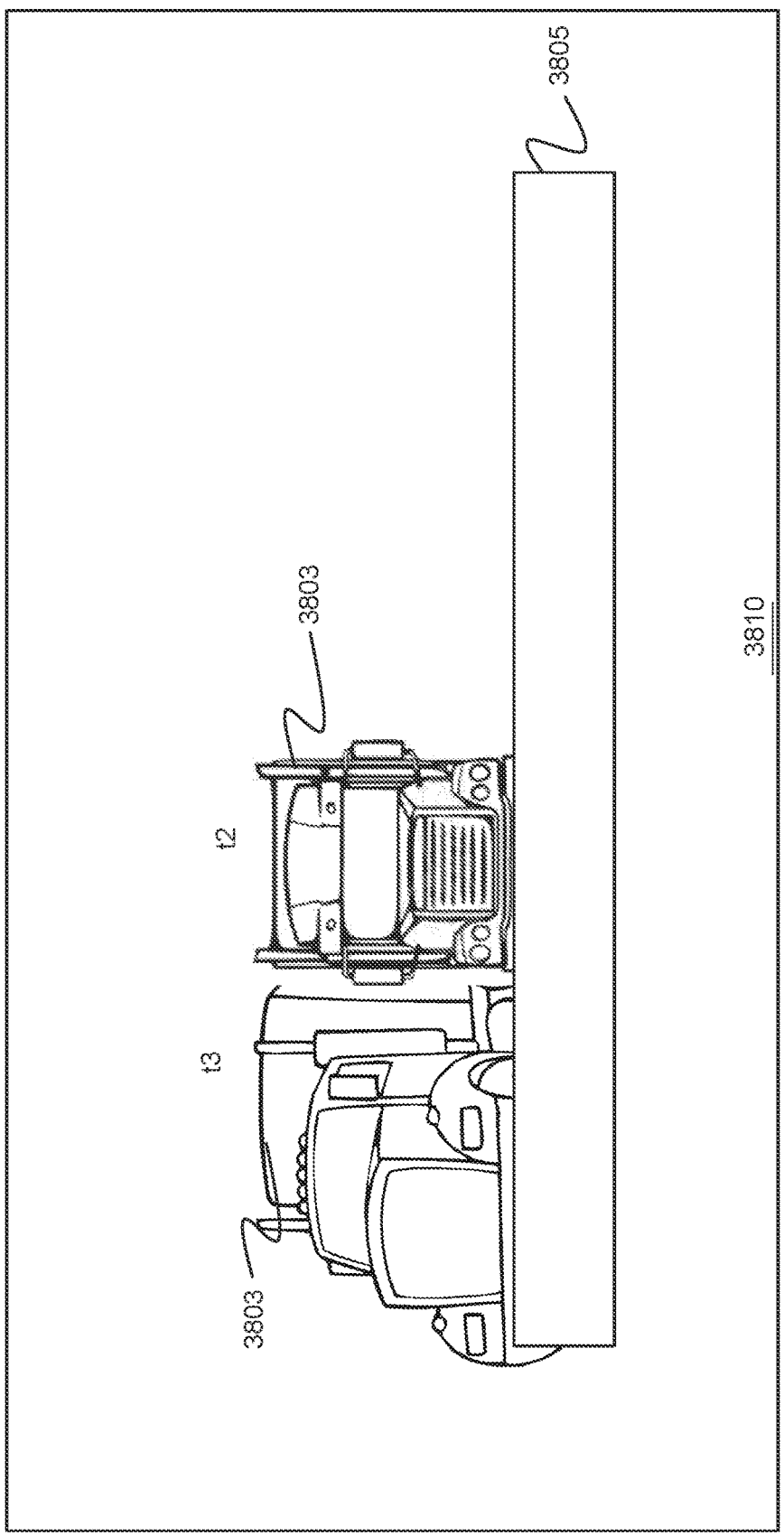
FIG. 38B illustrates an exemplary received images, consistent with the disclosed embodiments.

FIG. 38A illustrates the positions of host vehicle 3801 relative the target vehicle 3803 and roundabout 3805 at times t1, t2 and t3. From the positions in acquired images of target vehicle 3803 and/or based on other motion characteristics associated with the target vehicle (e.g., object scaling across acquired images, etc.), a processor may determine a trajectory for target vehicle 3803 (e.g., a tracked trajectory along which the target vehicle has traveled from time t1 to time t3). Entering the traffic circle, target vehicle 3803 may make a right turn. The initial turn angle may be near 90 degrees to the right (relative to the original direction of travel at times t1 and t2). Further, as the target vehicle travels around the traffic circle, the target vehicle turns continuously to its left until it exits from the traffic circle. FIG. 38B illustrates an exemplary composite image representative of two different images received by a processor on host vehicle 3801 from the capturing device at time t2 and at a later time t3. The images are combined to show a progression of target vehicle 3803 from time t2 to time t3. Target vehicle 3803 is partially obscured by barrier 3805.

As described above, based on the images captured from t1-t3, a processor may track the size (or width (w)) change of target vehicle 3803 in the images. The processor may also track the direction of travel of the target vehicle. From this information, a path of travel may be determined for the target vehicle, despite it being partially obscured. This determined path of travel may be compared to lane trajectories stored in the sparse map to determine which of the stored lane trajectories matches the determined path of travel of the target vehicle, determined through image analysis. Confirming the lane of travel in this way may enable the host vehicle navigational processor to determine a likely path of the travel for the target vehicle at future times and to determine navigational actions for the host vehicle in view of the lane of travel determined for the detected target vehicle.

Figure 38C:
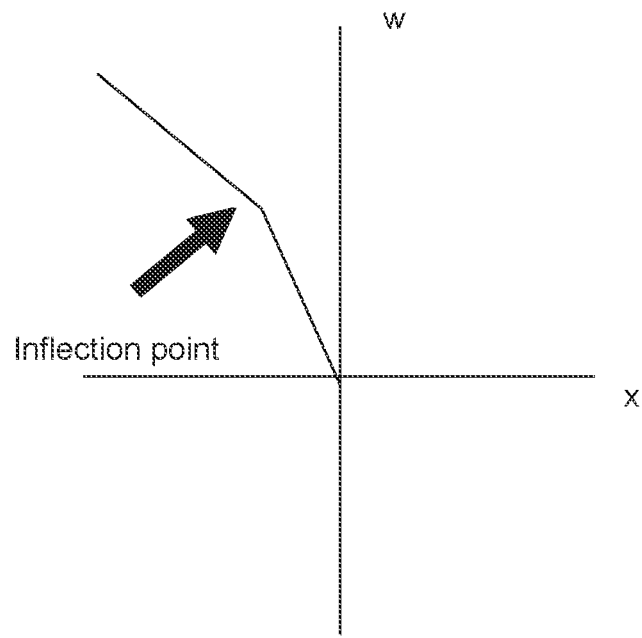
FIG. 38C illustrates a diagram demonstrating the relationship between position (x) and width (w) of a target vehicle in the received images, consistent with the disclosed embodiments.

FIG. 38C provides a diagram showing a relationship between position (x) and width (w) of target vehicle 3803 in the images. As shown in the diagram, an inflection point may occur at the position where target vehicle 3803 enters the traffic circle. Based on the inflection point, a processor may select the image taken at the time when inflection point occurred. Based on image analysis described above, a processor may determine the distance Z from host vehicle 3801 to target vehicle 3808. Based on the determined distance Z and the image width (w), a processor may calculate an actual vehicle width W, using the equations above. When both width (w) in the image and the actual width W are determined, then a processor may calculate the distance Z from host vehicle 3801 to target vehicle 3803 at any given point, when image width (w) is determined through image analysis. The above method for determine the distance from a host vehicle to target vehicle may apply to any target vehicle trajectory where an inflection point occurs at the diagram of relationship between image width (w) and image position (x).

Figure 39A:
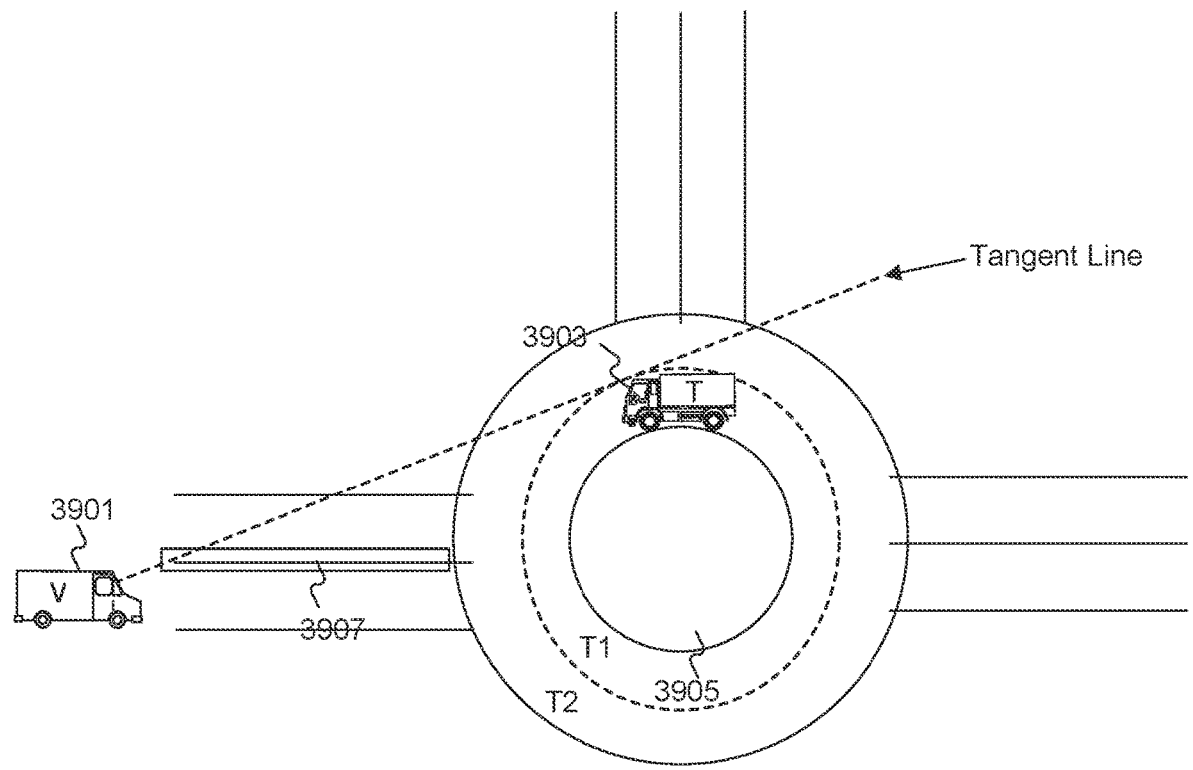
FIG. 39A illustrates an exemplary position of the host vehicle relative to the objects on the road, consistent with the disclosed embodiments.

FIG. 39A illustrates a position of host vehicle 3901 relative to the target vehicle 3903, roundabout 3905, and divider 3907 in one example. FIG. 39B illustrates one of the images received by a processor on host vehicle 3901 from the capturing device. In one embodiment, a processor may determine the lane position of target vehicle 3903, such as whether target vehicle 3903 is located on the inner lane (T1) or outer lane (T2). Based on the store sparse map information, a processor may generate a tangent line from a current position of the host vehicle to a known location of a center of a lane divider between lanes T1 and T2, as shown in FIG. 39A. Using this tangent light to analyze the captured image shown in FIG. 39B, the processor may determine the lane position of target vehicle 3903. For example, if target vehicle 3903 is on the left of the tangent line in the image, then a processor may determine that target 3903 is located on the outer lane (T2). And, if target vehicle 3903 is on the right of the tangent line in the image, then a processor may determine that target 3903 is located on the inner lane (T1). The above method for determine the lane position of a target vehicle may be applied to any multilane curve or traffic circle.

Figure 40A:
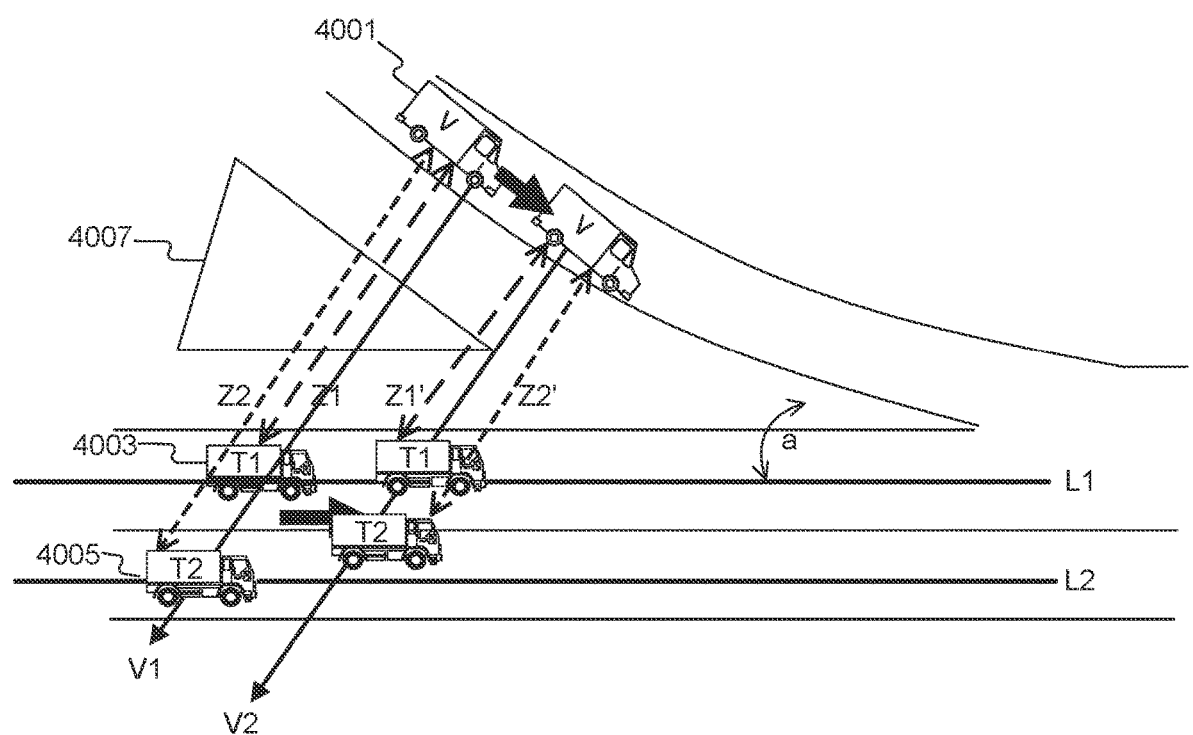
FIG. 40A illustrates an exemplary position of the host vehicle relative to the objects on the road, consistent with the disclosed embodiments.
Figure 40B:
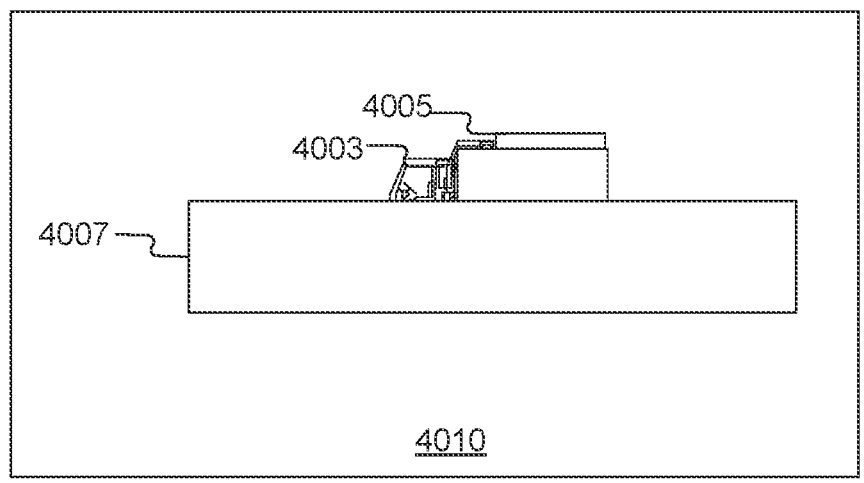
FIG. 40B illustrates an exemplary received images at t1, consistent with the disclosed embodiments.

FIG. 40A illustrates another example of a host vehicle 4001 approaching a target vehicle 4003, which is partially obscured by a barrier 4007. FIG. 40B illustrates an exemplary image received by a processor from a capturing device associated with the host vehicle. Consistent with the disclosure, a processor may receive image 4010 captured by a capturing device on host vehicle 4001. As shown in image 4010, the bottom portions of target vehicle 4003 are obscured by barrier 4007. Based on analysis of acquired images, a processor may determine that target vehicle 4003 is located along line V1 relative to the host vehicle, while the exact position along line V1 may not be known. In order to determine an actual position of target vehicle 4003, a processor may hypothesize the distance from host vehicle 4001 to target vehicle 4003 (e.g., Z1 or Z2). A processor, as described above, may monitor the observed motion characteristics of target vehicle 4003 over two or more captured images, and may determine an observed trajectory for the target for each hypothesized distance (e.g., Z1 or Z2), each of which may be associated with a different observed trajectory of the target vehicle. A processor may compare the observed trajectories for the target vehicle to stored map information showing available lanes and associated trajectories opposite barrier 4007. Through this comparison, the processor can determine which of the hypothesized trajectories more likely (e.g., which best fits the actual lane and trajectory values represented in the stored map). In some cases, a processor may rank each of the hypothesized trajectories according to a degree of confidence (or other quantifier) that a particular hypothesized trajectory for a target vehicle matches the actual trajectory of the target vehicle (e.g., which observed trajectory best matches an available or relevant mapped trajectory.

In one example, as shown in FIG. 40A, if the true target vehicle location was T1 then the path of the target vehicle, Z1 to Z1', will be parallel to the lane L1. In other words, if vehicle 4003 was assumed to be located at a distance Z1 from the host vehicle, and the host vehicle observed the motion characteristics of vehicle 4003 over two or more captured images, the processor of the host vehicle would determine that the image representations of the target vehicle changed in a manner consistent with the target vehicle moving along a path L1, as represented in a stored map. On the other hand, if the processor assumed that the target vehicle was located at a distance Z2 away from the host vehicle (e.g., at the target vehicle position 4005), then the observed changes in the image representation of the target vehicle would result in a trajectory different from either path L1 or path L2. For example, the observed trajectory based on a Z2 starting distance may extend from Z2 to Z2'. This path is not parallel to either of the valid paths L1 or L2. As a result, the processor of the host vehicle could determine that, because the observed trajectory based on an assumption of a distance of Z2 does not match with a valid trajectory stored in the map, the target vehicle is not located at a distance Z2. Rather, because the observed trajectory associated with distance Z1 matches a valid trajectory stored in the map, the processor may determine that the target vehicle is located at a distance Z1 from the host vehicle and travels along the path L1.

Based on this analysis, path L1 may be considered the most likely candidate for the actual trajectory of partially obscured vehicle 4003. The map data might also include 'likely path' information stored that was accumulated from crowd sourcing on this road section or similar road sections. In this case, even if the initial trajectory determination was not correct, and the correct path is Z2 to Z2' then the vehicle may be in the process of a changing lanes maneuver. At some point, the vehicle will then be in L1, at which time a repeat of the process described above should lead to a determination that the target vehicle is now traveling along path L1. This may represent a general solution method to the scenarios described before. For example, when the target in 38A is tracked, and various distances are hypothesized, only one hypothesis should align nicely with the map data. Machine learning methods may be used to estimate the likelihood of a particular path. Referring back to FIG. 40A, the RSS framework would suggest that we make sure we are safe for any location of the target along V1. The CRSS framework, however, (e.g., a policy whose distance buffer is greater than a minimum safe distance to guarantee no collisions at the fault of the host vehicle) can assume the most likely location.

In general, a processor, as described above, may monitor the observed motion characteristics of target vehicle 4003 over two or more captured images and may determine one or more estimated trajectories for the target vehicle. Comparing the observed target trajectories to stored map information showing available lanes and associated trajectories opposite divider 4007, the processor can determine which of the available lanes the target vehicle is traversing. For example, the processor may determine that the observed motion (e.g., scaling etc.) of target vehicle 4003 is consistent with trajectory L1, but is not consistent with trajectory L2.

As described above, a processor may determine the distance from host vehicle 4001 to target vehicle 4003, using the following equation:

$$\frac{w'}{w} = \frac{Z1}{Z1'} = \frac{Z2}{Z2'} \quad (8)$$

where w is the width of target vehicle 4003 in the image at t1, w' is the width of target vehicle 4003 in the image at t2.

For example, from image 4010 a processor may determine that Z1=40 meters, Z2=44 meters, and a lane width=4 meters. Based on prediction, a processor may determine that Z1'=30 meters, and Z2'=33 meters, in a scenario where target vehicle 4003 moves laterally in lane L2.

Hence, if Z2' is predicted to be 32 meters, then a processor may determine that target vehicle 4003 shifted 1 meter away from the center of lane L2 toward lane L1. Or if Z2' is determined to be 35 meters, then a processor may determine that target vehicle 4003 shifted outward away from lane L2.

Figure 40C:
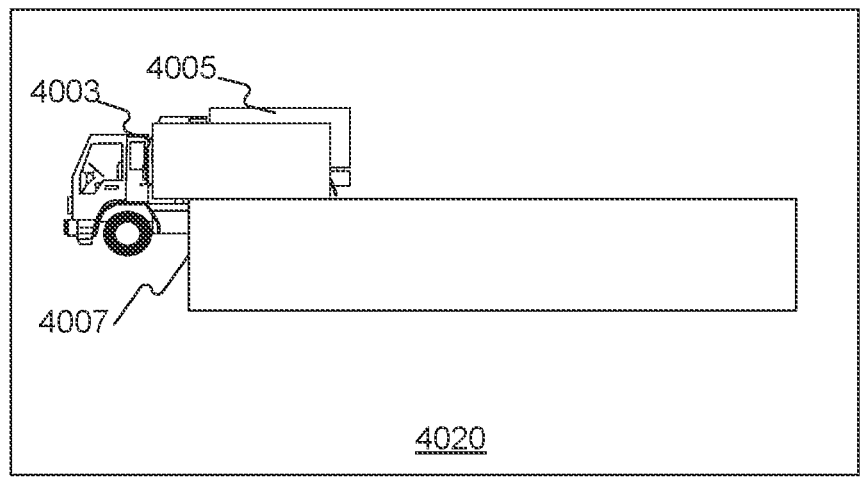
FIG. 40C illustrates an exemplary received images at t2, consistent with the disclosed embodiments.

As described above, a processor may receive stored map information and determine whether the distance Z1=40 meters agrees with the mapped information. If the distance agrees with the stored map information, then the target vehicle (e.g., target vehicle 4003) trajectory may be confirmed as corresponding with the lane L1. This method may also be applied to inferring target vehicle travel lanes at intersections, traffic circles, or any other road segment structures. In one embodiment, the processor associated with a host vehicle may also rely upon perspective or ordering of object representations in a captured image from front to back, for example, to infer a lane of travel for a target vehicle. For example, FIG. 40C represents a captured image in which target vehicle 4003 is obscuring target vehicle 4005. The host vehicle processor, upon analyzing the captured image, may determine that target vehicle 4003 is closer to the host vehicle than target vehicle 4005 based on the fact that vehicle 4003 is obscuring vehicle 4005 in the captured image. Based on this information, the host vehicle processor may infer that vehicle 4005 is traveling in more distant from the host vehicle than vehicle 4003. Comparing this inference to stored map information may enable the host vehicle processor to determine which available lane of travel each of the target vehicles 4003 and 4005 is traveling, despite being partially obscured by divider 4007.

Figure 41:
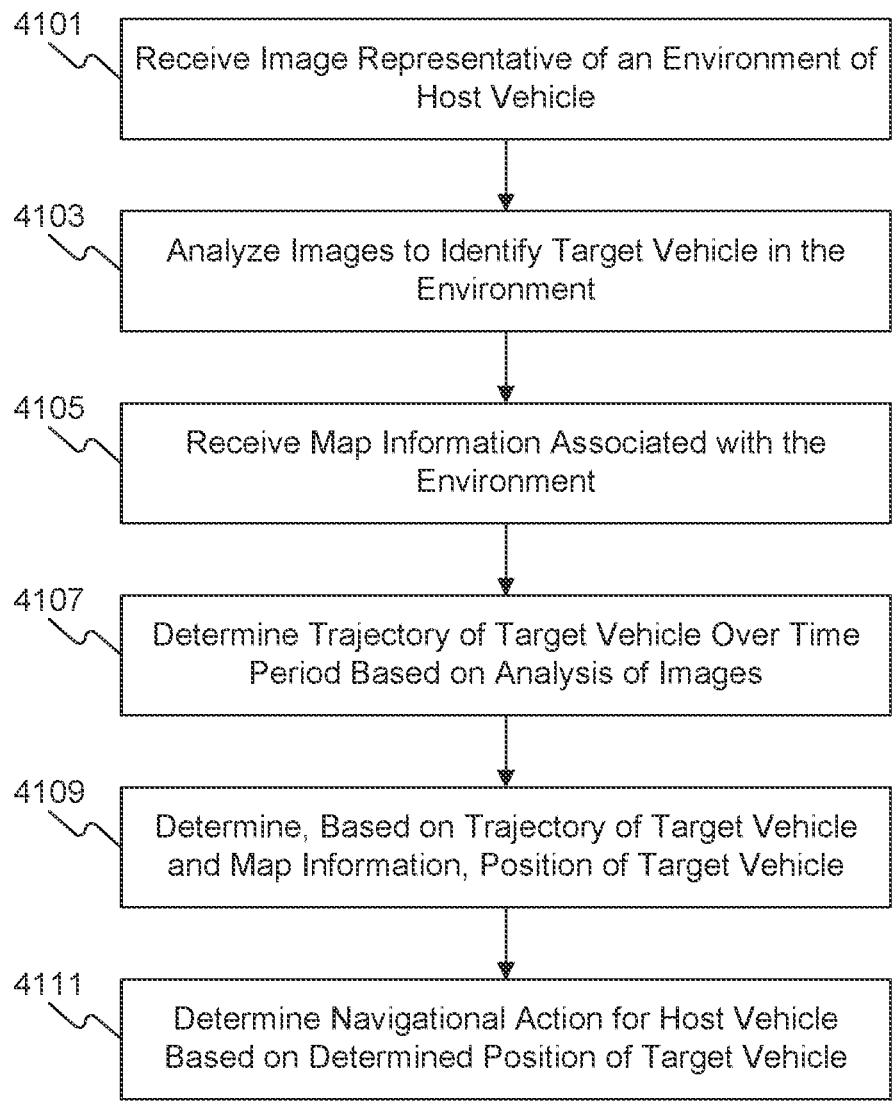
FIG. 41 is a flowchart showing an exemplary process for navigating a host vehicle, consistent with the disclosed embodiments.

FIG. 41 is a flowchart representing an exemplary method for navigating a host vehicle, consistent with the disclosed embodiments. At step 4101, a processor may receive, from an image capture device, at least one image representative of an environment of the host vehicle. The image may be raw or processed data from capturing device 122, 124, and/or 126 via a network or a communication channel.

At step 4103, a processor may analyze at least one of the plurality of images to identify a target vehicle in the environment of the host vehicle. As described above, images 3810, 3910, and 4010 may illustrate the environments of the host vehicles. A processor may analyze the images to identify objects in the image using the image analysis technique, as described above. For example, based on the analysis, a processor may identify target vehicle 3903, roundabout 3905, and divider 3907.

At step 4105, a processor may receive map information associated with the environment of the host vehicle. For example, a processor may determine a location of the host vehicle and obtain map information relevant to the determined location. For example, based on a determined host vehicle location, a processor may retrieve map information including the specific location or related to the determined location. The map information may include the target trajectories of available lanes, landmark types and locations, object types and locations, structure of the road, elevation information, lane width, and/or speed limit, etc.

At step 4107, a processor may determine a trajectory of a detected target vehicle over a time period based on analysis of a plurality of captured images. As described above, a processor may monitor the motion of an identified object (e.g., a target vehicle) in the received images. That is, a processor may track the size and position of a target vehicle in the images to infer where on the three dimensional map (e.g., image 2910) the target vehicle is located. For example, if a processor determines that a target vehicle drives straight, then turn right, and then turn left, then a processor may determine that the target vehicle is entering a traffic circle.

At step 4109, a processor may determine, based on the determined trajectory of the target vehicle and the map information, a position of the target vehicle relative to a road in the environment of the host vehicle. In one embodiment, a processor may use the determined trajectory of the target vehicle as the basis for a comparison with the three dimensional map, which may indicate the trajectories traveled by the target vehicles. Based on the comparison, a processor may verify the determined trajectory for the target vehicle against the trajectories from the map in order to determine which trajectories qualify as reasonable scenarios for the target vehicle. A processor may further deduce which of the trajectories in the map best fits the observed trajectory of the target vehicle.

At step 4111, a processor may determine a navigational action for the host vehicle based on the determined position of the target vehicle and/or the determined trajectory or lane of travel of the target vehicle. Based on the information above, a processor may localize the target vehicle along its trajectory. Based on the localization, a processor may determine a distance from the host vehicle to the target vehicle. Then, a processor may determine a variety of navigational reactions based on the determined distance (e.g., to maintain RSS safe distance etc). Or, as described above, based on the lane position of the target vehicle, a processor may cause the host vehicle not to turn left in order to avoid hitting the target vehicle. In some cases, a host vehicle processor may determine a predicted heading direction for a target vehicle based on a determination of which target trajectory in a stored map the target vehicle is determined to be following. Such a heading direction of the target vehicle may be relied upon by the host vehicle processor in determining whether one or more navigational changes (e.g., braking, lane change, etc.) is needed by the host vehicle.

When a portion of a target vehicle is obscured (especially the lower portion and its interface with a road surface), determining a distance to the vehicle or to a lane in which the target vehicle resides can be difficult. To address this difficulty, the system described above may determine the lane position of a partially obscured target vehicle based on observed scale changes over time and a known road lane configuration. For example, the scale changes and lane configurations can be compared or tested against one another to determine a lane for which the scale changes are consistent with a valid vehicle trajectory on a lane of the road. The determined lane information can then be used to generate a lane-dependent navigational response.

Figure 42:
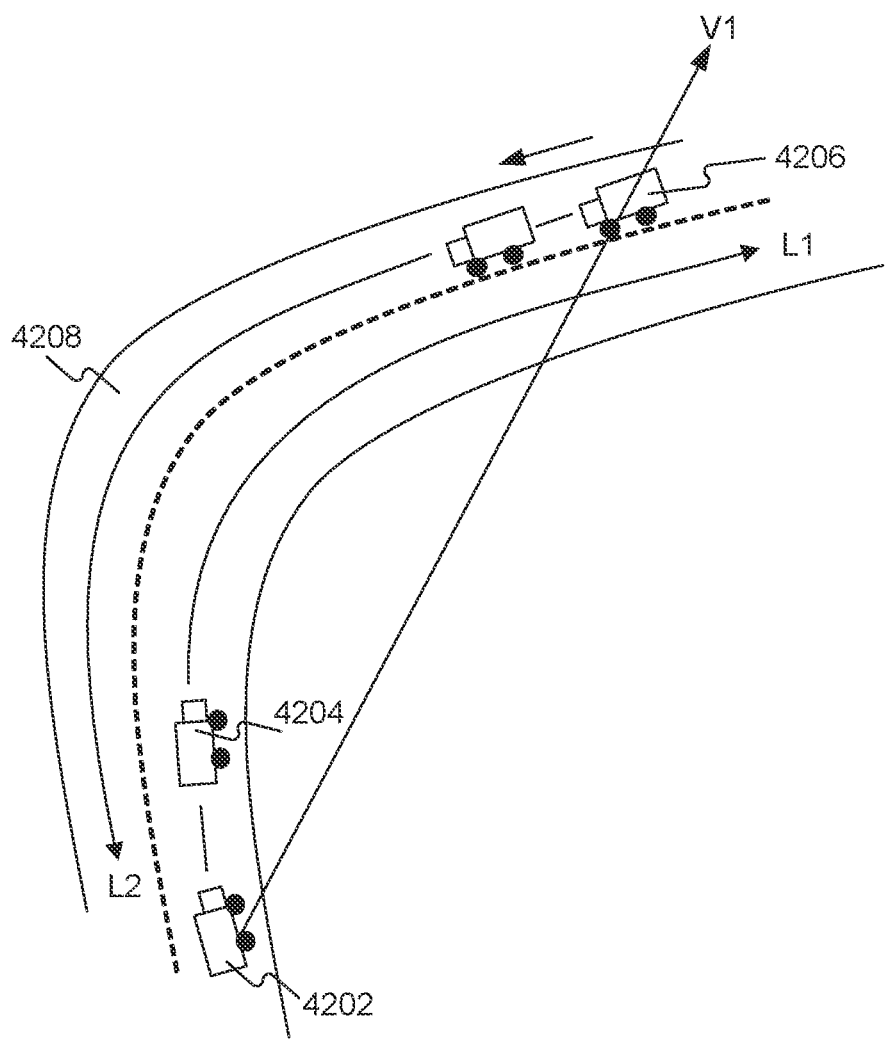
FIG. 42 is a diagram of an exemplary driving scenario in which a distance to a detected target vehicle may be determined.

The system can also infer distance and use that inferred distance information to make navigational decisions. For example, stored map trajectories can be used in combination with target vehicle detections through image analysis to determine or at least infer a distance to a target vehicle when the target enters a traffic circle, passes a certain curve in the road ahead, etc. This distance information can be used, for example, to decide whether to enter the traffic circle or to decide if it is safe to pass. Referring to the example shown in FIG. 42, a host vehicle 4202 is traveling behind a vehicle 4204 and captures images of its environment. Based on analysis of those acquired images, a processor associated with host vehicle 4202 may identify at least one oncoming target vehicle 4206 getting ready to enter a curve in the road ahead. Image analysis may enable a determination that target vehicle 4206 is located along a line of sight V1 relative to host vehicle 4202. The absolute position or distance to the target vehicle along line V1, however, may not be known. Using the stored map information, however, host vehicle 4202 may localize itself relative to trajectory L1. The processor may determine an intersection between line V1 and a trajectory L2 associated with a valid lane of travel for the detected oncoming target vehicle 4206. With the localized position of the host vehicle 4202 and the intersection of the line of sight line V1 with trajectory L2 of the detected target vehicle, the host vehicle processor may determine a distance between the host vehicle and the detected target vehicle. This distance information may be used to determine appropriate navigational actions (e.g., whether there is sufficient space to pass vehicle 4204). Repeating the measurement using another line of sight line different from V1 (e.g., as the host vehicle and the target vehicle both travel toward the curve 4208) can allow determination of the oncoming vehicle speed. For example, the host vehicle may determine two different intersections of its line of sight lines with trajectory L2, may determine a distance between the two intersection points, and using a known time between image acquisitions, may determine how long the target vehicle 4206 took to go from the first map/line of sight intersection point to the second map/line of sight intersection point, which may enable calculation of the vehicle speed.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for navigating a host vehicle, the system comprising:
   at least one processing device comprising circuitry and a memory, wherein the memory includes instructions that when executed by the circuitry cause the at least one processor to:
      receive a plurality of images captured by an image capture device over a time period, the plurality of images being representative of an environment of the host vehicle;
      analyze at least one of the plurality of images to identify a target vehicle in the environment of the host vehicle;
      receive map information associated with the environment of the host vehicle, the map information including a plurality of target trajectories;
      determine, based on analysis of the plurality of images, a first estimated position of the target vehicle at a first time and a second estimated position of the target vehicle at a second time, the first time and the second time being within the time period, wherein the first estimated position and the second estimated position are determined based on a size of a representation of the target vehicle in the plurality of images;
      determine, based on the first estimated position and the second estimated position, a trajectory of the target vehicle over the time period;
      compare the determined trajectory to the plurality of target trajectories to identify a target trajectory of the plurality of target trajectories being traversed by the target vehicle;
      determine, based on the identified target trajectory, a position of the target vehicle relative to a road in the environment of the host vehicle; and
      determine a navigational action for the host vehicle based on the determined position of the target vehicle.

2. The system of claim 1, wherein determining the first estimated position and the second estimated position based on the size of the representation of the target vehicle in the plurality of images includes accounting for a movement of the host vehicle.

3. The system of claim 1, wherein the plurality of target trajectories includes at least a first trajectory and a second trajectory and wherein comparing the determined trajectory to the plurality of target trajectories includes ranking the first trajectory and the second trajectory based on a degree of matching to the determined trajectory.

4. The system of claim 3, wherein the target trajectory is selected from first trajectory or the second trajectory based on the ranking.

5. The system of claim 1, wherein the plurality of target trajectories includes at least a first trajectory associated with a first lane of travel along a road segment and a second trajectory associated with a second lane of travel along the road segment and wherein identifying the target trajectory includes identifying either the first trajectory or the second trajectory.

6. The system of claim 1, wherein comparing the determined trajectory to the plurality of target trajectories includes application of a trained machine learning model.

7. The system of claim 1, wherein determining the trajectory of the target vehicle over the time period is further based on an output of at least one navigational sensor of the host vehicle.

8. The system of claim 1, wherein comparing the determined trajectory to the plurality of target trajectories includes comparing of one or more inflections associated with the determined trajectory to one or more inflections associated with the plurality of trajectories.

9. The system of claim 1, wherein determining the position of the target vehicle relative to the road is further based on GPS information.

10. The system of claim 1, wherein the navigational action includes causing an adjustment of at least one of a steering mechanism, a brake, or an accelerator of the host vehicle.

11. The system of claim 1, wherein the position of the target vehicle occurs on a curve in the road.

12. The system of claim 1, wherein the position of the target vehicle occurs on a traffic circle in the road.

13. A method for navigating a host vehicle, the method comprising:
receiving a plurality of images captured by an image capture device over a time period, the plurality of images being representative of an environment of the host vehicle;
analyzing at least one of the plurality of images to identify a target vehicle in the environment of the host vehicle;
receiving map information associated with the environment of the host vehicle, the map information including a plurality of target trajectories;
determining, based on analysis of the plurality of images, a first estimated position of the target vehicle at a first time and a second estimated position of the target vehicle at a second time, the first time and the second time being within the time period, wherein the first estimated position and the second estimated position are determined based on a size of a representation of the target vehicle in the plurality of images;
determining, based on the first estimated position and the second estimated position, a trajectory of the target vehicle over the time period;
comparing the determined trajectory to the plurality of target trajectories to identify a target trajectory of the plurality of target trajectories being traversed by the target vehicle;
determining, based on the identified target trajectory, a position of the target vehicle relative to a road in the environment of the host vehicle; and
determining a navigational action for the host vehicle based on the determined position of the target vehicle.

14. The method of claim 13, wherein the plurality of target trajectories includes at least a first trajectory and a second trajectory and wherein comparing the determined trajectory to the plurality of target trajectories includes ranking the first trajectory and the second trajectory based on a degree of matching to the determined trajectory.

15. A non-transitory computer-readable medium storing instructions that, when executed by at least one processor, are configured to cause at least one processor to perform a method for navigating a host vehicle, the method comprising:
receiving a plurality of images captured by an image capture device over a time period, the plurality of images being representative of an environment of the host vehicle;
analyzing at least one of the plurality of images to identify a target vehicle in the environment of the host vehicle;
receiving map information associated with the environment of the host vehicle, the map information including a plurality of target trajectories;
determining, based on analysis of the plurality of images, a first estimated position of the target vehicle at a first time and a second estimated position of the target vehicle at a second time, the first time and the second time being within the time period, wherein the first estimated position and the second estimated position are determined based on a size of a representation of the target vehicle in the plurality of images;
determining, based on the first estimated position and the second estimated position, a trajectory of the target vehicle over the time period;
comparing the determined trajectory to the plurality of target trajectories to identify a target trajectory of the plurality of target trajectories being traversed by the target vehicle;
determining, based on the identified target trajectory, a position of the target vehicle relative to a road in the environment of the host vehicle; and
determining a navigational action for the host vehicle based on the determined position of the target vehicle.

16. A system for navigating a host vehicle, the system comprising:
at least one processing device comprising circuitry and a memory, wherein the memory includes instructions that when executed by the circuitry cause the at least one processor to:
receive a plurality of images captured by an image capture device over a time period, the plurality of images being representative of an environment of the host vehicle;
analyze at least one of the plurality of images to identify a target vehicle in the environment of the host vehicle;
receive map information associated with the environment of the host vehicle, the map information including a plurality of target trajectories;
determine, based on analysis of the plurality of images, a first estimated position of the target vehicle at a first time and a second estimated position of the target vehicle at a second time, the first time and the second time being within the time period, wherein the first estimated position and the second estimated position are determined based on an estimated distance between the host vehicle and the target vehicle;
determine, based on the first estimated position and the second estimated position, a trajectory of the target vehicle over the time period;
compare the determined trajectory to the plurality of target trajectories to identify a target trajectory of the plurality of target trajectories being traversed by the target vehicle;
determine, based on the identified target trajectory, a position of the target vehicle relative to a road in the environment of the host vehicle; and determine a navigational action for the host vehicle based on the determined position of the target vehicle.

17. The system of claim 16, wherein determining the first estimated position and the second estimated position based on the estimated distance between the host vehicle and the target vehicle includes accounting for a movement of the host vehicle.

18. The system of claim 16, wherein the plurality of target trajectories includes at least a first trajectory and a second trajectory and wherein comparing the determined trajectory to the plurality of target trajectories includes ranking the first trajectory and the second trajectory based on a degree of matching to the determined trajectory.

19. The system of claim 18, wherein the target trajectory is selected from first trajectory or the second trajectory based on the ranking.

20. The system of claim 16, wherein the plurality of target trajectories includes at least a first trajectory associated with a first lane of travel along a road segment and a second trajectory associated with a second lane of travel along the road segment and wherein identifying the target trajectory includes identifying either the first trajectory or the second trajectory.

21. The system of claim 16, wherein comparing the determined trajectory to the plurality of target trajectories includes application of a trained machine learning model.

22. The system of claim 16, wherein determining the trajectory of the target vehicle over the time period is further based on an output of at least one navigational sensor of the host vehicle.

23. The system of claim 16, wherein comparing the determined trajectory to the plurality of target trajectories includes comparing of one or more inflections associated with the determined trajectory to one or more inflections associated with the plurality of trajectories.

24. The system of claim 16, wherein determining the position of the target vehicle relative to the road is further based on GPS information.

25. The system of claim 16, wherein the navigational action includes causing an adjustment of at least one of a steering mechanism, a brake, or an accelerator of the host vehicle.

26. The system of claim 16, wherein the position of the target vehicle occurs on a curve in the road.

27. The system of claim 16, wherein the position of the target vehicle occurs on a traffic circle in the road.

28. A method for navigating a host vehicle, the method comprising:
receiving a plurality of images captured by an image capture device over a time period, the plurality of images being representative of an environment of the host vehicle;
analyzing at least one of the plurality of images to identify a target vehicle in the environment of the host vehicle;
receiving map information associated with the environment of the host vehicle, the map information including a plurality of target trajectories;
determining, based on analysis of the plurality of images, a first estimated position of the target vehicle at a first time and a second estimated position of the target vehicle at a second time, the first time and the second time being within the time period, wherein the first estimated position and the second estimated position are determined based on an estimated distance between the host vehicle and the target vehicle;
determining, based on the first estimated position and the second estimated position, a trajectory of the target vehicle over the time period;
comparing the determined trajectory to the plurality of target trajectories to identify a target trajectory of the plurality of target trajectories being traversed by the target vehicle;
determining, based on the identified target trajectory, a position of the target vehicle relative to a road in the environment of the host vehicle; and
determining a navigational action for the host vehicle based on the determined position of the target vehicle.

29. The method of claim 28, wherein the plurality of target trajectories includes at least a first trajectory and a second trajectory and wherein comparing the determined trajectory to the plurality of target trajectories includes ranking the first trajectory and the second trajectory based on a degree of matching to the determined trajectory.

30. A non-transitory computer-readable medium storing instructions that, when executed by at least one processor, are configured to cause at least one processor to perform a method for navigating a host vehicle, the method comprising:
receiving a plurality of images captured by an image capture device over a time period, the plurality of images being representative of an environment of the host vehicle;
analyzing at least one of the plurality of images to identify a target vehicle in the environment of the host vehicle;
receiving map information associated with the environment of the host vehicle, the map information including a plurality of target trajectories;
determining, based on analysis of the plurality of images, a first estimated position of the target vehicle at a first time and a second estimated position of the target vehicle at a second time, the first time and the second time being within the time period, wherein the first estimated position and the second estimated position are determined based on an estimated distance between the host vehicle and the target vehicle;
determining, based on the first estimated position and the second estimated position, a trajectory of the target vehicle over the time period;
comparing the determined trajectory to the plurality of target trajectories to identify a target trajectory of the plurality of target trajectories being traversed by the target vehicle;
determining, based on the identified target trajectory, a position of the target vehicle relative to a road in the environment of the host vehicle; and
determining a navigational action for the host vehicle based on the determined position of the target vehicle.

31. The non-transitory computer-readable medium of claim 15, wherein the plurality of target trajectories includes at least a first trajectory and a second trajectory and wherein comparing the determined trajectory to the plurality of target trajectories includes ranking the first trajectory and the second trajectory based on a degree of matching to the determined trajectory.

32. The non-transitory computer-readable medium of claim 15, wherein comparing the determined trajectory to the plurality of target trajectories includes application of a trained machine learning model.

33. The non-transitory computer-readable medium of claim 30, wherein the plurality of target trajectories includes at least a first trajectory associated with a first lane of travel along a road segment and a second trajectory associated with a second lane of travel along the road segment and wherein identifying the target trajectory includes identifying either the first trajectory or the second trajectory.

34. The non-transitory computer-readable medium of claim 30, wherein comparing the determined trajectory to the plurality of target trajectories includes comparing of one or more inflections associated with the determined trajectory to one or more inflections associated with the plurality of trajectories.

* * * * *